US012777311B2

(12) United States Patent
Wu

(10) Patent No.: US 12,777,311 B2
(45) Date of Patent: Oct. 27, 2026

(54) CONFIGURING RESOURCES FOR MULTICAST AND/OR BROADCAST SERVICES IN A DISTRIBUTED BASE STATION ARCHITECTURE

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 281 days.

(21) Appl. No.: 18/726,044

(22) PCT Filed: Jan. 6, 2023

(86) PCT No.: PCT/US2023/010272
§ 371 (c)(1),
(2) Date: Jul. 1, 2024

(87) PCT Pub. No.: WO2023/133242
PCT Pub. Date: Jul. 13, 2023

(65) Prior Publication Data

US 2025/0098028 A1 Mar. 20, 2025

Related U.S. Application Data

(60) Provisional application No. 63/335,998, filed on Apr. 28, 2022, provisional application No. 63/296,974, filed on Jan. 6, 2022.

(51) Int. Cl.
*H04W 4/06* (2009.01)
*H04W 72/29* (2023.01)
(Continued)

(52) U.S. Cl.
CPC ............. *H04W 4/06* (2013.01); *H04W 72/29* (2023.01); *H04W 72/30* (2023.01); *H04W 76/12* (2018.02); *H04W 76/40* (2018.02); *H04W 88/085* (2013.01)

(58) Field of Classification Search
CPC ............... H04W 4/06; H04W 36/0007; H04W 72/27–30; H04W 76/40; H04W 88/085
See application file for complete search history.

(56) References Cited

U.S. PATENT DOCUMENTS

2021/0185569 A1 6/2021 Hu et al.
2022/0312157 A1* 9/2022 Wang ................ H04W 72/1263
(Continued)

FOREIGN PATENT DOCUMENTS

EP 4142313 A1 3/2023
JP 2016-76930 A 5/2016
(Continued)

OTHER PUBLICATIONS

Huawei, "Summary of Offline Discussion for CB: # 99_MBS_ Others." 3GPP TSG-RAN WG3 Meeting #112-e, R3-212710, May 2021.*

(Continued)

*Primary Examiner* — Brendan Y Higa
(74) *Attorney, Agent, or Firm* — MARSHALL, GERSTEIN & BORUN LLP

(57) ABSTRACT

A distributed unit (DU) of a distributed base station including a central unit (CU) and the DU can implement a method for configuring a user equipment (UE) to receive multicast and/or broadcast services (MBS). The method may include: receiving (1002), from the CU, a CU-to-DU message identifying an MBS session and requesting that the DU configure resources for the MBS session; and transmitting (1004), to
(Continued)

the UE in response to receiving the CU-to-DU message, configuration parameters for receiving the MBS session.

20 Claims, 20 Drawing Sheets

(51) Int. Cl.

| | |
|---|---|
| ***H04W 72/30*** | (2023.01) |
| ***H04W 76/12*** | (2018.01) |
| ***H04W 76/40*** | (2018.01) |
| ***H04W 88/08*** | (2009.01) |

(56) References Cited

U.S. PATENT DOCUMENTS

| | | | | |
|---|---|---|---|---|
| 2023/0262734 | A1* | 8/2023 | Qi | H04L 12/1877 455/414.1 |
| 2023/0276468 | A1* | 8/2023 | Wu | H04W 72/30 370/312 |
| 2023/0292092 | A1* | 9/2023 | Hong | H04W 72/20 |
| 2024/0064493 | A1* | 2/2024 | Babaei | H04W 4/06 |

FOREIGN PATENT DOCUMENTS

| | | | | |
|---|---|---|---|---|
| JP | 2023-513493 | A | 3/2023 | |
| JP | 2023-531856 | A | 7/2023 | |
| WO | WO-2021/063215 | A1 | 4/2021 | |
| WO | WO-2021/109428 | A1 | 6/2021 | |
| WO | WO-2021/109429 | A1 | 6/2021 | |
| WO | WO-2021/134298 | A1 | 7/2021 | |
| WO | WO-2021/149933 | A1 | 7/2021 | |
| WO | WO-2021/157872 | A1 | 8/2021 | |
| WO | WO-2021/213018 | A1 | 10/2021 | |
| WO | WO-2021/218375 | A1 | 11/2021 | |
| WO | WO-2021/0258918 | A1 | 12/2021 | |
| WO | WO-2022015120 | A1 * | 1/2022 | H04W 4/06 |
| WO | WO-2022/073226 | A1 | 4/2022 | |
| WO | WO-2022/087069 | A1 | 4/2022 | |

OTHER PUBLICATIONS

Lenovo et al., "Summary of offline MBS_Service_Area_VO." 3GPP TSG-RAN WG3 Meeting #112-e, R3-212707, May 2021.*

Huawei et al., "(TP to TS 38.401 BL CR) Bearer management over F1 and E1". 3GPP TSG-RAN WG3 Meeting #113-e, R3-213578 , Aug. 2021.*

"5G; NR; Packet Data Convergence Protocol (PDCP) Specification," 3GPP TS 38.323 version 16.6.0 Release 16 (2022).

"LTE; Evolved Universal Terrestrial Radio Access (E-UTRA); Packet Data Convergence Protocol (PDCP) Specification," 3GPP TS 36.323 version 16.5.0 Release 16 (2022).

Office Action for Japanese Application No. 2024-540970, dated Oct. 21, 2025.

"3rd Generation Partnership Project; Technical Specification Group Services and System Aspects; Architectural enhancements for 5G multicast-broadcast services; Stage 2; (Release 17)," 3GPP TS 23.247 V0.2.0 (Apr. 2021).

"5G; NG-RAN; F1 Application Protocol (F1AP)m," 3GPP TS 38.473 version 17.0.0 Release 17 (2022).

Docomo et al., "High Level Overview of Functions for LTE Higher Layer Split," 3GPP Draft (Nov. 11, 2018).

Ericsson, "CB: # 20_MBS_DynTXareaCtrl—Summary of email discussion," 3GPP TSG-RAN WG3 #109-e (2020).

International Search Report and Written Opinion for Application No. PCT/US2023/010272, dated Apr. 21, 2023.

Lohmar et al., "Support of Multicast Services in 3GPP," PIK (2004).

* cited by examiner

CONFIGURING RESOURCES FOR MULTICAST AND/OR BROADCAST SERVICES IN A DISTRIBUTED BASE STATION ARCHITECTURE

FIELD OF THE DISCLOSURE

This disclosure relates to wireless communications and, more particularly, to enabling broadcast communications for multicast and/or broadcast services (MBS) in a distributed or disaggregated base station architecture.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP sublayer defined for the Evolved Universal Terrestrial Radio Access (EUTRA) radio interface (see Third Generation Partnership Project (3GPP) specification TS 36.323) and New Radio (NR) (see 3GPP specification TS 38.323) provides sequencing of protocol data units (PDUs) in the uplink direction from a user device (also known as a user equipment or "UE") to a base station, as well as in the downlink direction from the base station to the UE. The PDCP sublayer also provides services for signaling radio bearers (SRBs) to the Radio Resource Control (RRC) sublayer. The PDCP sublayer further provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

The UE in some scenarios can concurrently utilize resources of multiple nodes (e.g., base stations or components of a distributed base station or disaggregated base station) of a radio access network (RAN), interconnected by a backhaul, in what is referred to as dual connectivity (DC) operation. These network nodes may all be nodes using the same radio access technology (RAT), or may include nodes using different RATs. Example DC configurations include NR-only dual connectivity (NR-DC) and EUTRA and NR dual connectivity (EN-DC). When a UE operates in DC, the cell(s) associated with the base station operating as a master node (MN) define a master cell group (MCG), and the cells associated with the base station operating as a secondary node (SN) define the secondary cell group (SCG). The MCG covers a primary cell (PCell) and zero, one, or more secondary cells (SCells), and the SCG covers a primary secondary cell (PSCell) and zero, one, or more SCells. The UE communicates with the MN (via the MCG) and the SN (via the SCG). In other scenarios, the UE utilizes resources of one base station at a time, in single connectivity (SC). The UE in SC only communicates with the MN, via the MCG. A base station and/or the UE determines when the UE should establish a radio connection with another base station. For example, a base station can determine to hand the UE over to another base station, and initiate a handover procedure. The UE in other scenarios can concurrently utilize resources of another RAN node (e.g., a base station or a component of a distributed or disaggregated base station), interconnected by a backhaul.

UEs can use several types of SRBs and DRBs. So-called "SRB1" resources carry RRC messages, which in some cases include NAS messages over the dedicated control channel (DCCH), and "SRB2" resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and can also be referred to as MCG SRBs. "SRB3" resources allow the UE and the SN to exchange RRC messages related to the SN, and can also be referred to as SCG SRBs. Split SRBs allow the UE to exchange RRC messages directly with the MN via lower-layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MN or SN but using the lower-layer resources of both the MN and the SN can be referred to as split DRBs. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

UEs can perform handover procedures to switch from one cell to another, whether in SC or DC operation. These procedures involve messaging (e.g., RRC signaling and preparation) among RAN nodes and the UE. The UE may handover from a cell of a serving base station to a target cell of a target base station, or from a cell of a first distributed unit (DU) of a serving base station to a target cell of a second DU of the same base station, depending on the scenario. In DC scenarios, UEs can perform PSCell change procedures to change PSCells. These procedures involve messaging (e.g., RRC signaling and preparation) among RAN nodes and the UE. The UE may perform a PSCell change from a PSCell of a serving SN to a target PSCell of a target SN, or from a PSCell of a source DU of a base station to a PSCell of a target DU of the same base station, depending on the scenario. Further, the UE may perform handover or PSCell change within a cell for synchronous reconfiguration.

Base stations that operate according to fifth-generation (5G) New Radio (NR) requirements support significantly larger bandwidth than fourth-generation (4G) base stations. Accordingly, the Third Generation Partnership Project (3GPP) has proposed that for Release 15, user equipment units (UEs) support a 100 MHz bandwidth in frequency range 1 (FR1) and a 400 MHz bandwidth in frequency range (FR2). Due to the relatively wide bandwidth of a typical carrier in 5G NR, 3GPP has proposed for Release 17 that a 5G NR base station be able to provide multicast and/or broadcast service(s) (MBS) to UEs. MBS can be useful in many content delivery applications, such as transparent IPv4/IPv6 multicast delivery, IPTV, software delivery over wireless, group communications, Internet of Things (IoT) applications, V2X applications, and emergency messages related to public safety, for example.

5G NR provides both point-to-point (PTP) and point-to-multipoint (PTM) delivery methods for the transmission of MBS packet flows over the radio interface. In PTP communications, a RAN node transmits different copies of each MBS data packet to different UEs over the radio interface, while in PTM communications a RAN node transmits a single copy of each MBS data packet to multiple UEs over the radio interface. In some scenarios, however, it is unclear how a distributed base station configures resources to transmit an MBS data packet via broadcast.

SUMMARY

A network node operating as a central unit (CU) or a distributed unit (DU) of a distributed base station can implement the techniques of this disclosure for configuring resources for Multicast and/or Broadcast Services (MBS). A CU, for example, can receive a message from a core network (CN) requesting that the distributed base station set up resources for an MBS session. In response, the CU may send a CU-to-DU message (e.g., an MBS Context Setup Request message) to the DU identifying the MBS session (e.g., using a session identifier (ID) corresponding to the session) and requesting that the DU configure resources for the MBS session. The DU can then send an MBS broadcast configuration message to a UE (or, more particularly, broadcast the MBS broadcast configuration message to one or more UEs) that includes a list of one or more MBS sessions and MBS session information for each respective MBS session. The MBS session information for an MBS session includes configuration parameters that enable a UE to receive MBS data for the MBS session, such as a Packet Data Convergence Protocol (PDCP) configuration, Radio Link Control (RLC) configuration, discontinuous reception (DRX) configuration, a Group Radio Network Temporary Identifier (G-RNTI) associated with the MBS session, and/or a session ID for the MBS session.

Depending on the implementation, the CU or the DU may generate the MBS broadcast configuration message or the MBS session information. In some implementations, the DU generates the MBS session information and the MBS broadcast configuration message. The DU may receive, from the CU, configurations associated with layers operated by the CU, and include these configurations in the MBS session information. For example, the DU receives a PDCP configuration or DRX configuration from the CU. The DU can then generate information at layers operated by the DU, such as a G-RNTI and RLC configuration, and include such information in the MBS session information.

In other implementations, the CU generates the MBS session information, and might or might not generate the MBS broadcast configuration message. In such implementations, the CU may receive an RLC configuration and G-RNTI for the MBS session from the DU, and include the RLC configuration and G-RNTI in the MBS session information along with configurations generated by the CU, such as a PDCP configuration and DRX configuration. In some scenarios, the CU sends the MBS session information to the DU, to enable the DU to generate and send the MBS broadcast configuration message to the UE. Alternatively, the CU can generate the MBS broadcast configuration message including the MBS session information and send the MBS broadcast configuration message to the DU for forwarding to the UE.

As noted above, the MBS broadcast configuration message may include MBS session information for more than one MBS session. To request resources for a second MBS session, the CU can send a second CU-to-DU message identifying a second MBS session to the DU, or the CU can send a single CU-to-DU message identifying both a first MBS session and a second MBS session. The DU can then send an MBS broadcast configuration information including both first and second MBS session information for the first and second MBS sessions, respectively. In the event that the CU determines to suspend or release resources for the first MBS session (e.g., in response to a request from the CN), the CU send a request to the DU. In response, the DU can stop transmitting the first MBS session information, and instead transmit an MBS broadcast configuration message excluding the first MBS session information and including the second MBS session information. The CU can also request that the DU modify the resources for an MBS session, in which case the DU can update the MBS session information for the MBS session accordingly, and transmit an MBS broadcast configuration message including the updated MBS session information.

One example embodiment of these techniques is a method implemented in a DU of a distributed base station including a CU and the DU for configuring a UE to receive MBS. The method can be executed by processing hardware and includes: receiving, from the CU, a CU-to-DU message identifying an MBS session and requesting that the DU configure resources for the MBS session; and transmitting, to the UE in response to receiving the CU-to-DU message, configuration parameters for receiving the MBS session.

Another example embodiment of these techniques is a method implemented in a CU of a distributed base station including the CU and the DU for configuring a UE to receive MBS. The method can be executed by processing hardware and includes: receiving, from a core network (CN), a CN-to-BS message requesting that the distributed base station configure resources for an MBS session; and transmitting, to the DU, a CU-to-DU message identifying the MBS session, to cause the DU to transmit, to the UE, configuration parameters for receiving the MBS session.

Yet another example embodiment of these techniques is a network node including processing hardware and configured to implement any one of the above methods.

DETAILED DESCRIPTION OF THE DRAWINGS

Generally speaking, a RAN and/or a CN implement the techniques of this disclosure to manage transmission of multicast and/or broadcast services (MBS). A CN can request that a base station configure a common downlink (DL) tunnel via which the CN can transmit MBS data for an MBS session to the base station, for multiple UEs. In response to the request, the base station transmits a configuration of the common DL tunnel to the CN. The configuration can include transport-layer information such as an Internet Protocol (IP) address and a tunnel identifier (e.g., a Tunnel Endpoint Identifier (TEID)).

The base station can also configure one or more logical channels toward the UEs, and/or one or more MBS radio bearers (MRBs) associated with the MBS session, where there may be a one-to-one mapping between each logical channel and each MRB. After receiving MBS data for the MBS session via the common DL tunnel, the base station can transmit the MBS data via the one or more logical channels to one or more UEs that have joined the MBS session. In some implementations, the base station transmits MBS data to multiple UEs via a single logical channel. Further, if there are multiple quality-of-service (QoS) flows for the MBS session, a single logical channel may be associated with the multiple QoS flows, or there may be a one-to-one mapping between each QoS flow and each logical channel.

The CN can cause the base station to configure the common DL tunnel before or after a UE joins the MBS session. If additional UEs join the MBS session after the tunnel is configured, the CN can utilize the same common DL tunnel to transmit MBS data, for the multiple UEs, to the base station.

Figure 1A:
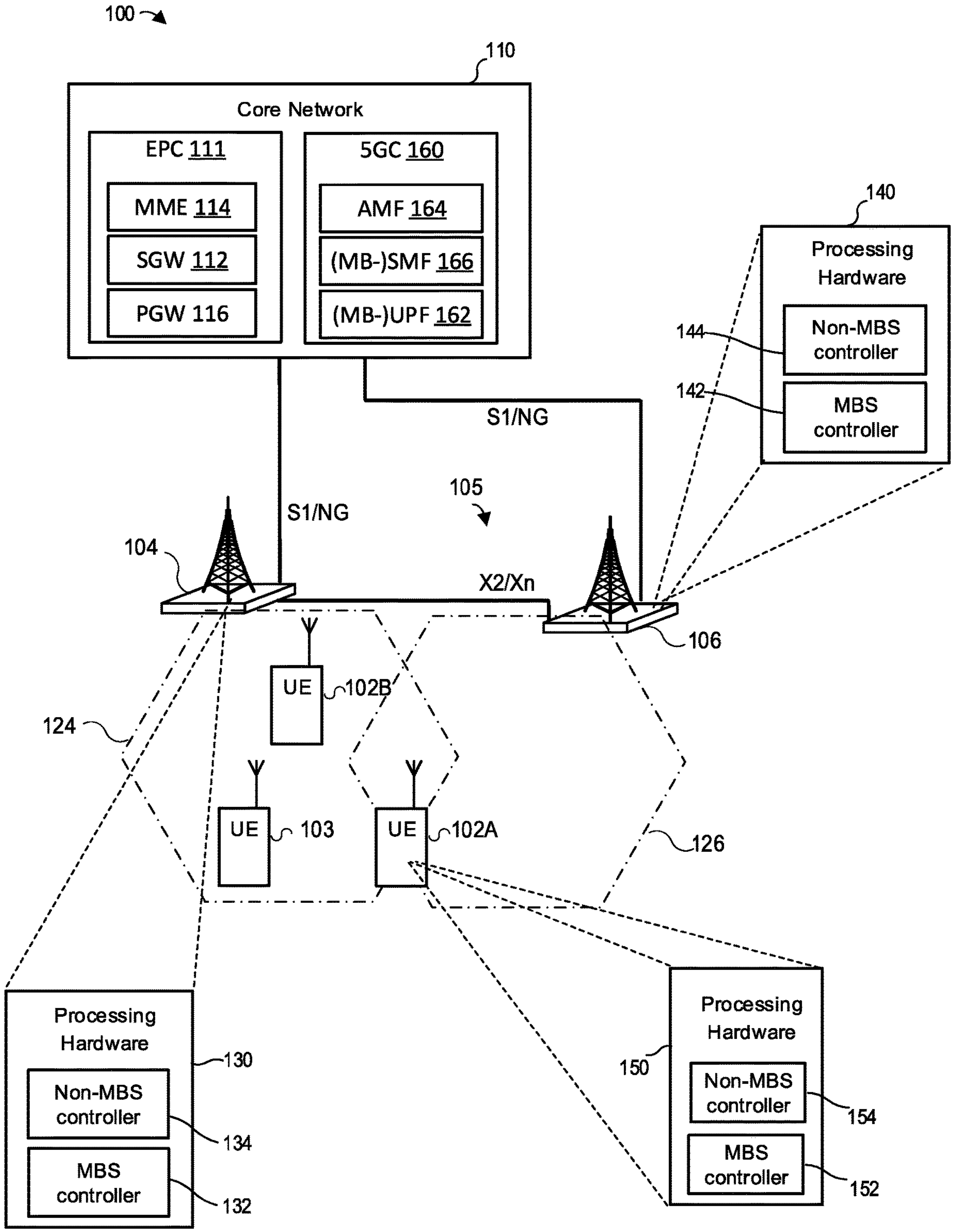
FIG. 1A is a block diagram of an example system in which the techniques of this disclosure for managing resources for MBS can be implemented.

FIG. 1A depicts an example wireless communication system 100 in which techniques of this disclosure for managing transmission and reception of multicast and/or broadcast services (MBS) information can be implemented. The wireless communication system 100 includes user equipment (UEs) 102A, 102B, 103, as well as base stations 104, 106 of a radio access network (RAN) 105 connected to a core network (CN) 110. To ease readability, UE 102 is used herein to represent the UE 102A, the UE 102B, or both the UE 102A and the UE 102B, unless otherwise specified. In other implementations or scenarios, the wireless communication system 100 may instead include more or fewer UEs, and/or more or fewer base stations, than are shown in FIG. 1A. The base stations 104, 106 can be of any suitable type, or types, of base stations, such as an evolved node B (eNB), a next-generation eNB (ng-eNB), or a 5G Node B (gNB), for example. As a more specific example, the base station 104 may be an eNB or a gNB, and the base station 106 may be a gNB.

The base station 104 supports a cell 124, and the base station 106 supports a cell 126. The cell 124 partially overlaps with the cell 126, so that the UE 102A can be in range to communicate with base station 104 while simultaneously being in range to communicate with the base station 106 (or in range to detect or measure signals from the base station 106). The overlap can make it possible for the UE 102A to hand over between the cells (e.g., from the cell 124 to the cell 126) or base stations (e.g., from the base station 104 to the base station 106) before the UE 102A experiences radio link failure, for example. Moreover, the overlap allows the various dual connectivity (DC) scenarios. For example, the UE 102A can communicate in DC with the base station 104 (operating as a master node (MN)) and the base station 106 (operating as a secondary node (SN)). When the UE 102A is in DC with the base station 104 and the base station 106, the base station 104 operates as a master eNB (MeNB), a master ng-eNB (Mng-eNB), or a master gNB (MgNB), and the base station 106 operates as a secondary gNB (SgNB) or a secondary ng-eNB (Sng-eNB).

In non-MBS (unicast) operation, the UE 102A can use a radio bearer (e.g., a DRB or an SRB)) that at different times terminates at an MN (e.g., the base station 104) or an SN (e.g., the base station 106). For example, after handover or SN change to the base station 106, the UE 102A can use a radio bearer (e.g., a DRB or an SRB) that terminates at the base station 106. The UE 102A can apply one or more security keys when communicating on the radio bearer, in the uplink (from the UE 102A to a base station) and/or downlink (from a base station to the UE 102A) direction. In non-MBS operation, the UE 102A transmits data via the radio bearer on (i.e., within) an uplink (UL) bandwidth part (BWP) of a cell to the base station, and/or receives data via the radio bearer on a downlink (DL) BWP of the cell from the base station. The UL BWP can be an initial UL BWP or a dedicated UL BWP, and the DL BWP can be an initial DL BWP or a dedicated DL BWP. The UE 102A can receive paging, system information, public warning message(s), or a random access response on the DL BWP. In this non-MBS operation, the UE 102A can be in a connected state. Alternatively, the UE 102A can be in an idle or inactive state if the UE 102A supports small data transmission in the idle or inactive state.

In MBS operation, the UE 102A can use an MBS radio bearer (MRB) that at different times terminates at an MN (e.g., the base station 104) or an SN (e.g., the base station 106). For example, after handover or SN change, the UE 102A can use an MRB that terminates at the base station 106, which can be operating as an MN or SN. In some scenarios, a base station (e.g., the MN or SN) can transmit MBS data over unicast radio resources (i.e., the radio resources dedicated to the UE 102A) to the UE 102A via the MRB. In other scenarios, the base station (e.g., the MN or SN) can transmit MBS data over multicast radio resources (i.e., the radio resources common to the UE 102A and one or more other UEs), or a DL BWP of a cell from the base station to the UE 102A via the MRB. The DL BWP can be an initial DL BWP, a dedicated DL BWP, or an MBS DL BWP (i.e., a DL BWP that is specific to MBS, or not for unicast).

The base station 104 includes processing hardware 130, which can include one or more general-purpose processors (e.g., central processing units (CPUs)) and a computer-readable memory storing machine-readable instructions executable on the one or more general-purpose processor(s), and/or special-purpose processing units. The processing hardware 130 in the example implementation of FIG. 1A includes an MBS controller 132 that is configured to manage or control transmission of MBS information received from the CN 110 or an edge server. For example, the MBS controller 132 can be configured to support radio resource control (RRC) configurations, procedures and messaging associated with MBS procedures, and/or other operations associated with those configurations and/or procedures, as discussed below. The processing hardware 130 can also include a non-MBS controller 134 that is configured to manage or control one or more RRC configurations and/or RRC procedures when the base station 104 operates as an MN or SN during a non-MBS operation.

The base station 106 includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes an MBS controller 142 and a non-MBS controller 144, which may be similar to the controllers 132 and 134, respectively, of base station 130. Although not shown in FIG. 1A, the RAN 105 can include additional base stations with processing hardware similar to the processing hardware 130 of the base station 104 and/or the processing hardware 140 of the base station 106.

The UE 102A includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes an MBS controller 152 that is configured to manage or control reception of MBS information. For example, the UE MBS controller 152 can be configured to support RRC configurations, procedures and messaging associated with MBS procedures, and/or other operations associated with those configurations and/or procedures, as discussed below. The processing hardware 150 can also include a non-MBS controller 154 configured to manage or control one or more RRC configurations and/or RRC procedures in accordance with any of the implementations discussed below, when the UE 102A communicates with an MN and/or an SN during a non-MBS operation. Although not shown in FIG. 1A, the UE 102B and the UE 103 may include processing hardware similar to the processing hardware 150 of the UE 102A.

The CN 110 may be an evolved packet core (EPC) 111 or a fifth-generation core (5GC) 160, both of which are depicted in FIG. 1A. The base station 104 may be an eNB supporting an S1 interface for communicating with the EPC 111, an ng-eNB supporting an NG interface for communicating with the 5GC 160, or a gNB that supports an NR radio interface as well as an NG interface for communicating with the 5GC 160. The base station 106 may be an EUTRA-NR DC (EN-DC) gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104 and 106 may support an X2 or Xn interface.

Among other components, the EPC 111 can include a serving gateway (SGW) 112, a mobility management entity (MME) 114, and a packet data network gateway (PGW) 116. The SGW 112 is generally configured to transfer user-plane packets related to audio calls, video calls, Internet traffic, etc., and the MME 114 is configured to manage authentication, registration, paging, and other related functions. The PGW 116 provides connectivity from a UE (e.g., UE 102A or 102B) to one or more external packet data networks, e.g., an Internet network and/or an Internet Protocol (IP) Multimedia Subsystem (IMS) network. The 5GC 160 includes a user plane function (UPF) 162 and an access and mobility management function (AMF) 164, and/or a session management function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

The UPF 162, AMF 164, and/or SMF 166 can be configured to support MBS. For example, the SMF 166 can be configured to manage or control MBS transport, configure the UPF 162 and/or RAN 105 for MBS flows, and/or manage or configure one or more MBS sessions or PDU sessions for MBS for a UE (e.g., UE 102A or 102B). The UPF 162 is configured to transfer MBS data packets to audio, video, Internet traffic, etc. to the RAN 105. The UPF 162 and/or SMF 166 can be configured for both non-MBS unicast services and MBS, or for MBS only, as denoted by the prefix "(MB-)" shown in FIG. 1A.

Generally, the wireless communication system 100 may include any suitable number of base stations supporting NR cells and/or EUTRA cells. More particularly, the EPC 111 or the 5GC 160 may be connected to any suitable number of base stations supporting NR cells and/or EUTRA cells. Although the examples below refer specifically to specific CN types (EPC, 5GC) and radio access technology (RAT) types (5G NR and EUTRA), in general the techniques of this disclosure can also apply to other suitable radio access and/or core network technologies, such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, and the base station 106 can operate as an SgNB or an Sng-eNB. The UE 102A can communicate with the base station 104 and the base station 106 via the same RAT, such as EUTRA or NR, or via different RATs.

When the base station 104 is an MeNB and the base station 106 is an SgNB, the UE 102A can be in EN-DC with the MeNB 104 and the SgNB 106. When the base station 104 is an Mng-eNB and the base station 106 is an SgNB, the UE 102A can be in next generation (NG) EUTRA-NR DC (NGEN-DC) with the Mng-eNB 104 and the SgNB 106. When the base station 104 is an MgNB and the base station 106 is an SgNB, the UE 102A can be in NR-NR DC (NR-DC) with the MgNB 104 and the SgNB 106. When the base station 104 is an MgNB and the base station 106 is an Sng-eNB, the UE 102A can be in NR-EUTRA DC (NE-DC) with the MgNB 104 and the Sng-eNB 106.

Figure 1B:
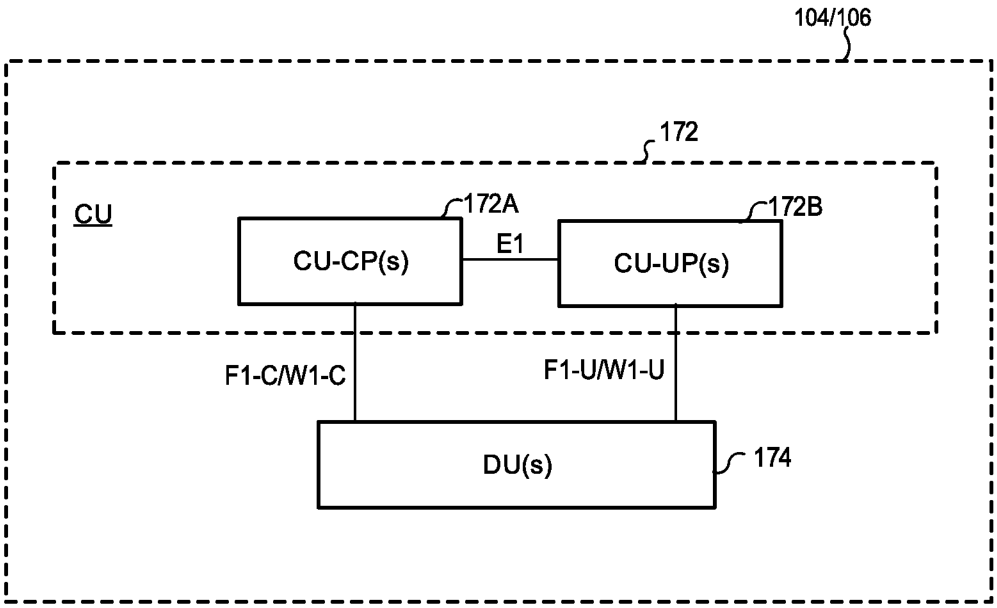
FIG. 1B is a block diagram of an example base station in which a central unit (CU) and a distributed unit (DU) can operate in the system of FIG. 1A.

FIG. 1B depicts an example distributed implementation of any one or more of the base stations 104 and 106. In this implementation, the base station 104, 106 includes a central unit (CU) 172 and one or more distributed units (DUs) 174. In implementations where the base station 104, 106 includes multiple DUs, the terms DU 174A and 174B may be used, respectively, to refer to a first DU and a second DU of the multiple DUs. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include some or all of the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 104) operates as an MN or an SN. The processing hardware can also include a physical (PHY) layer controller configured to manage or control one or more PHY layer operations or procedures.

In some implementations, the CU 172 can include one or more logical nodes (CU-CP(s) 172A) that host the control plane part of the Packet Data Convergence Protocol (PDCP) protocol of the CU 172 and/or the radio resource control (RRC) protocol of the CU 172. The CU 172 can also include one or more logical nodes (CU-UP(s) 172B) that host the user plane part of the PDCP protocol and/or service data adaptation protocol (SDAP) protocol of the CU 172. The CU-CP(s) 172A can transmit non-MBS control information and MBS control information, and the CU-UP(s) 172B can transmit non-MBS data packets and MBS data packets, as described herein.

The CU-CP(s) 172A can be connected to multiple CU-UPs 172B through the E1 interface. The CU-CP(s) 172A select the appropriate CU-UP(s) 172B for the requested services for the UE 102A. In some implementations, a single CU-UP 172B can be connected to multiple CU-CPs 172A through the E1 interface. A CU-CP 172A can be connected to one or more DUs 174*s* through an F1-C interface. A CU-UP 172B can be connected to one or more DUs 174 through an F1-U interface under the control of the same CU-CP 172A. In some implementations, one DU 174 can be connected to multiple CU-UPs 172B under the control of the same CU-CP 172A. In such implementations, the connectivity between a CU-UP 172B and a DU 174 is established by the CU-CP 172A using bearer context management functions.

Figure 2A:
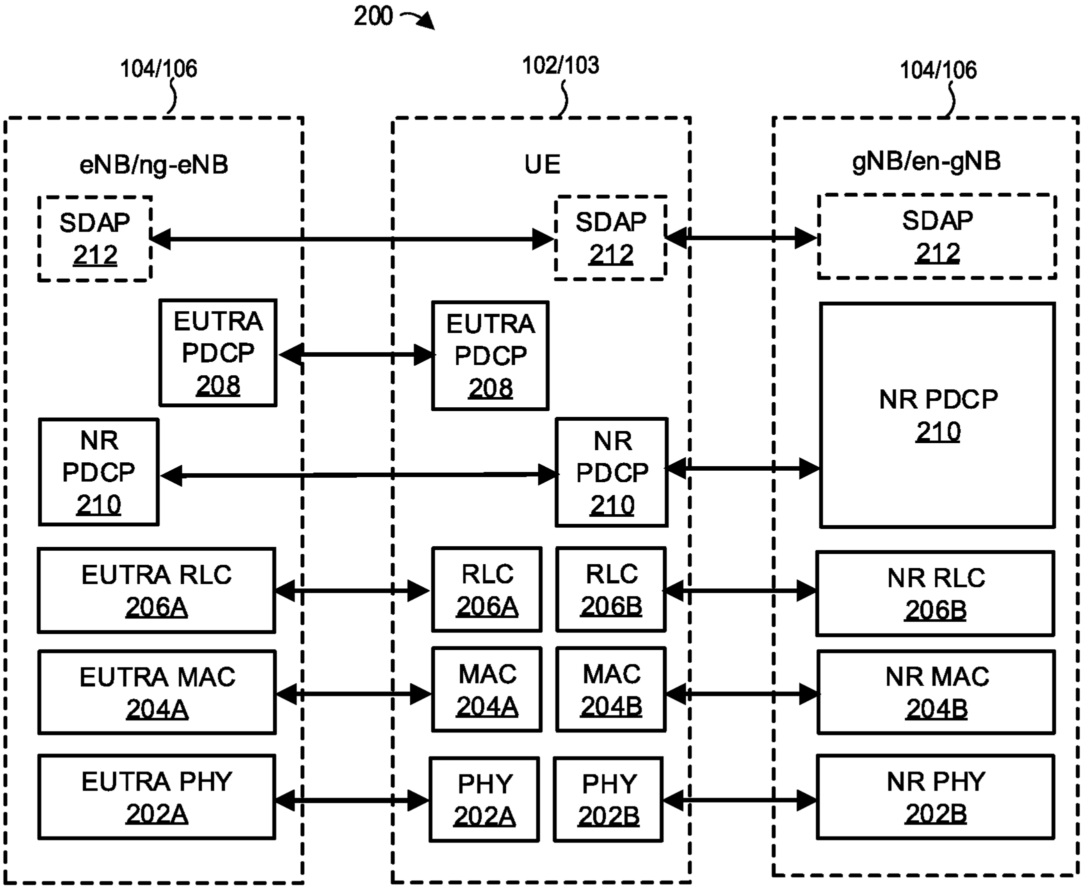
FIG. 2A is a block diagram of an example protocol stack according to which the UE of FIG. 1A can communicate with base stations of FIG. 1A.

FIG. 2A illustrates, in a simplified manner, an example protocol stack 200 according to which a UE (e.g., UE 102A, 102B, or 103) can communicate with an eNB/ng-eNB or a gNB (e.g., one or more of the base stations 104, 106). In the example protocol stack 200, a PHY sublayer 202A of EUTRA provides transport channels to an EUTRA MAC sublayer 204A, which in turn provides logical channels to an EUTRA RLC sublayer 206A. The EUTRA RLC sublayer 206A in turn provides RLC channels to an EUTRA PDCP sublayer 208 and, in some cases, to an NR PDCP sublayer 210. Similarly, an NR PHY 202B provides transport channels to an NR MAC sublayer 204B, which in turn provides logical channels to an NR RLC sublayer 206B. The NR RLC sublayer 206B in turn provides RLC channels to an NR PDCP sublayer 210. The UE, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE can support layering of NR PDCP 210 over EUTRA RLC 206A, and an SDAP sublayer 212 over the NR PDCP sublayer 210. Sublayers are also referred to herein as simply "layers."

The EUTRA PDCP sublayer 208 and the NR PDCP sublayer 210 receive packets (e.g., from an IP layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets." The packets can be MBS packets or non-MBS packets. MBS packets may include application content for an MBS service (e.g., IPv4/IPv6 multicast delivery, IPTV, software delivery over wireless, group communications, IoT applications, V2X applications, and/or emergency messages related to public safety), for example. As another example, MBS packets may include application control information for the MBS service.

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 may be SDAP PDUs, IP packets, or Ethernet packets, for example.

In scenarios where the UE operates in EN-DC with the base station 104 operating as an MeNB and the base station 106 operating as an SgNB, the wireless communication system 100 can provide the UE with an MN-terminated bearer that uses EUTRA PDCP sublayer 208, or an MN-terminated bearer that uses NR PDCP sublayer 210. The wireless communication system 100 in various scenarios can also provide the UE with an SN-terminated bearer, which uses only the NR PDCP sublayer 210. The MN-terminated bearer may be an MCG bearer, a split bearer, or an MN-terminated SCG bearer. The SN-terminated bearer may be an SCG bearer, a split bearer, or an SN-terminated MCG bearer. The MN-terminated bearer may be an SRB (e.g., SRB1 or SRB2) or a DRB. The SN-terminated bearer may be an SRB or a DRB.

In some implementations, a base station (e.g., base station 104, 106) broadcasts MBS data packets via one or more MBS radio bearers (MRB(s)), and in turn the UE receives the MBS data packets via the MRB(s). The base station can include configuration(s) of the MRB(s) in multicast configuration parameters (which can also be referred to as MBS configuration parameters) described below. In some implementations, the base station broadcasts the MBS data packets via RLC sublayer 206, MAC sublayer 204, and PHY sublayer 202, and correspondingly, the UE uses PHY sublayer 202, MAC sublayer 204, and RLC sublayer 206 to receive the MBS data packets. In such implementations, the base station and the UE might or might not use PDCP sublayer 208 and a SDAP sublayer 212 to communicate the MBS data packets. In other implementations, the base station transmits the MBS data packets via PDCP sublayer 208, RLC sublayer 206, MAC sublayer 204, and PHY sublayer 202, and correspondingly, the UE uses PHY sublayer 202, MAC sublayer 204, RLC sublayer 206 and PDCP sublayer 208 to receive the MBS data packets. In such implementations, the base station and the UE might or might not use a SDAP sublayer 212 to communicate the MBS data packets. In yet other implementations, the base station transmits the MBS data packets via the SDAP sublayer 212, PDCP sublayer 208, RLC sublayer 206, MAC sublayer 204, and PHY sublayer 202 and, correspondingly, the UE uses the PHY sublayer 202, MAC sublayer 204, RLC sublayer 206, PDCP sublayer 208, and SDAP sublayer 212 to receive the MBS data packets.

Figure 2B:
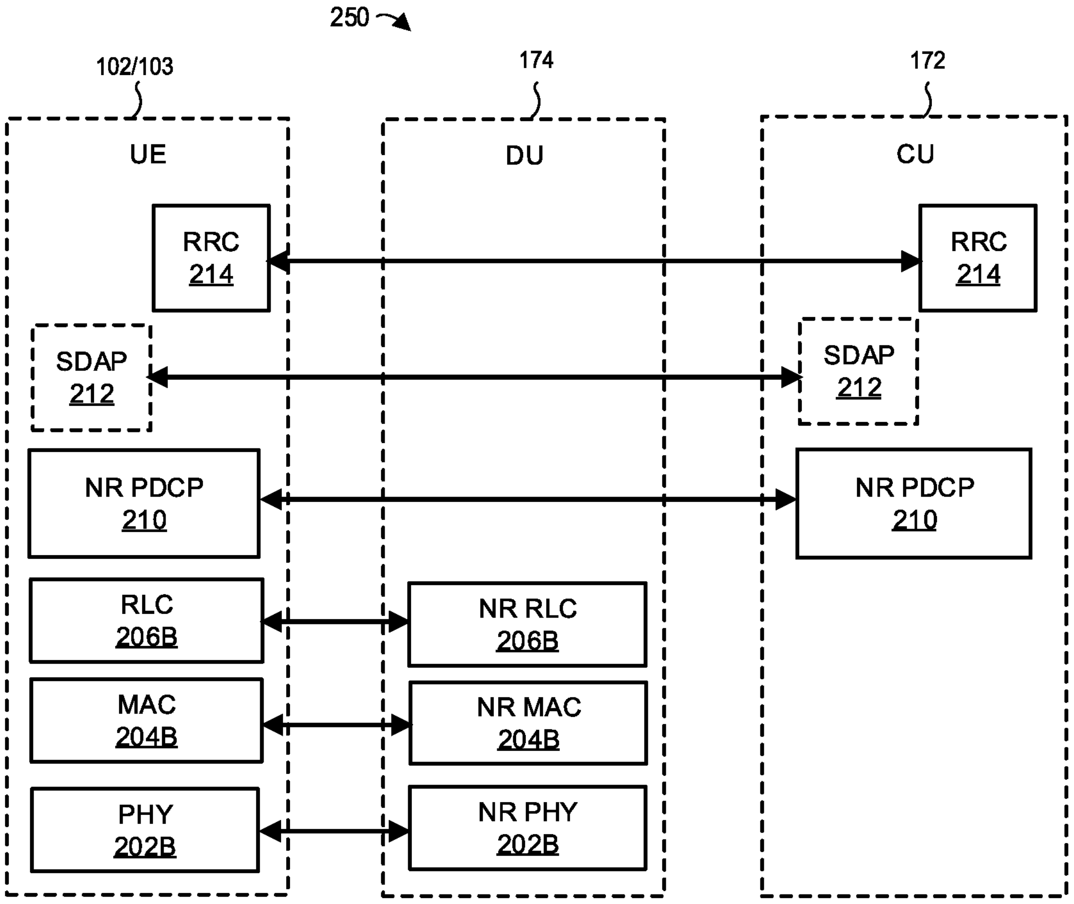
FIG. 2B is a block diagram of an example protocol stack according to which the UE of FIG. 1A can communicate with a DU and a CU of a base station.

FIG. 2B illustrates, in a simplified manner, an example protocol stack 250, which the UE 102 or UE 103 can communicate with a DU (e.g., DU 174) and a CU (e.g., CU 172). The radio protocol stack 200 is functionally split as shown by the radio protocol stack 250 in FIG. 2B. The CU at any of the base stations 104 or 106 can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU. To support connection to a 5GC, NR PDCP 210 provides SRBs to RRC 214, and NR PDCP 210 provides DRBs to SDAP 212 and SRBs to RRC 214.

Figure 3:
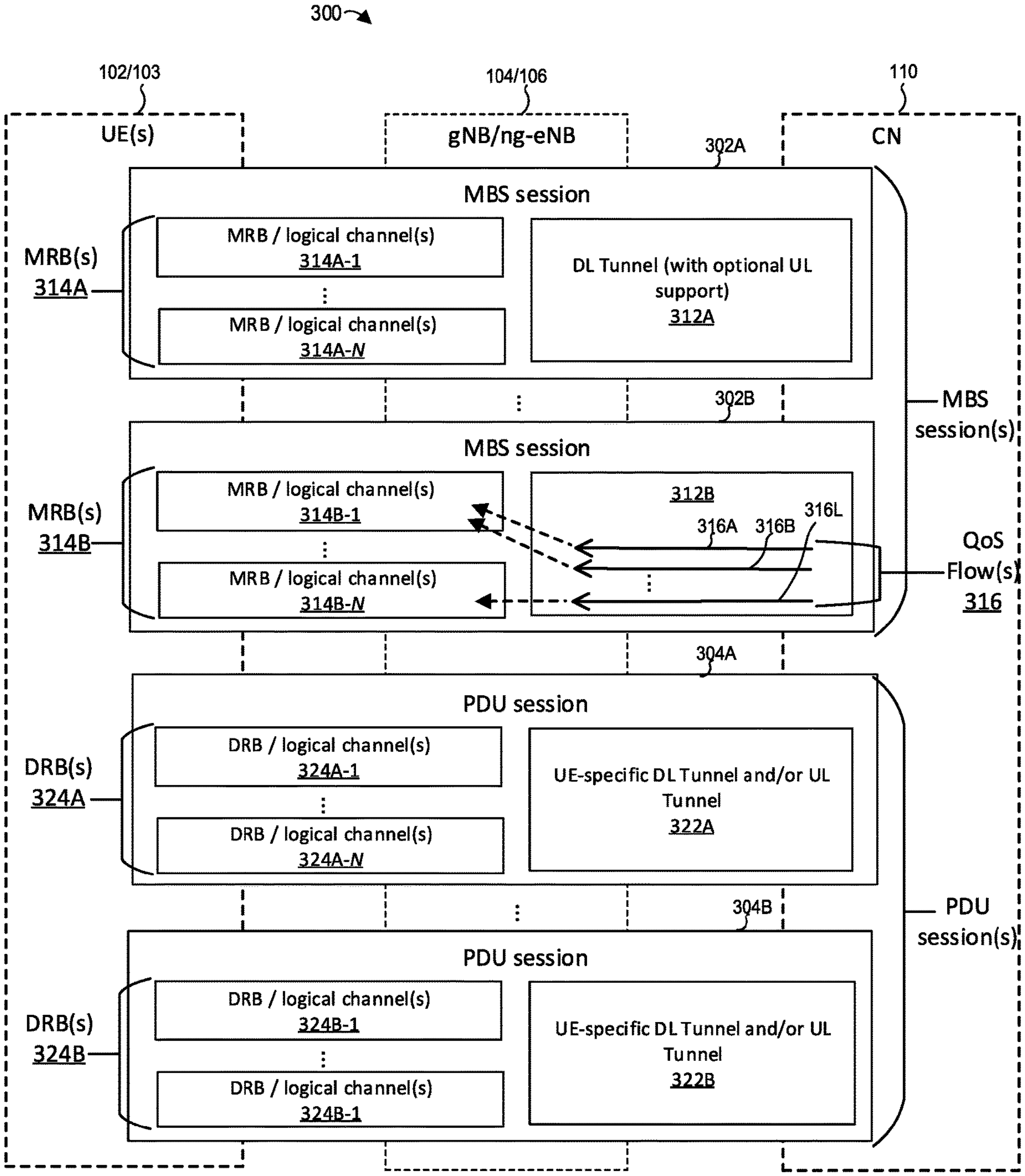
FIG. 3 is a block diagram illustrating example tunnel architectures for MBS sessions and PDU sessions.

Referring to FIG. 3, an MBS session 302A can include a tunnel 312A with endpoints at the CN 110 and the base station 104/106. The MBS session 302A can correspond to a certain session ID such as a Temporary Mobile Group Identity (TMGI), for example. The MBS data can include IP packets, TCP/IP packets, UDP/IP packets, Real-Time Transport Protocol (RTP)/UDP/IP packets, or RTP/TCP/IP packets, for example.

In some cases, the CN 110 and/or the base station 104/106 configure the tunnel 312A only for MBS traffic directed from the CN 110 to the base station 104/106, and the tunnel 312A can be referred to as a downlink (DL) tunnel. In other cases, however, CN 110 and the base station 104/106 use the tunnel 312A for downlink as well as for uplink (UL) MBS traffic to support, for example, commands or service requests from the UEs. Further, because the base station 104/106 can direct MBS traffic arriving via the tunnel 312A to multiple UEs, the tunnel 312A can be referred to as a common tunnel or a common DL tunnel.

The tunnel 312A can operate at the transport layer or sublayer, e.g., on the User Datagram Protocol (UDP) protocol layered over Internet Protocol (IP). As a more specific example, the tunnel 312A can be associated with the General Packet Radio System (GPRS) Tunneling Protocol (GTP). The tunnel 312A can correspond to a certain IP address (e.g., an IP address of the base station 104/106) and a certain Tunnel Endpoint Identifier (TEID) (e.g., assigned by the base station 104/106), for example. More generally, the tunnel 312A can have any suitable transport-layer configuration. The CN 110 can specify the IP address and the TEID address in header(s) of a tunnel packet including an MBS data packet and transmit the tunnel packet downstream to the base station 104/106 via the tunnel 312A. The header(s) can include the IP address and/or the TEID. For example, the header(s) includes an IP header and a GTP header including the IP address and the TEID, respectively. The base station 104/106 accordingly can identify data packets traveling via the tunnel 312A using the IP address and/or the TEID.

As illustrated in FIG. 3, the base station 104/106 maps traffic in the tunnel 312A to N radio bearers 314A-1, 314A-2, . . . 314A-N, which may be configured as MBS radio bearers or MRBs, where N≥1. Each MRB can correspond to a respective logical channel. As discussed above, the PDCP sublayer provides support for radio bearers such as SRBs, DRBs, and MRBs, and a EUTRA or NR MAC sublayer provides logical channels to a EUTRA or NR RLC sublayer. Each of the MRBs 314A for example can correspond to a respective MBS Traffic Channel (MTCH). The base station 104/106 and the CN 110 can also maintain another MBS session 302B, which similarly can include a tunnel 312B corresponding to MRBs 314B-1, 314B-2, . . . 314B-N, where N≥1. Each of the MRBs 314B can correspond to a respective logical channel.

The MBS traffic can include one or multiple quality-of-service (QoS) flows, for each of the tunnels 312A, 312B, etc. For example, the MBS traffic on the tunnel 312B can include a set of flows 316 including QoS flows 316A, 316B, . . .

316L. Further, a logical channel of an MRB can support a single QoS flow or multiple QoS flows. In the example configuration of FIG. 3, the base station 104/106 maps the QoS flows 316A and 316B to the MTCH of the MRB 314B-1, and the QoS flow 316L to the MTCH of the MRB 314B-N.

In various scenarios, the CN 110 can assign different types of MBS traffic to different QoS flows. A flow with a relatively high QoS value can correspond to audio packets, and a flow with a relatively low QoS value can correspond to video packets, for example. As another example, a flow with a relatively high QoS value can correspond to I-frames or complete images used in video compression, and a flow with a relatively low QoS value can correspond to P-frames or predicted pictures that include only changes to I-frames.

With continued reference to FIG. 3, the base station 104/106 and the CN 110 can maintain one or more PDU sessions to support unicast traffic between the CN 110 and particular UEs. A PDU session 304A can include a UE-specific DL tunnel and/or UE-specific UL tunnel 322A corresponding to one or more DRBs 324A, such as a DRB 324A-1, 324A-2, . . . 324-N. Each of the DRBs 324A can correspond to a respective logical channel, such as a Dedicated Traffic Channel (DTCH). The base station 104/106 and the CN 110 can also maintain one or more other PDU sessions to support unicast traffic between the CN 110 and particular UEs. For example, PDU session 304B can include a UE-specific DL tunnel and/or UE-specific UL tunnel 322B corresponding to one or more DRBs 324B, such as a DRB 324B-1, 324B-2, . . . 324B-N. Each of the DRBs 324B can correspond to a respective logical channel, such as a DTCH.

Figure 4:
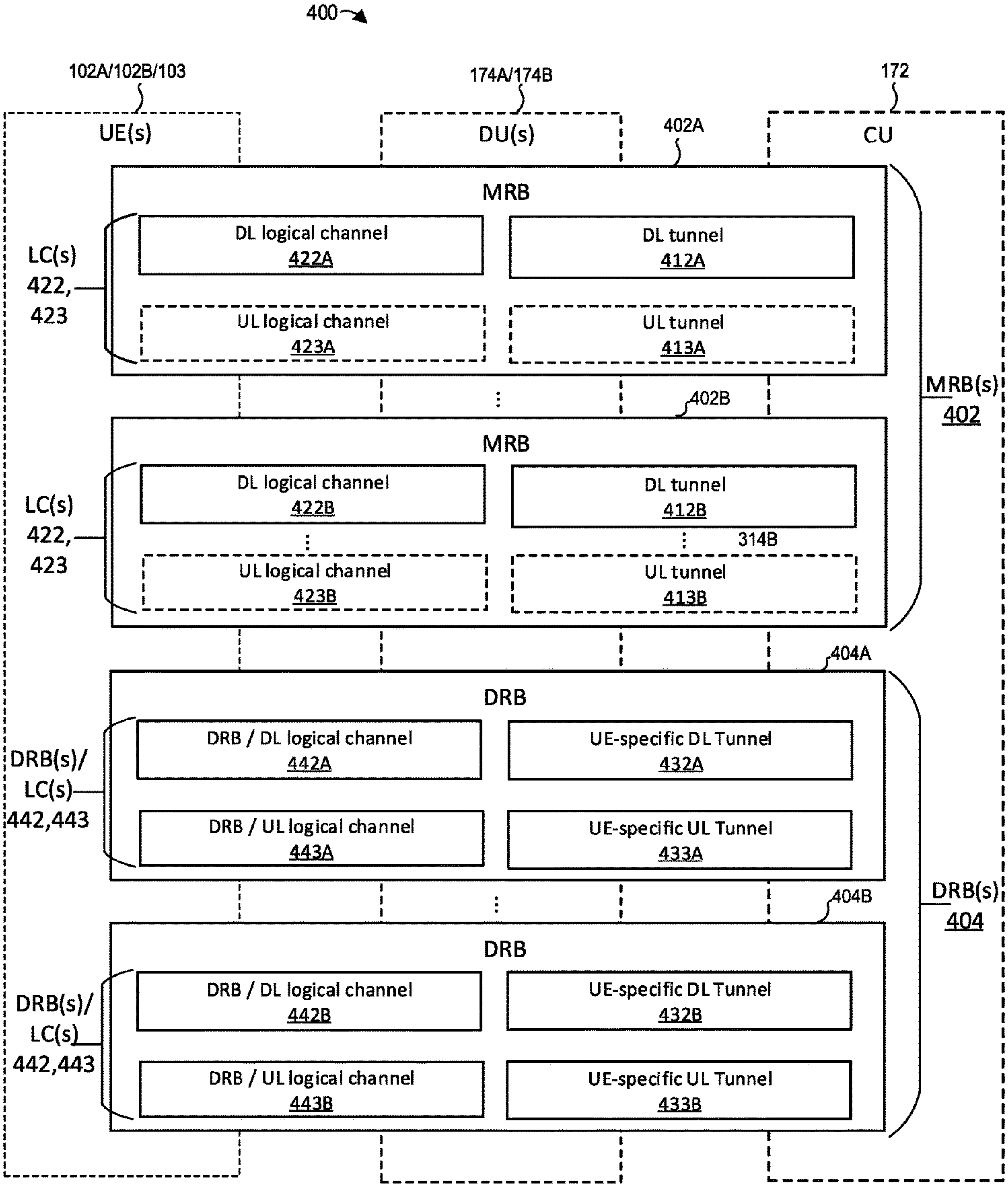
FIG. 4 is a block diagram illustrating example MRBs and DRBs which a distributed base station can configure for communicating multicast, broadcast, and/or unicast traffic with UEs.

Now referring to FIG. 4, when the base station 104/106 is implemented in a distributed manner, one or more DUs 174A/174B can be associated with the CU 172. The CU 172 and the DU(s) 174A/174B can establish tunnels for downlink data and/or uplink data associated with an MRB or a DRB. The MRB 314A-1 discussed above can be implemented as an MRB 402A connecting the CU 172 to multiple UEs such as the UE 102A and 102B, for example. The MRB 402A can include a DL tunnel 412A connecting the CU 172 and the DU(s) 174A/174B, and a DL logical channel 422A corresponding to the DL tunnel 412A. In particular, the DU(s) 174A/174B can map downlink traffic received via the DL tunnel 412A to the DL logical channel 422A, which can be an MTCH or a DTCH, for example. The DL tunnel 412A can be a common DL tunnel via which the CU 172 transmits MBS data packets to multiple UEs. Alternatively, the DL tunnel 412A can be a UE-specific DL tunnel via which the CU 172 transmits MBS data packets to a particular UE.

Optionally, the MRB 402A also includes a UL tunnel 413A connecting the CU 172 and the DU(s) 174A/174B, and a UL logical channel 423A corresponding to the UL tunnel 413A. The UL logical channel 423A can be a PUCCH, for example. The DU(s) 174A/174B can map uplink traffic received via the UL logical channel 423A to the UL tunnel 413A.

The tunnels 412A and 413A can operate at the transport layer or sublayer of the F1-U interface. As a more specific example, the CU 172 and the DU(s) 174A/174B can utilize an F1-U for user-plane traffic, and the tunnels 412A and 413A can be associated with the GTP-U protocol layered over UDP/IP, where IP is layered over suitable data link and physical (PHY) layers. Further, the MRB(s) 402 and/or the DRB(s) 404 in at least some of the cases additionally support control-plane traffic. More particularly, the CU 172 and the DU(s) 174A/174B can exchange F1-AP messages over an F1-C interface that relies on a Stream Control Transmission Protocol (SCTP) layered over IP, where IP is layered over suitable data link and PHY layers similar to F1-U.

Similarly, an MRB 402B can include a DL tunnel 412B and, optionally, an UL tunnel 413B. The DL tunnel 412B can correspond to a DL logical channel 422B, and the UL tunnel 413B can correspond to the UL logical channel 423B.

The CU 172 in some cases uses a DRB 404A to transmit MBS data packets or unicast data packets associated with a PDU session, to a particular UE (e.g., the UE 102A or the UE 102B). The DRB 404A can include a UE-specific DL tunnel 432A connecting the CU 172 and the DU(s) 174A/174B, and a DL logical channel 442A corresponding to the DL tunnel 432A. In particular, the DU(s) 174A/174B can map downlink traffic received via the DL tunnel 432A to the DL logical channel 442A, which can be a DTCH, for example. The DRB 404A further includes a UE-specific UL tunnel 433A connecting the CU 172 and the DU(s) 174A/174B, and a UL logical channel 443A corresponding to the UL tunnel 433A. The UL logical channel 443A can be a PUSCH, for example. The DU(s) 174A/174B can map uplink traffic received via the UL logical channel 443A to the UL tunnel 433A.

Similarly, a DRB 404B can include a UE-specific DL tunnel 432B corresponding to a DL logical channel 442B, and a UE-specific UL tunnel 433B corresponding to a UL logical channel 443B.

In some implementations, a DU (e.g., the DU 174A/174B) assigns a particular logical channel ID (value) for each of the logical channel(s) associated with the MRB(s) associated with the same MBS session or different MBS sessions. In other implementations, the DU assigns the same logical channel ID (value) for each of the logical channel(s) associated with the MRB(s) associated with different MBS sessions. In some implementations, the DU assigns a particular logical channel ID (value) for each of the logical channel(s) associated with the DRB(s). In some implementations, the DU sets logical channel IDs associated with the MRB(s) and DRB(s) respectively to different values. In other implementations, the DU sets logical channel IDs associated with the MRB(s) and DRB(s) respectively to the same values.

Next, several example scenarios in which the base station 104, including a CU 172 and a DU 174, configures resources for transmitting MBS data of an MBS session (i.e., a broadcast MBS session) are discussed with reference to FIGS. 5A-5I. Generally speaking, similar events in FIGS. 5A-5I are labeled with the same reference numbers, with differences discussed below where appropriate.

Figure 5A:
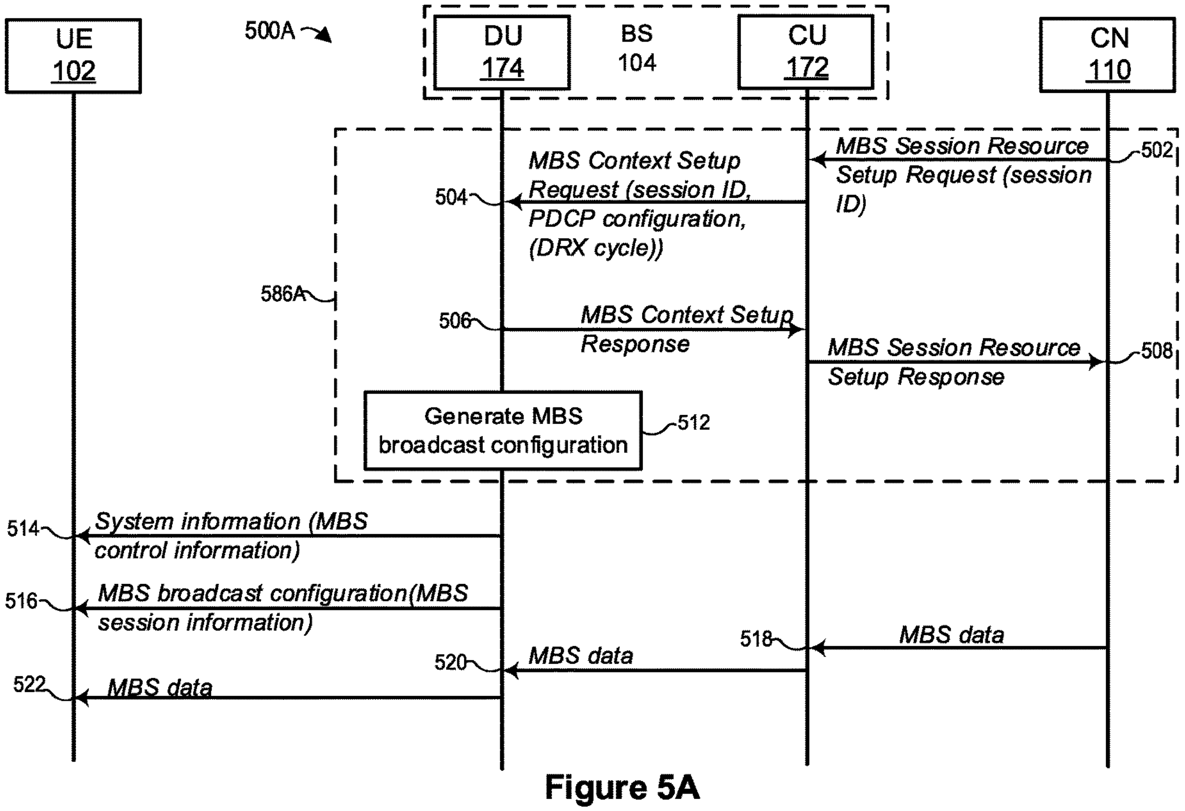
FIG. 5A is a messaging diagram of an example scenario in which a CN and a distributed base station configure resources for transmitting MBS data of an MBS session via broadcast to multiple UEs, where a DU generates MBS session information using a Packet Data Convergence Protocol (PDCP) configuration received from a CU in an MBS Context Setup Request message, and broadcasts the MBS session information in an MBS broadcast configuration message.

Referring first to FIG. 5A, in the scenario 500A, the DU 174 generates MBS session information using a PDCP configuration received from the CU 172. In the scenario 500A, the base station 104 broadcasts a certain MBS session (i.e., a first MBS session identified by a first MBS session ID). Initially, the CN 110 can send 502 an MBS Session Resource Setup Request message including the first MBS session ID to the CU 172 to request the CU 172 to configure resources for the first MBS session. In some implementations, the CN 110 excludes a PDU session ID from the MBS Session Resource Setup Request message. In response, the CU 172 can send 504 an MBS Context Setup Request message to the DU 174 to request a setup for an MBS context and/or a common DL tunnel for the first MBS session. In the MBS Context Setup Request message, the CU 172 includes the first Session ID and first PDCP configuration(s) for the first MBS session. The CU 172 generates the first PDCP configuration(s) to transmit MBS data of the first MBS session. Later in time, the CU 172 transmits MBS data of the first MBS session in accordance with the first PDCP configuration(s), as described for event 522. In some implementations, each of the first PDCP configuration (s) includes at least one of a PDCP sequence number size (e.g., 12 bits) and a header compression configuration. The header compression configuration can configure one or more header compression profiles or no header compression.

In some implementations, the CU 172 can include a first Discontinuous Reception (DRX) cycle configuration for the first MBS session in the MBS Context Setup Request message. The first DRX cycle configuration includes or configures a first DRX cycle length. In some implementations, the CU 172 can determine the first DRX cycle length in accordance with the QoS configuration(s). In other implementations, the CU 172 can receive 502 the first DRX cycle length in the MBS Session Resource Setup Request message. In some implementations, the CU 172 excludes a PDU session ID from the MBS Context Setup Request message.

In some implementations, the CU 172 can additionally include first MBS neighbor cell information in the MBS Context Setup Request message. The first MBS neighbor cell information indicates one or more neighbor cells that provides the first MBS session. Alternatively, the DU 174 can receive the first MBS neighbor cell information from an Operations, Administration and Maintenance (OAM) node.

In response to receiving 504 the MBS Context Setup Request message, the DU 174 can send 506, to the CU 172, an MBS Context Setup Response message including a first DU DL transport layer configuration to configure a first common CU-to-DU DL tunnel for the first MBS session. The CN 110 can additionally include quality of service (QoS) configuration(s) for the first MBS session in the MBS Session Resource Setup Request message. In such cases, the CU 172 can include the QoS configuration(s) in the MBS Context Setup Request message. In some implementations, the MBS Context Setup Request message and MBS Context Setup Response message can be non-UE-specific messages.

The CU 172 sends 508 an MBS Session Resource Setup Response message to the CN 110 in response to the message of event 504. In some implementations, the CU 172 can send 508 the MBS Session Resource Setup Response message after receiving 506 the MBS Context Setup Response message. In other implementations, the CU 172 can send 508 the MBS Session Resource Setup Response message before receiving 506 the MBS Context Setup Response message. The CU 172 can include the first MBS session ID in the MBS Session Resource Setup Response message. The MBS Session Resource Setup Response message can include a first CU DL transport layer configuration to configure a first common CN-to-BS DL tunnel for the CN 110 to send MBS data of the first MBS session to the CU 172. The first CU DL transport layer configuration includes transport layer information, such as a transport layer address (e.g., an IP address) and/or a TEID, to identify the first common CN-to-BS DL tunnel.

In some implementations, the QoS configuration(s) include QoS parameters for the MBS session. In some implementations, the QoS configuration(s) includes configuration parameters to configure one or more QoS flows for the MBS session (see FIG. 3). In some implementations, the configuration parameters include one or more QoS flow IDs identifying the QoS flow(s). Each of the QoS flow ID(s) identifies a particular QoS flow of the QoS flow(s). In some implementations, the configuration parameters include QoS parameters for each QoS flow. The QoS parameters can include a 5G QoS identifier (5QI), a priority level, packet delay budget, packet error rate, averaging window, and/or a maximum data burst volume. The CN 110 can specify different values of the QoS parameters for the QoS flows.

In some implementations, the DU 174 can include the first MBS session ID in the MBS Context Setup Response message to indicate that resources for the first MBS session are successfully established. In some implementations, the DU 174 can indicate an association between the first MBS session and the first common CU-to-DU DL tunnel in the MBS Context Setup Response message.

In some implementations, the CU 172 can configure one or more MRBs (MRB(s)) for the first MBS session and generate one or more MRB IDs (MRB ID(s)) each for a particular MRB of the MRB(s). In such cases, the CU 172 can include the MRB ID(s) in the MBS Context Setup Request message to request the DU 174 to configure resources for the MRB(s). In some implementations, the CU 172 can associate each of the first PDCP configuration(s) with a particular MRB/MRB ID of the MRB(s)/MRB ID(s) and indicate the association(s) in the MBS Context Setup Request message. In some implementations, the DU 174 can include the MRB ID(s) in the MBS Context Setup Response message to indicate that resources for the MRB(s) are successfully established. In cases where the DU 174 does not have sufficient resources for all of the MRBs, the DU 174 can include a portion of the MRB IDs in the MBS Context Setup Response message to indicate that resources for the portion of the MRBs are successfully established. In the MBS Context Setup Response message, the DU 174 in some implementations can include an additional DU DL transport layer configuration configuring an additional common CU-to-DU DL tunnel for the first MBS session. The DU 174 can associate each of the common CU-to-DU DL tunnels, including the first common CU-to-DU DL tunnel and additional common CU-to-DU DL tunnel, with a particular MRB of the MRBs or the portion of the MRBs and indicate the associations in the MBS Context Setup Response message. The additional DU DL transport layer configuration includes transport layer information, such as a transport layer address (e.g., an IP address) and/or a TEID, to identify the additional common CU-to-DU DL tunnel.

In response to or after receiving 504 the MBS Context Setup Request message, the DU 174 can generate 512 a first MBS broadcast configuration message (e.g., MBSBroadcastConfiguration message) including the first session ID and the first PDCP configuration(s).

The events 502, 504, 506, 508, and 512 are collectively referred to in FIG. 5A as an MBS resource setup procedure 586A.

Before, during or after the MBS resource setup procedure 586A, the DU 174 transmits (e.g., broadcast) 514 system information (e.g., one or more system information blocks (SIBs)) including MBS control information on one or more cells (e.g., cell 124 and/or other cell(s) operated by the DU 174). In some implementations, the DU 174 periodically transmits 514 the system information on the one or more cells. The MBS control information includes configuration parameters for the UE 102 to receive the first MBS broadcast configuration message. In some implementations, the DU 174 can (start to) transmit 514 the system information in response to performing 586A the MBS resource setup procedure. In some implementations, the CU 172 generates the system information and transmits a CU-to-DU message including the system information to the DU 174. For example, the CU-to-DU message can be a non-UE associated message (e.g., F1AP message) such as a gNB-CU Configuration Update message, a gNB-DU Configuration Update Acknowledge message, a System Information Delivery Command message or F1 Setup Response message. In other implementations, the DU 174 generates the system information. In some implementations, the DU 174 can transmit a DU-to-CU message including the system information to the CU 172.

After generating 512 the first MBS broadcast configuration message, the DU 174 transmits (e.g., broadcasts) 516 the first MBS broadcast configuration message in accordance with the MBS control information. In some implementations, the DU 174 can transmit 516 the first MBS broadcast configuration message in accordance with the MBS control information via the one or more cells.

In some implementations, the MBS control information includes an MBS control channel (MCCH) configuration, a common frequency resource (CFR) configuration (e.g., cfr-Config-MCCH-MTCH), a PDSCH configuration for a MCCH (e.g., pdsch-Config-MCCH), a PDSCH configuration for a MTCH (e.g., pdsch-Config-MTCH), a PDCCH configuration for a MCCH (e.g., pdcch-Config-MCCH) and/or a PDCCH configuration for a MTCH (e.g., pdcch-Config-MTCH). The CFR configuration configures common frequency resources for the UE 102 to receive MBS (e.g., the first MBS session). If the CFR configuration is absent, the UE 102 can receive MBS via an initial DL BWP. The UE 102 can obtain configuration parameters of the initial DL BWP in a SIB1 that the UE 102 receives from the DU 172. The PDSCH configuration for a MCCH configures cell-specific configuration parameters for the UE 102 to receive PDSCH transmissions including MCCH data (e.g., MBS broadcast configuration message(s) including the first MBS broadcast configuration message). If the PDSCH configuration for a MCCH is absent, the UE 102 can use a PDSCH configuration in the SIB1 to receive to receive PDSCH transmissions including MCCH data (e.g., MBS broadcast configuration message(s) including the first MBS broadcast configuration message). The PDSCH configuration for a MTCH configures cell-specific configuration parameters for the UE 102 to receive PDSCH transmissions. In the PDSCH configuration for a MTCH is absent, the UE 102 can use the PDSCH configuration in the SIB1 to receive to receive PDSCH transmissions. Each of the PDSCH transmission includes including MTCH data (e.g., MBS data of an MBS session such as MBS data of the first MBS session). The PDCCH configuration for a MCCH configures cell-specific configuration parameters for the UE 102 to receive PDCCH transmissions. If the PDCCH configuration for a MCCH is absent, the UE 102 can use a PDCCH configuration in the SIB1 to receive to receive PDCCH transmissions. Each of the PDCCH transmissions includes a DCI and a CRC (of the DCI) scrambled with a MCCH-RNTI or a G-RNTI scheduling a PDSCH transmission including MCCH data (e.g., MBS broadcast configuration message(s) including the first MBS broadcast configuration message). The PDCCH configuration for a MTCH configures cell-specific configuration parameters for the UE 102 to receive PDCCH transmissions. If the PDCCH configuration for a MTCH is absent, the UE 102 can use a PDCCH configuration in the SIB1 to receive to receive PDCCH transmissions. Each of the PDCCH transmissions includes a DCI and a CRC (of the DCI) scrambled with a G-RNTI scheduling a PDSCH transmission including MTCH data (e.g., MBS data of an MBS session such as MBS data of the first MBS session).

In some implementations, the first MBS broadcast configuration message can include the PDSCH configuration for a MTCH (e.g., pdsch-Config-MTCH) and/or the PDCCH configuration for a MTCH (e.g., pdcch-Config-MTCH) instead of the system information or the MBS control information.

In some implementations, the MCCH configuration includes configuration parameters such as a window start slot, a window duration, a modification period, and/or a repetition period and offset. The window duration indicates a duration (i.e., MCCH transmission window in units of e.g., (consecutive) slots), starting from a slot indicated by the window start slot, during which transmissions of MCCH information (i.e., transmission(s) of the MBS configuration(s) via MCCH) may be scheduled. The modification period defines periodically appearing boundaries, i.e., radio frames for which SFN mod the modification period=0. Contents of different transmissions of MCCH information can only be different if there is at least one such boundary in-between them. The repetition period and offset parameter defines a length and an offset of the MCCH repetition period. Transmissions of MCCH information are scheduled in radio frames for which system frame number (SFN) mod the repetition period length offset of the repetition period.

In some implementations, the DU 174 can generate 512 first MBS session information (e.g., MBS-SessionInfo IE) including the first MBS session ID, a first G-RNTI, first RLC configuration(s), and/or the first PDCP configuration(s), and includes the first MBS session information in the MBS broadcast configuration message. In some implementations, the DU 174 can generate 512 first MRB configuration(s) including the first PDCP configuration(s) and/or the first RLC configuration(s). Each of the first MRB configuration(s) can include a particular PDCP configuration of the first PDCP configuration(s). Each of the first MRB configuration(s) can include a particular RLC configuration of the first RLC configuration(s). In some implementations, the DU 174 can establish and use RLC entity/entities to transmit 522 the MBS data of the first MBS session to the UE 102 in accordance with the first RLC configuration(s). In cases where the DU 174 receives the first DRX cycle configuration from the CU 172, the DU 174 can generate a first DRX configuration (e.g., DRX-ConfigPTM IE) in accordance with the first DRX cycle configuration (e.g., the first DRX cycle length). In such cases, the DU 174 can include the first DRX configuration in the first MBS session information.

The first G-RNTI is used by the DU 174 to schedule transmissions of MBS data of the first MBS session. Each of the first RLC configuration(s) configures a logical channel ID, an RLC sequence number size (e.g., 6 bits or 12 bits) and/or a timer (value) for reassembly for a particular MRB of the MRB(s). The first DRX configuration configures DRX parameters for transmission of MBS data of the first MBS session on an on-duration of a periodic DRX cycle to save the power for the UEs. In accordance with the DRX parameters, the UEs enables discontinuous reception of MBS data of the first MBS session. For example, the DRX parameters may include the following:

- Inactivity timer parameter (e.g., drx-InactivityTimerPTM field): a duration after the PDCCH occasion in which a PDCCH indicates a new DL multicast transmission for the MAC entity;
- DRX cycle and start offset parameter (e.g., drx-(Long) CycleStartOffsetPTM field): defines a length of a DRX cycle and defines a subframe where the DRX cycle starts;
- On-duration parameter (e.g., drx-onDurationTimerPTM): a duration at the beginning of the DRX cycle.

In some implementations, the DU 174 can generate the first RLC configuration(s) e.g., in accordance with the QoS configuration(s) and/or the MRB ID(s). Alternatively, the DU 174 can generate the first RLC configuration(s) with pre-configured RLC parameters. In some implementations, the DU 174 can include first logical channel ID(s) in the first RLC configuration(s). In cases where the DU 174 receives the first DRX cycle configuration, the DU 174 sets the length of the DRX cycle to the first DRX cycle length. In cases where the DU 174 does not receives a DRX cycle configuration for the first MBS session, the DU 174 can determine the length of the DRX cycle, e.g., in accordance with the QoS configuration(s) received from the CU 172. Alternatively, the DU 174 can determine the length of the DRX cycle in accordance with preconfigured DRX parameters. Yet alternatively, the DU 174 does not include, excludes, or refrains from including a DRX configuration for the first MBS session in the first MBS session information or the MBS broadcast configuration message. In some implementations, the DU 174 can assign the first G-RNTI (value) and associate the first G-RNTI with the first MBS session ID.

In cases where the DU 174 receives the first MBS neighbor cell information, the DU 174 can include the first MBS neighbor cell information in the first MBS session information. In cases where the CU 172 does not transmit the first MBS neighbor cell information to the DU 174, the DU 174 can generate the first MBS neighbor cell information and include the first MBS neighbor cell information in the first MBS session information. In some implementations, the DU 174 can generate a first field/IE (e.g., mtch-NeighbourCell-r17) to indicate the one or more cells included in the first MBS neighbor cell information, and include the field/IE in the first MBS session information.

After the MBS resource setup procedure 586A, the CN 110 sends 518 MBS data of the first MBS session to the CU 172 via the first common CN-to-BS DL tunnel. In turn, the CU 172 transmits 520 the MBS data to the DU 174 via the first common CU-to-DU DL tunnel and/or additional common CU-to-DU DL tunnel in accordance with the first PDCP configuration(s). The DU 174 then transmits (i.e., broadcasts) 522 the MBS data in accordance with the MBS broadcast configuration message (e.g., via the first logical channel(s) identified by the first logical channel ID(s), and using the first RLC configuration(s) and/or the first G-RNTI). The UE 102 receives 522 the MBS data in accordance with the first MBS broadcast configuration or the first MBS session information. For example, the CU 172 receives 518 an MBS data packet, generates a PDCP PDU including the MBS data packet in accordance with the PDCP configuration, and transmits 520 the PDCP PDU to the DU 174 via the first common CU-to-DU DL tunnel. In some implementations, the CU 172 can use a PDCP state variable to generate a PDCP sequence number included in the PDCP PDU. In some implementations, the DU 174 generates a MAC PDU including the first logical channel ID and the PDCP PDU, and transmits 522 the MAC PDU to the UE 102 using the first G-RNTI. The UE 102 receives 522 the MAC PDU using the first G-RNTI, retrieves the PDCP PDU and the first logical channel ID from the MAC PDU, identifies the PDCP PDU associated with the MRB based on the first logical channel ID, and retrieves the MBS data packet from the PDCP PDU in accordance with the first PDCP configuration. In other implementations, the DU 174 generates multiple RLC PDU segments including the PDCP PDU, where the multiple RLC PDU segments including an RLC sequence number (i.e., the same RLC sequence number) and each of the multiple RLC PDU segments incudes a particular portion of the PDCP PDU. In some implementations, the DU 174 can use an RLC state variable to generate the RLC sequence number. For each of the multiple RLC PDU segments, the DU 174 generates a MAC PDU including the first logical channel ID and the RLC PDU segment, and transmits 522 the MAC PDUs to the UE 102 using the first G-RNTI. The UE 102 receives 522 the MAC PDUs using the first G-RNTI, retrieves the first logical channel ID and the RLC PDU segments from the MAC PDUs, assembles the RLC PDU segments to obtain the PDCP PDU, identifies the PDCP PDU associated with the MRB based on the first logical channel ID, and retrieves the MBS data packet from the PDCP PDU in accordance with the first PDCP configuration.

In some implementations, the CU 172 includes a CU-CP 172A and a CU-UP 172B as described for FIG. 1B. In such cases, the events of the MBS resource setup procedure 586A occur between the CU-CP 172A, the CN 110, and the DU 174. In such cases, the events 518 and 520 occur between the CN 110, the CU-UP 172B, and the DU 174. After receiving 506 the MBS Context Setup Response message, the CU-CP 172A can send to the CU-UP 172B an MBS Bearer Context Setup Request message (not shown in FIG. 5A) including the first MBS session ID and/or the MRB ID(s) to request the CU-UP 172B to establish an MBS bearer context for the first MBS session and/or the MRB(s). In some implementations, the CU-CP 172A excludes a PDU session ID from the MBS Bearer Context Setup Request message. In response to the MBS Bearer Context Setup Request message, the CU-UP 172B can generate an MBS bearer context and send an MBS Bearer Context Setup Response message to the CU-CP 172A. In some implementations, the CU-UP 172B can include the first CU DL transport layer configuration in the MBS Bearer Context Setup Response message, so that the CU-CP can include the first CU DL transport layer configuration in the MBS Session Resource Setup Response message. Thus, the CN 110 can transmit 518 the MBS data of the first MBS session to the CU-UP 172B via the first common CN-to-BS DL tunnel.

In some implementations, the CU-CP 172A can include the first PDCP configuration(s) in the MBS Bearer Context Setup Request message, and the CU-UP 172B transmits 520 the MBS data of the first MBS session to the DU 174 in accordance with the first PDCP configuration(s). In some implementations, the CU-UP 172B establishes PDCP entity/entities in accordance with the first PDCP configuration(s) and uses the PDCP entity/entities to transmit 520 the MBS data of the first MBS session to the DU 174. In some implementations, the CU-CP 172A includes the MRB ID(s) in the MBS Bearer Context Setup Request message, and the CU-CP 172A can associate each of the first PDCP configuration(s) with a particular MRB/MRB ID of the MRB(s)/MRB ID(s) and indicate the association(s) in the MBS Bearer Context Setup Request message. In some implementations, the CU-CP 172A includes the first DU DL transport layer configuration and/or additional DU DL transport layer configuration in the MBS Bearer Context Setup Request message, so that the CU-UP 172B can transmit 520 the MBS data of the first MBS session via the first common CU-to-DU DL tunnel and/or additional common CU-to-DU DL tunnel to the DU 174.

In some implementations, the MBS bearer context can include the first PDCP configuration(s), the first DU DL transport layer configuration, the additional DU DL transport layer configuration, and/or the first CU DL transport layer configuration.

Actions that may be performed by the CU-CP 172A and CU-UP 172B are further described with reference to FIGS. 7A-7B and 9A-9B. Further, while not shown in FIGS.

5B-5E, events of MBS resource procedures 586B-586E (described below) may occur between the CU-CP 172A, the CN 110, and the DU 174, in a similar manner as described for the MBS resource procedure 586A.

Figure 5B:
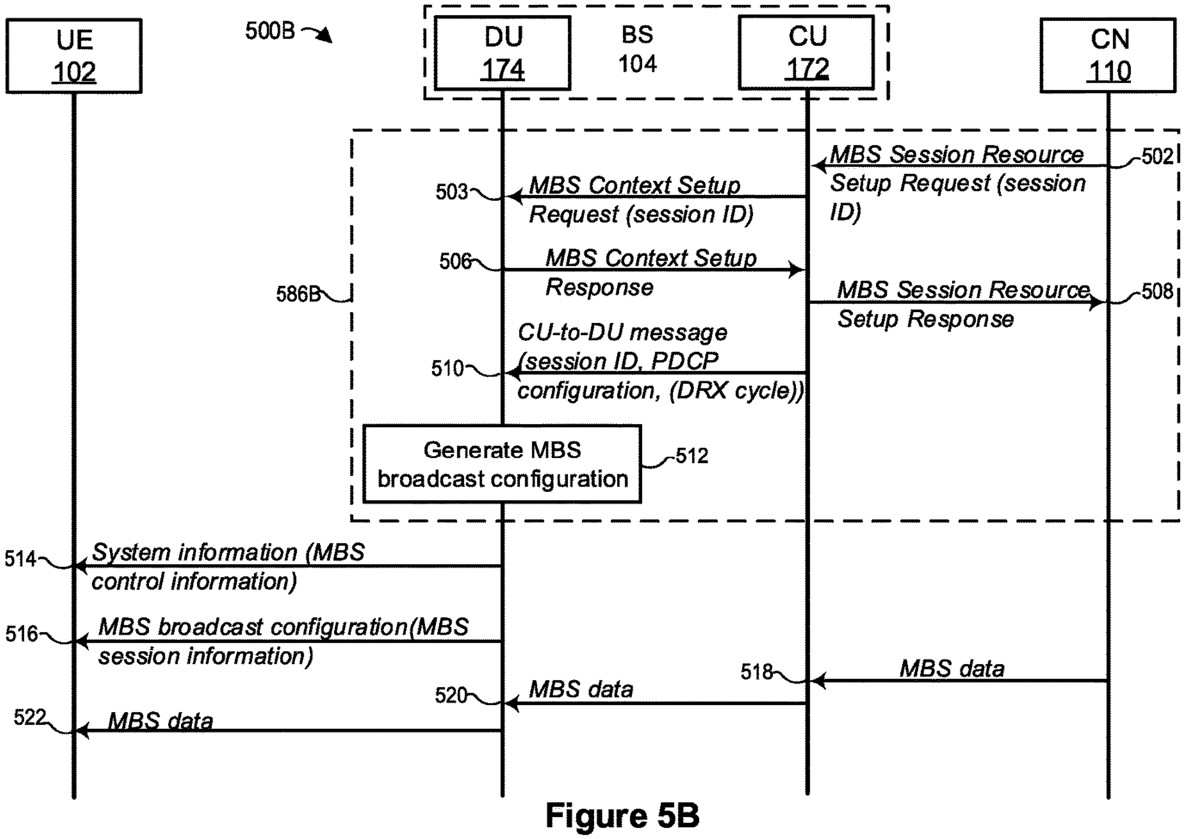
FIG. 5B is a messaging diagram of an example scenario similar to the scenario of FIG. 5A, but where the DU receives the PDCP configuration in a CU-to-DU message after receiving the MBS Context Setup Request message.

FIG. 5B is a messaging diagram of an example scenario 500B similar to the scenario 500A, except that the DU 174 receives a PDCP configuration in a CU-to-DU message from the CU 172 after receiving an MBS Context Setup Request message, as described below. More particularly, the CU 172 transmits 503 an MBS Context Setup Request message including the first MBS session ID to the DU 174, where the CU 172 excludes the first PDCP configuration(s) and/or the first DRX cycle configuration from the MBS Context Setup Request message. The CU 172 transmits 510 a CU-to-DU message including the first MBS session ID, the first PDCP configuration(s) and/or the first DRX cycle configuration to the DU 174 instead of including the first PDCP configuration(s) and/or the first DRX cycle configuration in the MBS Context Setup Request message of the event 503. In some implementations, the CU-to-DU message can be a F1 application protocol (F1AP) message. The events 502, 503, 506, 508, 510 and 512 are collectively referred to in FIG. 5B as an MBS resource setup procedure 586B.

Figure 5C:
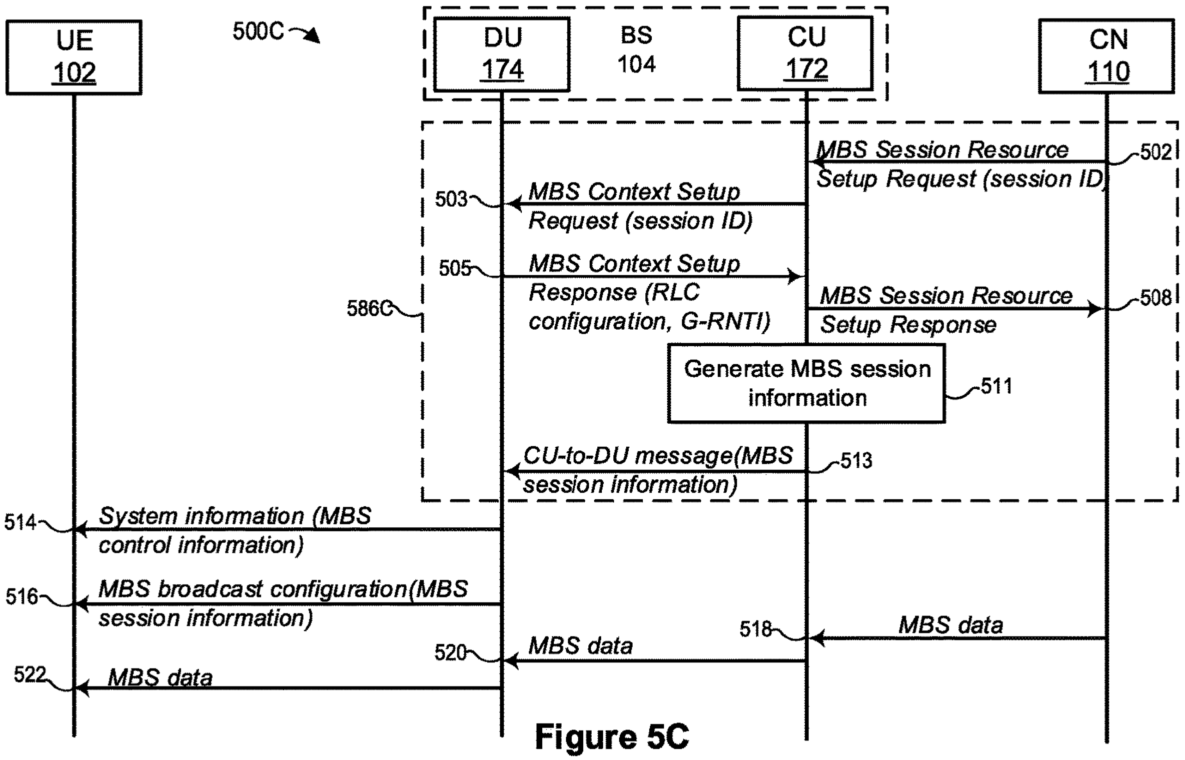
FIG. 5C is a messaging diagram of an example scenario similar to the scenario of FIG. 5A, but where the CU generates the MBS session information using a radio link control (RLC) configuration received from a DU in an MBS Context Setup Response message, and transmits the MBS session information to the DU.

FIG. 5C is a messaging diagram of an example scenario 500C similar to the scenarios 500A and 500B, but where the CU 172 rather than the DU 174 generates the MBS session information. In the scenario 500C, the DU 174 transmits 505 an MBS Context Setup Response message including the first RLC configuration(s) and the first G-RNTI to the CU 172. After receiving the first RLC configuration(s) and the first G-RNTI, the CU 172 generates 511 the first MBS session information including the first MBS session ID, the first G-RNTI and the first MRB configuration(s) (i.e., including the first PDCP configuration(s) and the first RLC configuration(s)). The CU 172 then transmits 513 a CU-to-DU message including the first MBS session information to the DU 174. After receiving the first MBS session information, the DU 174 can generate the first MBS broadcast configuration message including the first MBS session information and transmit 516 the first MBS broadcast configuration message as described above. Alternatively, the CU 172 can generate the first MBS broadcast configuration message including the first MBS session information and include the first MBS broadcast configuration message in the CU-to-DU message of the event 513. Thus, the DU 174 can transmit 516 the first MBS broadcast configuration message as described above.

In cases where the DU 174 generates the first DRX configuration as described above, the DU 174 in some implementations can include the first DRX configuration in the CU-to-DU message of the event 505. In such cases, the CU 172 includes the first DRX configuration in the first MBS session information. In other implementations, the CU 172 can generate the first DRX configuration and including the first DRX configuration in the first MBS session information. In yet other implementations, the CU 172 excludes a DRX configuration from (or refrains from including a DRX configuration in) the first MBS session information or the first MBS broadcast configuration message.

In some implementations, the CU 172 can include the first MBS neighbor cell information in the first MBS session information. In some implementations, the DU 174 can include the first MBS neighbor cell information in the MBS Context Setup Response message. In other implementations, the CU 172 generates the first MBS neighbor cell information. In some implementations, the CU 172 can generate a first field/IE (e.g., mtch-NeighbourCell-r17) to indicate the one or more cells included in the first MBS neighbor cell information, and include the field/IE in the first MBS session information.

The events 502, 503, 505, 508, 511 and 513 are collectively referred to in FIG. 5C as an MBS resource setup procedure 586C.

Figure 5D:
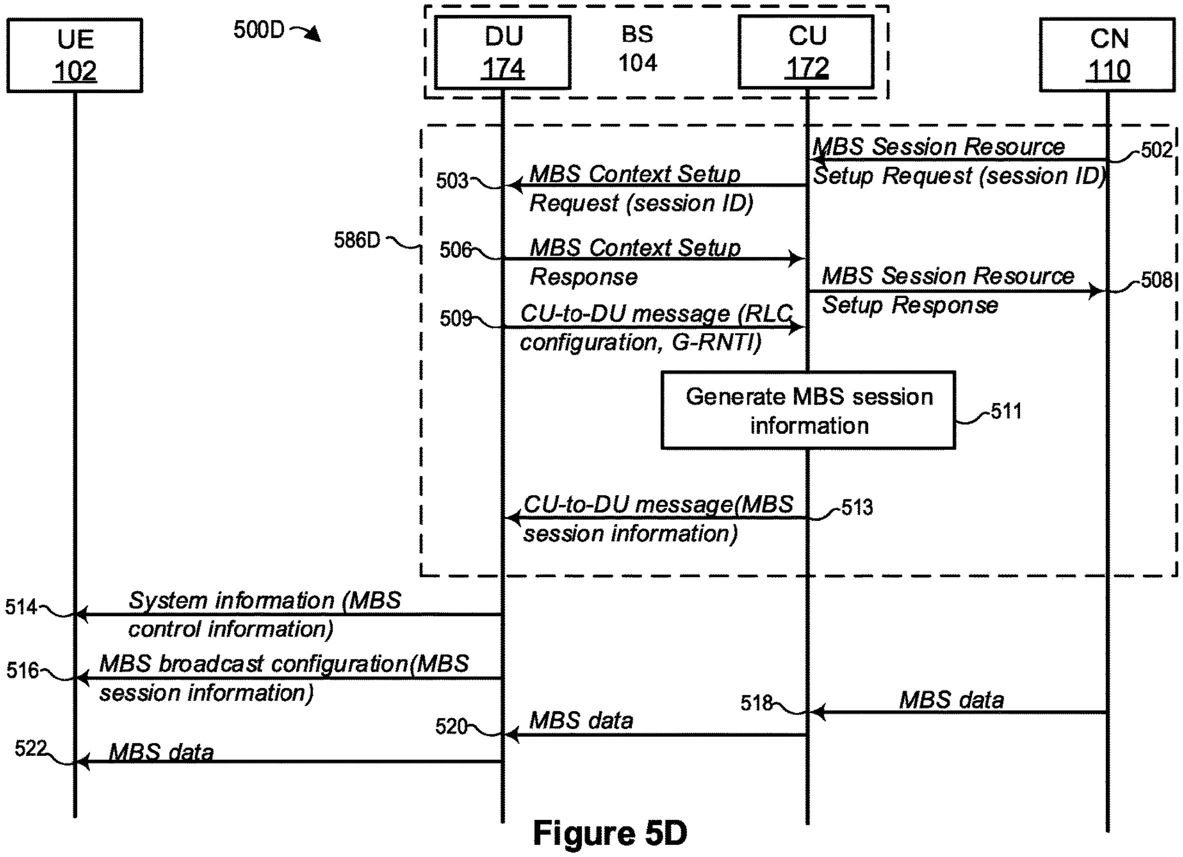
FIG. 5D is a messaging diagram of an example scenario similar to the scenario of FIG. 5C, but where the CU receives the RLC configuration in a DU-to-CU message after receiving the MBS Context Setup Response message.

FIG. 5D is a messaging diagram of an example scenario 500D similar to the scenario 500C, but in which the DU 174 transmits 509 a DU-to-CU message including the first RLC configuration(s) and the first G-RNTI to the CU 172 to the CU 172 instead of including the first RLC configuration(s), the first G-RNTI, and/or the first DRX cycle configuration in the MBS Context Setup Response message of the event 505. In some implementations, the CU-to-DU message can be a F1AP message. The events 502, 503, 506, 508, 509, 511 and 513 are collectively referred to in FIG. 5D as an MBS resource setup procedure 586D.

Figure 5E:
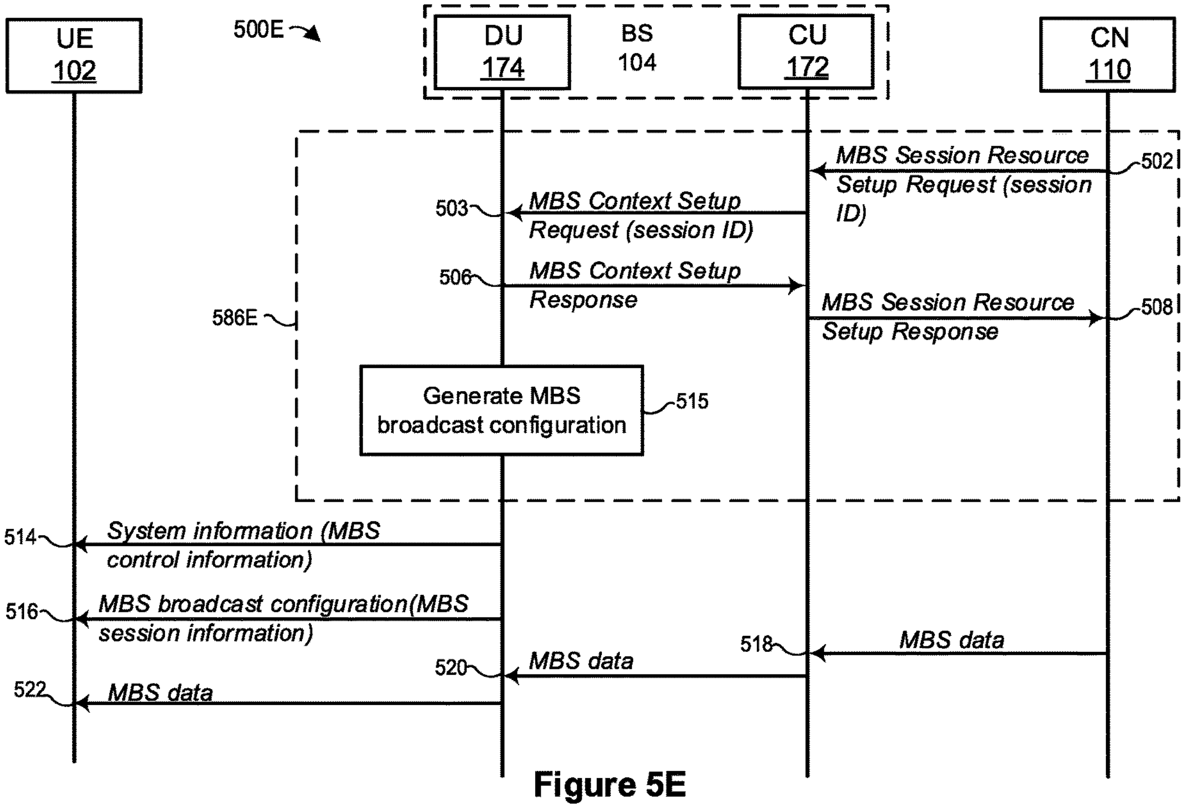
FIG. 5E is a messaging diagram of an example scenario similar to the scenario of FIG. 5A, but where the DU generates MBS session information without receiving a PDCP configuration from the CU.

FIG. 5E is a messaging diagram of an example scenario 500E similar to the scenarios 500A and 500B, except that the DU 174 does not receive a PDCP configuration from the CU 172. As the CU 172 does not provide the first PDCP configuration(s) to the DU 174, the DU 174 in some implementations can be preconfigured with the first PDCP configuration(s) or receive the first PDCP configuration(s) from the OAM node. In other implementations, the DU 174 can generate the first PDCP configuration(s) in accordance with configuration(s) in a CU-to-DU message received from the CU 172. In one implementation, the CU-to-DU message can be the MBS Context Setup Request message. In some implementations, the configuration(s) can be the QoS configuration(s). The DU 174 can determine or generate the PDCP sequence number size and/or the header compression configuration in accordance with the QoS configuration(s). For example, if the QoS configuration(s) requires or indicates a high data rate, the DU 174 can determine or generate the PDCP sequence number size to be a larger size (e.g., 18 bits). Otherwise, the DU 174 can determine the PDCP sequence number size to be a smaller size (e.g., 12 bits). In another example, if the QoS configuration(s) requires or indicates QoS for a streaming service (e.g., voice or video service), the DU 174 can determine or generate to configure one or more header compression profiles for the MRB(s) for the first MBS session. Otherwise, the DU 174 can determine to configure no header compression for the MRB(s) for the first MBS session.

In yet other implementations, the configuration(s) can include CU-to-DU header compression configuration(s) where each is an IE (e.g., F1AP IE) of the CU-to-DU message for a particular MRB of the MRB(s) for the first MBS session. The DU 174 can generate the header compression configuration(s) in the first PDCP configuration(s) in accordance with the CU-to-DU header compression configuration(s). In cases where the CU-to-DU message does not include CU-to-DU header compression configuration(s) for a particular MRB of the MRB(s), the DU 174 can generate a header compression configuration configuring no header compression and include the header compression configuration in the first PDCP configuration.

In yet other implementations, the configuration(s) can include CU-to-DU PDCP sequence number size configuration(s) where each is an IE (e.g., F1AP IE) of the CU-to-DU message for a particular MRB of the MRB(s) for the first MBS session. The DU 174 can generate the PDCP sequence number size(s) in the first PDCP configuration(s) in accordance with the CU-to-DU PDCP sequence number size configuration(s). In cases where the CU-to-DU message does not include PDCP sequence number size configuration(s) for a particular MRB of the MRB(s), the DU 174 can include a default PDCP sequence number size in the first PDCP configuration.

The DU 174 then generates 515 the first MBS broadcast configuration message. The events 502, 503, 506, 508, and 515 are collectively referred to in FIG. 5E as an MBS resource setup procedure 586E.

Figure 5F:
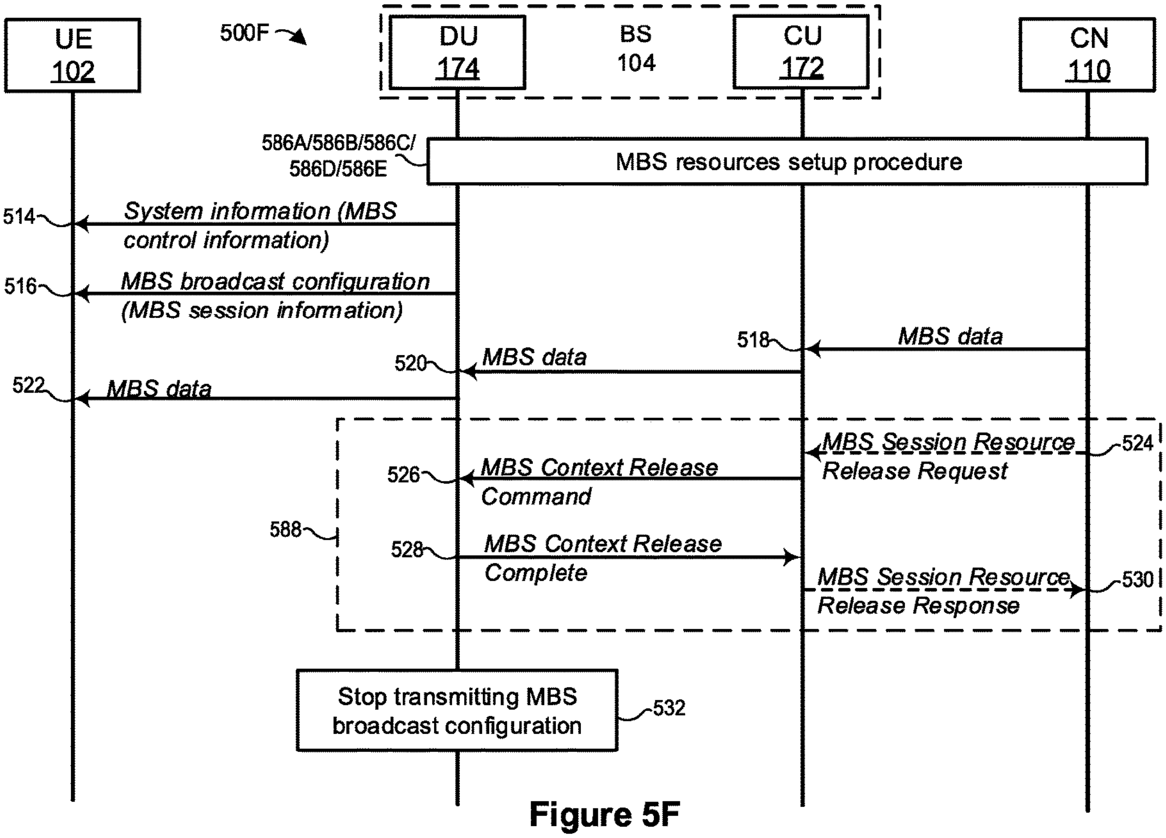
FIG. 5F is a messaging diagram of an example scenario which may be similar to any one of the scenarios illustrated by FIGS. 5A-5E, where the distributed base station later releases the resources for the MBS session.

FIG. 5F is a messaging diagram of an example scenario 500F similar to the scenarios 500A-E, except that the base station 104 later releases resources for the first MBS session. The scenario 500F may begin with any one of the MBS resource setup procedures 586A-E. After transmitting 518 the MBS data, the CN 110 can determine to request the RAN 105 to release resources for the first MBS session. In response to the determination, the CN 110 transmits 524 an MBS Session Resource Release Request message including the first MBS session ID to the CU 172. In response to or after receiving 524 the MBS Session Resource Release Request message, the CU 172 transmits 526 an MBS Context Release Command message to the DU 174 to request the DU 174 to release resources for the first MBS session. In some implementations, the CU 172 can include the first MBS session ID in the MBS Context Release Command message. The CU 172 might or might not include the MRB ID(s) in the MBS Context Release Command message. In response, the DU 174 releases resources (e.g., the first G-RNTI, the first RLC configuration(s), the first DRX configuration, and/or the first and/or additional DU DL transport layer configuration) and transmits 528 an MBS Context Release Complete message to the CU 172. In response to or after receiving 528 the MBS Context Release Complete message, the CU 172 can transmit 530 an MBS Session Resource Release Response message to the CN 110 to confirm that the resources for the first MBS session have been released.

In some implementations, the CU 172 can determine to request the DU 174 to release resources for the first MBS session without receiving an MBS Session Resource Release Request message from the CN 110. For example, the CU 172 can make the determination after detecting MBS data inactivity for the first MBS session for a time period. In response to the determination, the CU 172 can transmit 526 the MBS Context Release Command message to the DU 174. In some implementations, the CU 172 can receive a value of the time period in a CN-to-BS message from the CN 110. For example, the CN-to-BS message can be the MBS Session Resource Setup Request message of the event 502 or a NG application protocol (NGAP) message. In other implementations, the CU 172 can receive the value of the time period from the OAM node. In yet other implementations, the CU 172 can be preconfigured with the value of the time period.

The DU 174 can stop 532 transmitting (e.g., broadcasting) the first MBS broadcast configuration message in response to or after receiving 526 the MBS Context Release Command message. Alternatively, the DU 174 can transmit (e.g., broadcast) a second MBS broadcast configuration message, excluding the first MBS session information, in accordance with the MBS control information, in response to or after receiving 526 the MBS Context Release Command message. In some implementations, the DU 174 generates the second MBS broadcast configuration message, as described for the first MBS broadcast configuration message. In other implementations, the CU 172 generates the second MBS broadcast configuration message and transmits to the DU 174 a CU-to-DU message including the second MBS broadcast configuration message, as described for the first MBS broadcast configuration message in scenario 500C. The CU-to-DU message can be the MBS Context Release Command message or a F1AP message.

In some implementations, the DU 174 can release the RLC entity/entities used by the DU 174 to transmit the MBS data of the first MBS session in response to or after receiving 526 the MBS Context Release Command message. In some implementation, the DU 174 can stop transmitting the system information of the event 514.

The events 524, 526, 528, and 530 are collectively referred to in FIG. 5F as an MBS resource release procedure 588.

In some implementations, the CU 172 includes the CU-CP 172A and the CU-UP 172B. In such cases, the events 524, 526, 528, and 530 occur between the CU-CP 172A of the CU 172, the CN 110, and the DU 174. After receiving the message of the event 524, the CU-CP 172A can send an MBS Bearer Context Release Command message (not shown in FIG. 5F) including the first MBS session ID and/or the MRB ID(s) to the CU-UP 172B to request the CU-UP 172B to release the MBS bearer context for the first MBS session. In some implementations, the CU-CP 172A excludes a PDU session ID from the MBS Bearer Context Release Command message. In response to the MBS Bearer Context Release Command message, the CU-UP 172B can release the MBS bearer context and send an MBS Bearer Context Release Complete message to the CU-CP 172A. In some implementations, the CU-UP 172B can release the PDCP entity/entities used by the CU-UP 172B to transmit the MBS data of the first MBS session in response to or after receiving the MBS Bearer Context Release Command message.

Figure 5G:
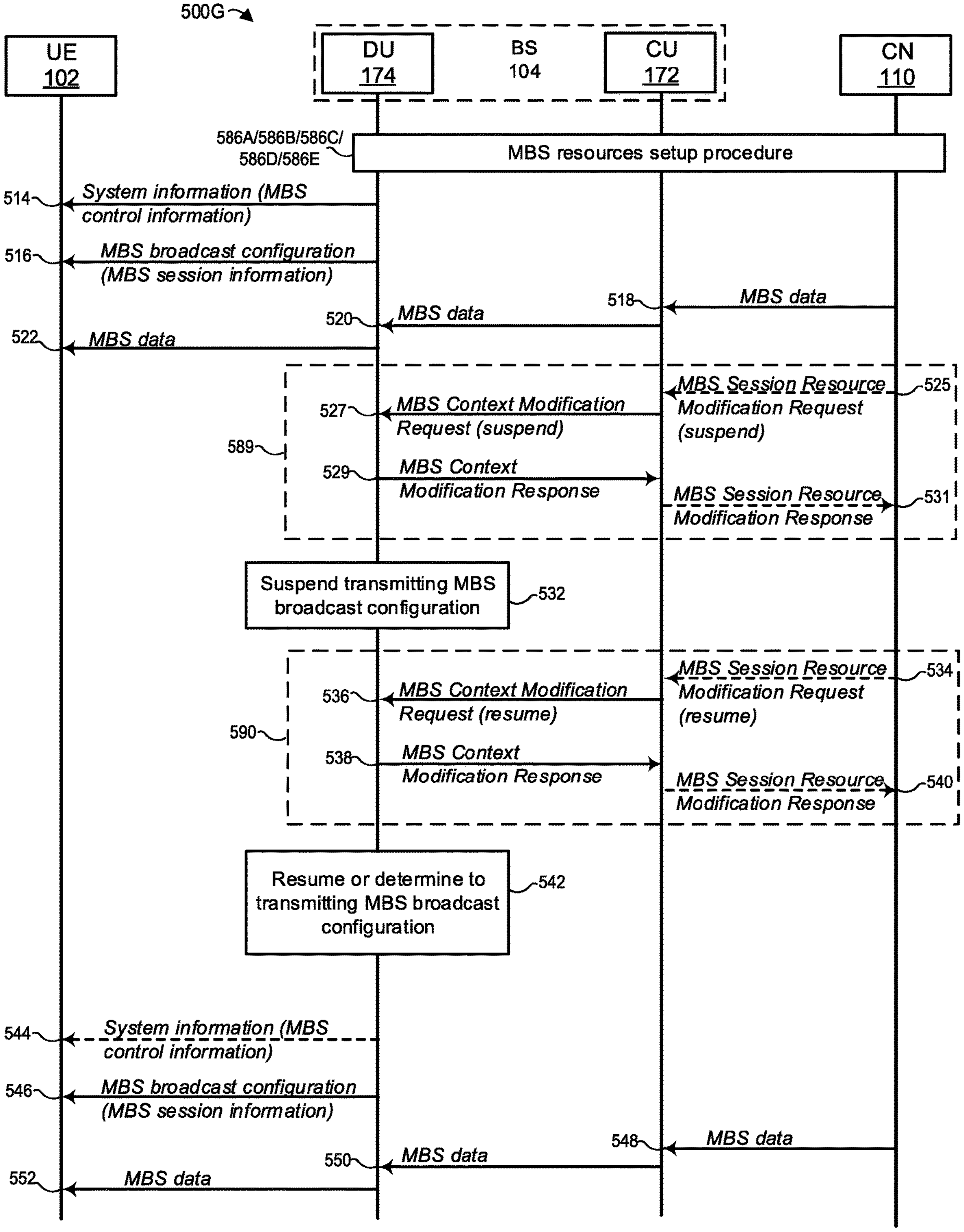
FIG. 5G is a messaging diagram of an example scenario which may be similar to any one of the scenarios illustrated by FIGS. 5A-5E, where the distributed base station later suspends and resumes the resources for the MBS session.

FIG. 5G is a messaging diagram of an example scenario 500G similar to the scenarios 500A-E, except that the base station 104 later suspends and resumes resources for the first MBS session. The scenario 500G may begin with any one of the MBS resource setup procedures 586A-E. After transmitting 518 the MBS data, the CN 110 can determine to suspend the first MBS session. In response to the determination, the CN 110 transmits 525 to the CU 172 an MBS Session Resource Modification Request message including the first MBS session ID and an indication to suspend the first MBS session. The indication can be a suspend indication or an IE indicating or causing the CU 172 to suspend resources and/or operation for the first MBS session. In response to or after receiving 525 the MBS Session Resource Modification Request message or the indication, the CU 172 transmits 527 to the DU 174 an MBS Context Modification Request message including an indication to request the DU 174 to suspend resources for the first MBS session or the MRB(s). The indication can be a suspend indication or an IE indicating or causing the CU 172 to suspend resources and/or operation for the first MBS session. In some implementations, the CU 172 can include the first MBS session ID and/or the MRB ID(s) in the MBS Context Modification Request message. In response, the DU 174 suspends resources and/or operation for the first MBS session or the MRB(s) and transmits 529 an MBS Context Modification Response message to the CU 172. In response to or after receiving 529 the MBS Context Modification Response message, the CU 172 can transmit 531 an MBS Session Resource Modification Response message to the CN 110 to confirm that the resources for the first MBS session have been suspended.

In some implementations, the CU 172 can determine to request the DU 174 to suspend the first MBS session without receiving an MBS Session Resource Modification Request message from the CN 110. For example, the CU 172 can make the determination after detecting MBS data inactivity for the first MBS session for a time period. In response to the determination, the CU 172 can transmit 527 the MBS Context Modification Request message to the DU 174. In some implementations, the CU 172 can receive a value of the time period in a CN-to-BS message from the CN 110. For example, the CN-to-BS message can be the MBS Session Resource Setup Request message of the event 502 or a NG application protocol (NGAP) message. In other implementations, the CU 172 can receive the value of the time period from the OAM node. In yet other implementations, the CU 172 can be preconfigured with the value of the time period.

The DU 174 can stop 532 transmitting (e.g., broadcasting) the first MBS broadcast configuration message in response to or after receiving 527 the MBS Context Modification Request message. Alternatively, the DU 174 can transmit (e.g., broadcast) a second MBS broadcast configuration message, excluding the first MBS session information, in accordance with the MBS control information, in response to or after receiving 527 the MBS Context Modification Request message. In some implementations, the DU 174 generates the second MBS broadcast configuration message, as described for the first MBS broadcast configuration message. In other implementations, the CU 172 generates the second MBS broadcast configuration message and transmits to the DU 174 a CU-to-DU message including the second MBS broadcast configuration message. The CU-to-DU message can be the MBS Context Modification Request message or a F1AP message.

In some implementations, the DU 174 can retain the RLC entity/entities used by the DU 174 to transmit the MBS data of the first MBS session in response to or after receiving 527 the MBS Context Modification Request message. In such cases, the DU 174 can retain the RLC state variable, in one implementation. In another implementation, the DU 174 can reset the RLC state variable in response to or after receiving 527 the MBS Context Modification Request message.

The events 525, 527, 529, and 531 are collectively referred to in FIG. 5G as an MBS resource suspend procedure 589.

In some implementations, the CU 172 includes the CU-CP 172A and the CU-UP 172B. In such cases, the events 525, 527, 529, and 531 occur between the CU-CP 172A of the CU 172, the CN 110, and the DU 174. After receiving the message of the event 525, the CU-CP 172A can send an MBS Bearer Context Modification Request message (not shown in FIG. 5G) including the first MBS session ID and/or the MRB ID(s) to the CU-UP 172B to request the CU-UP 172B to suspend resources and/or operation for the first MBS session. In some implementations, the CU-CP 172A excludes a PDU session ID from the MBS Bearer Context Modification Request message. In response to the MBS Bearer Context Modification Request message, the CU-UP 172B can suspend resources (e.g., the MBS bearer context) and/or operation for the first MBS session and send an MBS Bearer Context Modification Response message to the CU-CP 172A. In some implementations, the CU-UP can retain the PDCP entity/entities used by the CU-UP 172B to transmit the MBS data of the first MBS session in response to or after receiving the MBS Bearer Context Modification Request message. In such cases, the CU-UP 172B can retain the PDCP state variable, in one implementation. In another implementation, the DU 174 can reset the PDCP state variable.

Later in time, the CN 110 can determine to resume the first MBS session. In response to the determination, the CN 110 can transmit 534 to the CN 110 another, second, MBS Session Resource Modification Request message including the first MBS session ID and an indication to request the CU 172 to resume the first MBS session. In some implementations, the indication can be a resume indication or an IE indicating or causing the CU 172 to resume the first MBS session. In response to or after receiving 534 the MBS Session Resource Modification Request message, the CU 172 transmits 536 to the DU 174 an MBS Context Modification Request message including an indication to resume the first MBS session. In some implementations, the CU 172 can include the first MBS session ID in the MBS Context Modification Request message. The CU 172 might or might not include the MRB ID(s) in the MBS Context Modification Request message. In response to the MBS Context Modification Request message, the DU 174 resumes the suspended resources and/or operation and transmits 538 an MBS Context Modification Response message to the CU 172. In response to or after receiving 538 the MBS Context Modification Response message, the CU 172 can transmit 540 an MBS Session Resource Modification Response message to the CN 110 to confirm that resources of the first MBS session have been resumed.

In some implementations, the CU 172 can determine to request the DU 174 to resume the first MBS session without receiving an MBS Session Resource Modification Request message from the CN 110. For example, the CU 172 detects MBS data activity in response to receiving 548 MBS data of the first MBS session and makes the determination after detecting the MBS data activity. In response to the determination, the CU 172 can transmit 536 the MBS Context Modification Request message to the DU 174. In response to the MBS Context Modification Request message, the DU 174 resumes the suspended resources and/or operation and transmits 538 an MBS Context Modification Response message to the CU 172.

The DU 174 can resume 542 transmitting the first MBS broadcast configuration message in response to or after receiving 536 the MBS Context Modification Request message. Alternatively, the DU 174 can determinate to transmit (e.g., broadcast) 542 a third MBS broadcast configuration message, in response to or after receiving 536 the MBS Context Modification Request message. The third MBS broadcast configuration message can include the first MBS session information or new MBS session information for the first MBS session. In some implementations, the DU 174 generates the third MBS broadcast configuration message, as described for the first MBS broadcast configuration message. In other implementations, the CU 172 generates the third MBS broadcast configuration message and transmits to the DU 174 a CU-to-DU message including the third MBS broadcast configuration message, as described for the first MBS broadcast configuration message. The CU-to-DU message can be the MBS Context Modification Request message or a F1AP message.

In some implementations, the DU 174 can reset the RLC state variable in response to or after receiving 536 the MBS Context Modification Request message. Alternatively, the DU 174 refrains from resetting the RLC state variable in response to or after receiving 536 the MBS Context Modification Request message. In cases where the DU 174 stopped transmitting the system information in response to or after receiving 527 the MBS Context Modification Request message, the DU 174 resumes transmitting the system information in response to or after receiving 536 the MBS Context Modification Request message. Alternatively, the DU 174 determines to transmit new system information including new MBS control information in response to or after receiving 536 the MBS Context Modification Request message. In response to the resumption or determination, the DU 174 transmits 544 the (new) system information to the UE 102 via broadcast. In response to the resumption or determination of the event 542, the DU 174 transmits (e.g., broadcast) 546 the first or third MBS broadcast configuration message via the (new) MBS control information.

The events 534, 536, 538, and 540 are collectively referred to in FIG. 5G as an MBS resource resume procedure 590. After the procedure 590, 542, 544 or 546, the CN 110 can transmit 548 MBS data of the first MBS session to the CU 172, similar to the event 518. In turn, the CU 172 can transmit 550 the MBS data of the first MBS session to the DU 174, similar to the event 520. The DU 174 then transmit 552 the MBS data of the first MBS session to the UE 102, similar to the event 522. In some implementations, the DU 174 can use the (reset) RLC state variable to transmit 552 the MBS data of the first MBS session.

In some implementations, the CU 172 includes the CU-CP 172A and the CU-UP 172B. In such cases, the events 534, 536, 538, and 540 occur between the CU-CP 172A of the CU 172, the CN 110, and the DU 174. After receiving the message of the event 534, the CU-CP 172A can send an MBS Bearer Context Modification Request message (not shown in FIG. 5G) including the first MBS session ID and/or the MRB ID(s) to the CU-UP 172B to request the CU-UP 172B to resume resources and/or operation for the first MBS session. In some implementations, the CU-CP 172A excludes a PDU session ID from the MBS Bearer Context Modification Request message. In response to the MBS Bearer Context Modification Request message, the CU-UP 172B can resume the suspended resources (e.g., the MBS bearer context) and/or operation for the first MBS session and send an MBS Bearer Context Modification Response message. After resuming the suspended resources and/or operation, the CU-UP 172B can use the retained PDCP entity/entities to transmit (e.g., broadcast) 550 the MBS data of the first MBS session to the DU 174 in response to or after receiving the MBS Bearer Context Modification Request message. In one implementation, the CU-UP 172B can use the retained PDCP state variable to transmit 550 the MBS data. In another implementation, the CP-UP 172B can reset the PDCP state variable in response to the MBS Bearer Context Modification Request message and then use the PDCP state variable to transmit 552 the MBS data of the first MBS session to the UE 102.

Figure 5H:
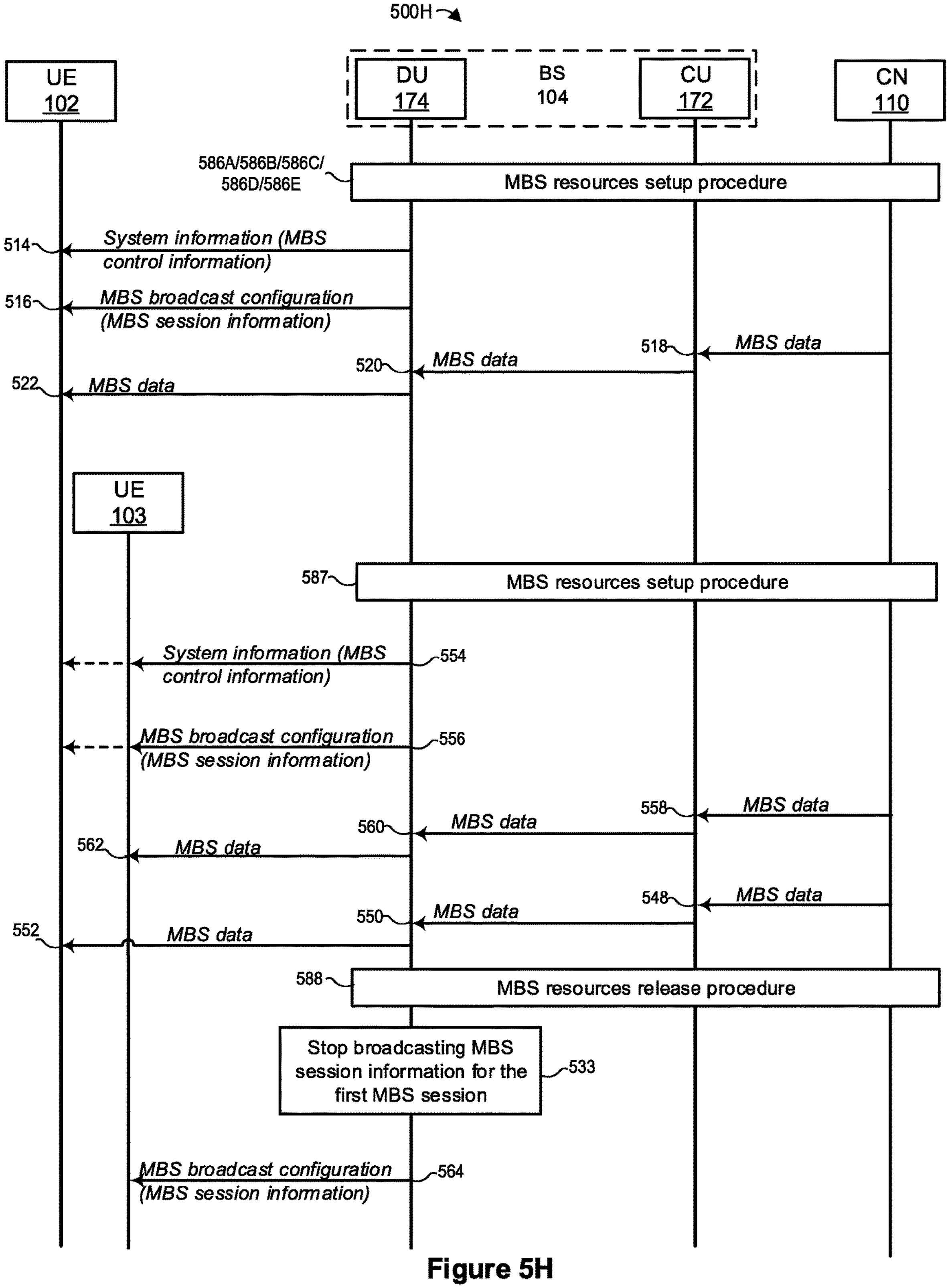
FIG. 5H is a messaging diagram of an example scenario which may be similar to any one of the scenarios illustrated by FIGS. 5A-5E, where the distributed base station also configures resources for transmitting MBS data of another MBS session via broadcast, and later releases the resources for the initial MBS session.

FIG. 5H is a messaging diagram of an example scenario 500H similar to the scenarios 500A-E, where the base station 104 also configures resources for transmitting MBS data of a second MBS session via broadcast.

The scenario 500H may begin with any one of the MBS resource setup procedures 586A-E to set up resources for a first MBS session. After transmitting 518 the MBS data for the first MBS session, the CN 110 can determine to set up resources for a second MBS session. In response to the determination, the CN 110, the CU 172 and the DU 174 can perform 587 an MBS resources setup procedure for a second MBS session, similar to any one of the procedures 586A-E. In the MBS resources setup procedure 587, the CU 172 or DU 174 generates second MBS session information, including a second MBS session ID, a second G-RNTI and second MRB configuration(s), for the second MBS session. The second MBS session ID identifies the second MBS session and the second MRB configuration(s) configure one or more MRBs for the second MBS session. The CU 172 or DU 174 can additionally include a second DRX configuration and/or second neighbor cell information in the second MBS session information. In response to or after performing the MBS resources setup procedure 587, the DU 174 can transmit 554 system information and 556 a second MBS broadcast configuration message via broadcast, similar to the events 514 and 516 respectively. More specifically, the CU 172 or DU 174 can include the first MBS session information and the second MBS session information in the second MBS broadcast configuration message. Accordingly, the UE 102 (i.e., a UE interested in receiving the first MBS session) and the UE 103 (a UE interested in receiving the second MBS session) can each receive the broadcasted second MBS broadcast configuration message including the first MBS session information and the second MBS session information.

In some implementations, the DU 174 sets the second G-RNTI and the first G-RNTI to different values. In other implementations, the DU 174 sets the second G-RNTI and the first G-RNTI to the same value. In some implementations, the CU 172 can indicate, in an MBS Context Setup Request or a CU-to-DU message in the procedure 587, whether the second MBS session is multiplexed with the first MBS session. For example, the CU 172 can include, in an MBS Context Setup Request or a CU-to-DU message in the procedure 587, a first indication indicating that the second MBS session is multiplexed with the first MBS session. In response to the first indication, the DU 174 can set the second G-RNTI and the first G-RNTI to the same value. In cases where the DU 174 does not receive the first indication in the procedure 587, the DU 174 sets the second G-RNTI and the first G-RNTI to different values. In another example, the CU 172 can include, in the MBS Context Setup Request or the CU-to-DU message in the procedure 587, a second indication indicating that the second MBS session is not multiplexed with the first MBS session. In response to the second indication, the DU 174 can set the second G-RNTI and the first G-RNTI to different values. In cases where the DU 174 does not receive the second indication in the procedure 587, the DU 174 sets the second G-RNTI and the first G-RNTI to the same value.

Similar to establishing the first common CN-to-BS DL tunnel, the CU 172 can establish a second common CN-to-BS DL tunnel with the CN 110 in the MBS resources setup procedure 587. An MBS Session Resource Setup Response message of the procedure 587 can include a second CU DL transport layer configuration to configure the second common CN-to-BS DL tunnel for the CN 110 to send MBS data of the second MBS session to the CU 172. The second CU DL transport layer configuration includes transport layer information, such as a transport layer address (e.g., an IP address) and/or a TEID, to identify the second common CN-to-BS DL tunnel. Similar to establishing the first common CU-to-DU DL tunnel, the DU 174 can establish at least one second common CU-to-DU DL tunnel with the CU 172 in the MBS resources setup procedure 587. An MBS Context Setup Response message of the procedure 587 can include at least one second DU DL transport layer configuration to configure the at least one second common CU-to-DU DL tunnel for the second MBS session.

After the MBS resource setup procedure 587, the CN 110 sends 558 MBS data of the second MBS session to the CU 172 via the second common CN-to-BS DL tunnel. In turn, the CU 172 transmits 560 the MBS data to the DU 174 via the second common CU-to-DU DL tunnel and/or additional common CU-to-DU DL tunnel in accordance with the second PDCP configuration(s). The DU 174 then transmits (i.e., broadcasts) 562 the MBS data in accordance with the MBS broadcast configuration message (e.g., via the second logical channel(s) identified by the second logical channel ID(s), and using the second RLC configuration(s) and/or the second G-RNTI). The UE 103 receives 562 the MBS data in accordance with the second MBS broadcast configuration or the second MBS session information. For example, the CU 172 receives 558 an MBS data packet, generates a PDCP PDU including the MBS data packet in accordance with the PDCP configuration, and transmits 560 the PDCP PDU to the DU 174 via the second common CU-to-DU DL tunnel. In some implementations, the CU 172 can use a PDCP state variable to generate a PDCP sequence number included in the PDCP PDU. In some implementations, the DU 174 generates a MAC PDU including the second logical channel ID and the PDCP PDU, and transmits 562 the MAC PDU to the UE 103 using the second G-RNTI. In some implementations, the DU 174 can use an RLC state variable to generate the RLC sequence number. The UE 103 receives 562 the MAC PDU using the second G-RNTI, retrieves the second logical channel ID and the PDCP PDU from the MAC PDU, identifies the PDCP PDU associated with the MRB based on the second logical channel ID, and retrieves the MBS data packet from the PDCP PDU in accordance with the first PDCP configuration. In other implementations, the DU 174 generates multiple RLC PDU segments including the PDCP PDU, where the multiple RLC PDU segments including an RLC sequence number (i.e., the same RLC sequence number) and each of the multiple RLC PDU segments incudes a particular portion of the PDCP PDU. In some implementations, the DU 174 can use an RLC state variable to generate the RLC sequence number. For each of the multiple RLC PDU segments, the DU 174 generates a MAC PDU including the first logical channel ID and the RLC PDU segment, and transmits 562 the MAC PDUs to the UE 102 using the second G-RNTI. The UE 103 receives 562 the MAC PDUs using the second G-RNTI, retrieves the second logical channel ID and the RLC PDU segments from the MAC PDUs, assembles the RLC PDU segments to obtain the PDCP PDU, identifies the PDCP PDU associated with the MRB based on the second logical channel ID, and retrieves the MBS data packet from the PDCP PDU in accordance with the second PDCP configuration.

After the MBS resource setup procedure 587, the CN 110 transmits 548 MBS data of the first MBS session to the CU 172, similar to the event 518. In turn, the CU 172 transmits 550 the MBS data to the DU 174, similar to the event 520. Subsequently, the DU 174 transmits 552 the MBS data to the UE 102 via broadcast, similar to the event 522.

Later in time, the CN 110, the CU 172 and the DU 174 perform 588 the MBS resources release procedure to release resources for the first MBS session. In response to or after performing 588 the MBS resources release procedure, the DU 174 stops broadcasting the first MBS session information. To stop broadcasting the first MBS session information, the DU 174 can transmit 564 (e.g., broadcast) a second MBS broadcast configuration message, excluding the first MBS session information, in accordance with the MBS control information.

In some implementations, the CU 172 includes the CU-CP 172A and a CU-UP 172B. In such cases, the events of the procedure 587 occur between the CU-CP 172A of the CU 172, the CN 110, and the DU 174. In such cases, the events 518, 548, 558 and events 520, 550, 560 occur between the CN 110 and the CU-UP 172B, and between the CU-UP 172B and the DU 174, respectively. After receiving the MBS Context Setup Response message of the procedure 587, the CU-CP 172A can send to the CU-UP 172B an MBS Bearer Context Setup Request message including the second MBS session ID and/or MRB ID(s) of MRB(s) for the second MBS session to request the CU-UP to establish an MBS bearer context for the second MBS session and/or the MRB(s). In some implementations, the CU-CP 172A excludes a PDU session ID from the MBS Bearer Context Setup Request message. In response to the MBS Bearer Context Setup Request message, the CU-UP 172B can generate an MBS bearer context and send an MBS Bearer Context Setup Response message to the CU-CP 172A. In some implementations, the CU-UP can include the second CU DL transport layer configuration in the MBS Bearer Context Setup Response message, so that the CU-CP 172A can include the at least one second CU DL transport layer configuration in the MBS Session Resource Setup Response message. Thus, the CN 110 can transmit 558 the MBS data of the second MBS session to the CU-UP 172B via the at least one second common CN-to-BS DL tunnel.

In some implementations, the CU-CP 172A can include the second PDCP configuration(s) in the MBS Bearer Context Setup Request message, and the CU-UP 172B transmits 560 the MBS data of the second MBS session in accordance with the second PDCP configuration(s). In some implementations, the CU-UP 172B establishes PDCP entity/entities in accordance with the second PDCP configuration(s) and uses the PDCP entity/entities to transmit 560 the MBS data of the second MBS session to the DU 174. In some implementations, the CU-CP 172A includes the MRB ID(s) in the MBS Bearer Context Setup Request message, and the CU-CP 172A can associate each of the second PDCP configuration(s) with a particular MRB/MRB ID of the MRB(s)/MRB ID(s) and indicate the association(s) in the MBS Bearer Context Setup Request message. In some implementations, the CU-CP 172A includes the at least one second DU DL transport layer configuration in the MBS Bearer Context Setup Request message, so that the CU-UP 172B can transmit 560 the MBS data of the second MBS session via the at least one second common CU-to-DU DL tunnel to the DU 174.

In some implementations, the MBS bearer context can include the second PDCP configuration(s), the at least one second DU DL transport layer configuration, and/or the second CU DL transport layer configuration.

Figure 5I:
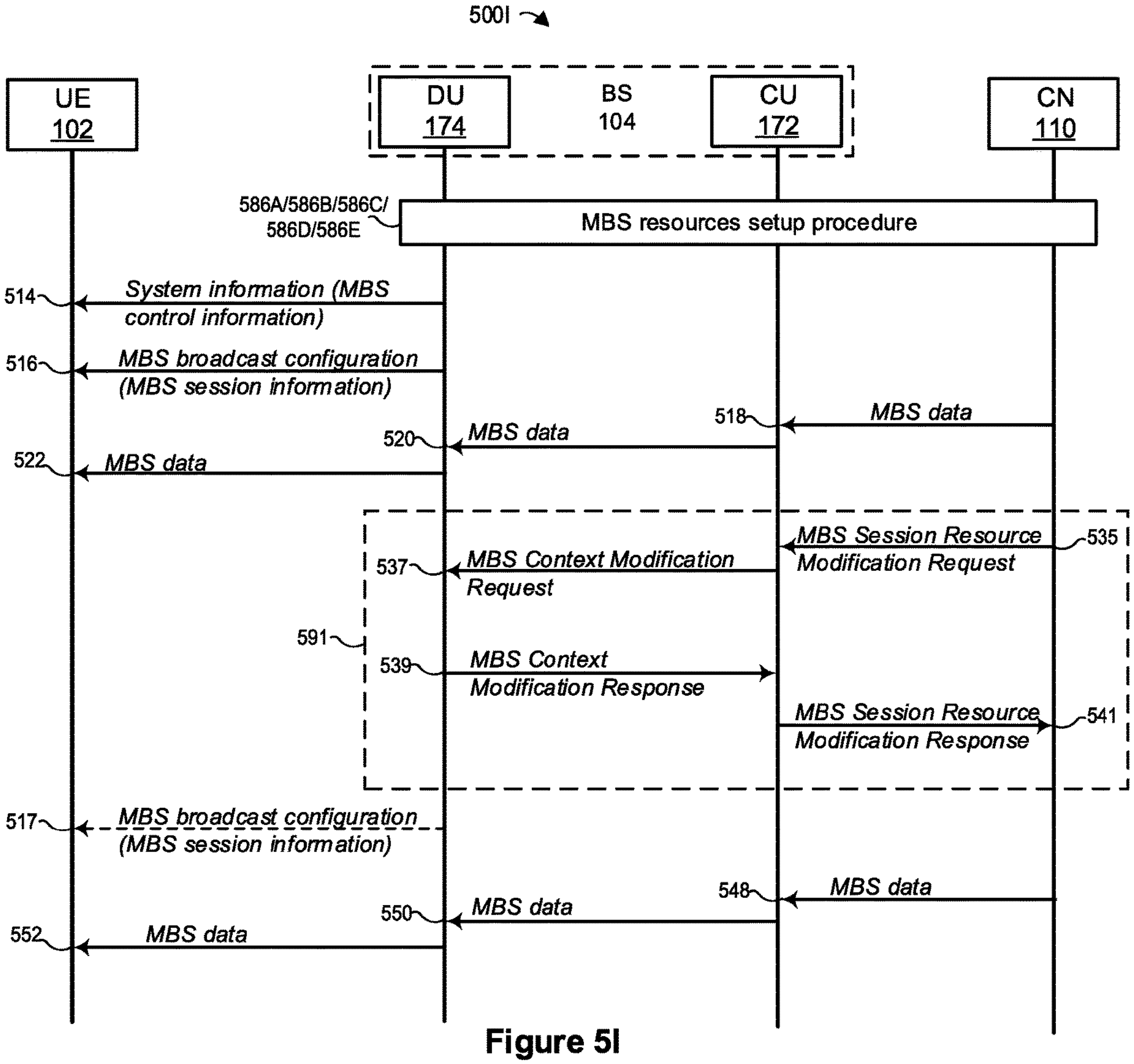
FIG. 5I is a messaging diagram of an example scenario which may be similar to any one of the scenarios illustrated by FIGS. 5A-5E, where the distributed base station later modifies the resources for the MBS session.

FIG. 5I is a messaging diagram of an example scenario 500I similar to the scenarios 500A-E, except that the base station 104 later modifies resources for the first MBS session. The scenario 500I may begin with any one of the MBS resource setup procedures 586A-E.

After transmitting 518 the MBS data, the CN 110 can determine to modify resources for the first MBS session. In response to the determination, the CN 110 transmits 535 to the CU 172 an MBS Session Resource Modification Request message including the first MBS session ID to request the CU 172 to modify resources for the first MBS session. In response to or after receiving 535 the MBS Session Resource Modification Request message, the CU 172 transmits 537 to the DU 174 an MBS Context Modification Request message to request the DU 174 to modify resources for the first MBS session or the MRB(s). In some implementations, the CU 172 can include the first MBS session ID and/or the MRB ID(s) in the MBS Context Modification Request message. In response, the DU 174 modifies resources for the first MBS session or the MRB(s) and transmits 539 an MBS Context Modification Response message to the CU 172. In response to or after receiving 539 the MBS Context Modification Response message, the CU 172 can transmit 541 an MBS Session Resource Modification Response message to the CN 110 to confirm that the resources for the first MBS session have been modified.

The events 535, 537, 539, and 541 are collectively referred to in FIG. 5H as an MBS resource modification procedure 591.

In some implementations, the CN 110 can include new QoS configuration(s) in the MBS Session Resource Modification Request message to request the CU 174 to modify resources for the first MBS session. In such cases, the CU 172 can include the new QoS configuration(s) in the MBS Context Modification Request message. Thus, the DU 174 can enforce the new QoS configuration(s) to transmit 552 the MBS data of the first MBS session.

In some implementations, the DU 174 can transmit 517 a new MBS broadcast configuration message including new MBS session information for the first MBS session via the one or more cells in accordance with the MBS control information, in response to or as a result of the MBS resource modification procedure 591. The new MBS session information can include the first MBS session ID, the first MRB configuration(s), a new MRB configuration (described below), and/or a DRX configuration (i.e., either the first DRX configuration or a new DRX configuration described below). In some implementations, the DU 174 can generate the new MBS session information or the new MBS broadcast configuration message as described for FIG. 5A. In other implementations, the CU 172 can generate the new MBS session information or the new MBS broadcast configuration message as described for FIG. 5C.

In some implementations, the CU 172 can generate a new DRX cycle configuration configuring or including a new DRX cycle length and include the new DRX cycle configuration in the MBS Context Modification Request message. In some implementations, the CU 172 can determine the new DRX cycle length in accordance with the new QoS configuration(s). In other implementations, the CU 172 can receive the new DRX cycle length in the MBS Session Resource Modification Request message. After receiving the new DRX cycle length, the DU 174 can generate the new DRX configuration (e.g., DRX-ConfigPTM IE) in accordance with the new DRX cycle length. In some implementations, the DU 174 generates the new MBS session information including the new DRX configuration and generate the new MBS broadcast configuration message including the new MBS session information. In other implementations, the DU 174 includes the new DRX configuration in the MBS Context Modification Response message. In such cases, the CU 172 generates the new MBS session information including the new DRX configuration and transmit a CU-to-DU message (e.g., F1AP message) including the new MBS session information to the DU 174. In turn, the DU 174 generates the new MBS broadcast configuration message including the new MBS session information. Alternatively, the CU 172 generates the new MBS broadcast configuration message including the new MBS session information and transmits a CU-to-DU message (e.g., F1AP message) including the new MBS session information to the DU 174.

In some implementations, the CU 172 can determine to configure an additional MRB for the first MBS session in response to the MBS Session Resource Modification Request message or in accordance with the new QoS configuration(s). For example, the new QoS configuration(s) includes a new QoS flow ID for a new QoS flow and the CU 172 determines to configure the additional MRB for the new QoS flow. In response to the determination, the CU 172 can include an additional PDCP configuration for the additional MRB in the MBS Context Modification Request message, similar to the event 504. The CU 172 might or might not include an additional MRB ID for the additional MRB in the MBS Context Modification Request message. After receiving the additional PDCP configuration, the DU 174 can generate an additional RLC configuration for the additional PDCP configuration or the additional MRB. The additional RLC configuration includes an additional logical channel ID. The DU 174 can generate an additional MRB configuration including the additional RLC configuration and the additional PDCP configuration, generate the new MBS session information (e.g., MBS-SessionInfo IE) including the first MBS session ID, the first G-RNTI, the first MRB configuration(s) and the additional MRB configuration, and generate the new MBS broadcast configuration message including the new MBS session information. The DU 174 then transmits 517 the new MBS broadcast configuration message in accordance with the MBS control information via the one or more cells, similar to the event 516. In some implementations, the DU 174 may include a new G-RNTI (value) in the new MBS session information instead of the first G-RNTI (value).

In alternative implementations, the DU 174 includes the additional RLC configuration in the MBS Context Modification Response message, similar to the event 505. In such cases, the CU 172 can generate the new MBS session information, similar to the event 511. In cases where the DU 174 includes a new G-RNTI (value) for the first MBS session in the MBS Context Modification Response message, the CU 172 includes the new G-RNTI (value) in the new MBS session information instead of the first G-RNTI (value). In some implementations, the CU 172 can transmit a CU-to-DU message including the new MBS session information to the DU 174. In such cases, the DU 174 generates the new MBS broadcast configuration message including the new MBS session information and transmits 517 the new MBS broadcast configuration message to the UE 102. In other implementations, the CU 172 generates the new MBS broadcast configuration message including the new MBS session information and transmits 517 the new MBS broadcast configuration message to the UE 102.

In some implementations, the DU 174 can include an additional DU DL transport layer configuration to configure an additional common CU-to-DU DL tunnel for the additional MRB. The additional DU DL transport layer configuration includes transport layer information, such as a transport layer address (e.g., an IP address) and/or a TEID, to identify the additional common CU-to-DU DL tunnel. The DU 174 can receive 550 MBS data of the first MBS session via the additional common CU-to-DU DL tunnel and transmit 552 the MBS data using the additional logical channel ID, similar to the event 522. The DU 174 can receive 550 MBS data of the first MBS session via the first common CU-to-DU DL tunnel and transmit 552 the MBS data using the first logical channel ID, similar to the event 522.

Next, several example methods that devices illustrated in FIGS. 1A and 1B, such as the CU 172 (which may include the CU-CP 172A and the CU-UP 172B) and the DU 174 of the base station 104, can implement are discussed with reference to FIGS. 6A-11. The example methods described with reference to FIGS. 6A-11 may be performed during the scenarios 500A-500I described above. Each of these methods can be implemented as a set of instructions stored on a non-transitory computer-readable medium and executable by one or more processors.

Figure 6A:
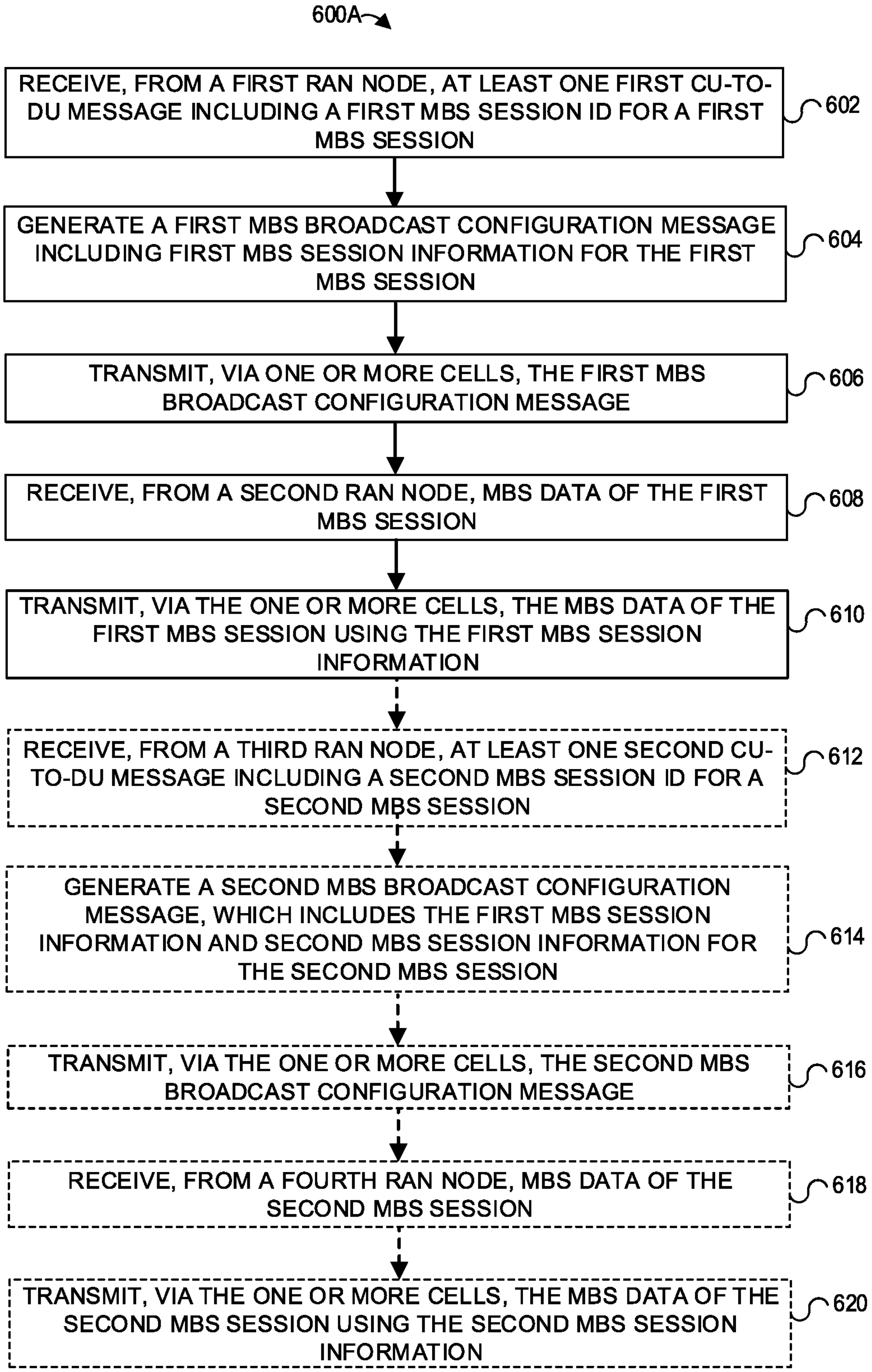
FIG. 6A is a flow diagram of an example method for configuring resources for one or more MBS sessions, which can be implemented in a DU, where the DU receives session identifiers (IDs) for the respective one or more MBS sessions in respective CU-to-DU messages.

Referring first to FIG. 6A, a DU such as the DU 174 can implement a method 600A to transmit configuration parameters for transmitting MBS data of an MBS session.

The method 600A begins at block 602, where the DU receives, from a first RAN node, at least one first CU-to-DU message including a first MBS session ID for a first MBS session (see, e.g., events 503, 504, 510, 513, 537, 586A-E, 591). At block 604, the DU generates a first MBS broadcast configuration message including first MBS session information for the first MBS session (see e.g., events 512, 515, 586A-E, 591). Alternatively, the DU receives the first MBS broadcast configuration message in one of the at least one first CU-to-DU message from the first RAN node (see e.g., event 513). At block 606, the DU transmits the first MBS broadcast configuration message via one or more cells (see e.g., events 516, 517, 546). At block 608, the DU receives MBS data of the first MBS session from a second RAN node (see e.g., events 520, 550). At block 610, the DU transmits the MBS data of the first MBS session, via the one or more cells, using the first MBS session information (e.g., 522, 552).

At block 612, the DU receives, from a third RAN node, at least one second CU-to-DU message including a second MBS session ID for a second MBS session (see, e.g., event 587). At block 614, the DU generates a second MBS broadcast configuration message, which includes the first MBS session information and second MBS session information for the second MBS session (see, e.g., event 587). Alternatively, the DU receives the second MBS broadcast configuration message in one of the at least one second CU-to-DU message from the third RAN node (see, e.g., events 513, 587). As the first MBS broadcast configuration message does not include the second MBS session information, the second MBS broadcast configuration message replaces the first MBS broadcast configuration message. At block 616, the DU transmits the second MBS broadcast configuration message via the one or more cells (see e.g., event 556), as described for the scenario 500H. At block 618, the DU receives MBS data of the second MBS session from a fourth RAN node (see, e.g., event 560). At block 620, the DU transmits the MBS data of the second MBS session, via the one or more cells, using the second MBS session information (see, e.g., event 562). After transmitting the second MBS broadcast configuration message, the DU can receive subsequent MBS data of the first MBS session from the second RAN node and transmit the subsequent MBS data via the one or more cells using the first MBS session information.

In accordance with the method 600A, the DU can transmit new MBS session information for a new MBS session.

In some implementations, the at least one first CU-to-DU message can include an MBS session setup list, which includes the first MBS session ID. Similarly, the at least one second CU-to-DU message can include an MBS session setup list, which includes the second MBS session ID. In some implementations, the DU can generate the first MBS session information and/or the second MBS session information. In other implementations, the DU can receive the first MBS session information and/or the second MBS session information from the first RAN node and/or the third RAN node, respectively. In such cases, the DU can include the first MBS session information and/or the second MBS session information in the first MBS broadcast configuration message and the second MBS broadcast configuration message, respectively.

In some implementations, the first MBS session information includes the first MBS session ID, a first G-RNTI and/or at least one first MRB configuration. Each of the at least one first MRB configuration can include a first PDCP configuration and/or a first RLC configuration. The first MBS session information can additionally include a first DRX configuration. Similarly, the first MBS session information can include the second MBS session ID, a second G-RNTI and/or at least one second MRB configuration. Each of the at least one second MRB configuration can include a second PDCP configuration and/or a second RLC configuration. The second MBS session information can additionally include a second DRX configuration.

In some implementations, the at least one first CU-to-DU message includes the first PDCP configuration(s). In other implementations, the at least one first CU-to-DU message does not include the first PDCP configuration(s). In such cases, the DU can receive the first PDCP configuration(s) from a first operation, administration and maintenance (OAM) node, in one implementation. In another implementation, the first PDCP configuration(s) is preconfigured for the first MBS session ID. That is, the DU has stored the first PDCP configuration(s) before receiving the at least one first CU-to-DU message.

In some implementations, the at least one second CU-to-DU message includes the second PDCP configuration(s). In other implementations, the at least one second CU-to-DU message does not include the second PDCP configuration(s). In such cases, the DU can receive the second PDCP configuration from a second OAM, in one implementation. In another implementation, the second PDCP configuration(s) is preconfigured for the second MBS session ID. That is, the DU has stored the second PDCP configuration(s) before receiving the at least one second CU-to-DU message. The first and second OAM nodes can be the same OAM node or different OAM nodes.

In some implementations, the first RAN node and the second RAN node are the same RAN node (e.g., CU). In other implementations, the first RAN node and the second RAN node are different RAN nodes. In such cases, the first RAN node can be a CU-CP and the second RAN node can be a CU-UP. In some implementations, the third RAN node and the fourth RAN node are the same RAN node (e.g., CU). In other implementations, the third RAN node and the fourth RAN node are different RAN nodes. In such cases, the third RAN node can be a CU-CP and the fourth RAN node can be a CU-UP. In some implementations, the first RAN node and third RAN node can be the same CU or CU-CP. In other implementations, the first RAN node and third RAN node are different CUs or CU-CPs. In some implementations, the second RAN node and the fourth RAN node are the same CU-UP. In other implementations, the second RAN node and the fourth RAN node are different CU-UPs.

In response to the at least one first CU-to-DU message, the DU in some implementations can generate the first DRX configuration for a first DRX cycle. In the first DRX cycle configuration, the DU can include at least one first DRX parameter such as a DRX on duration timer value, a DRX inactivity timer value, a DRX slot offset value, a DRX cycle start offset configuration, a DRX retransmission timer value and/or a DRX HARQ round-trip time timer value. The DRX cycle start offset configuration indicates or includes a DRX cycle length and a subframe number where the first DRX cycle starts. In some implementations, the at least one first CU-to-DU message can include a first DRX cycle configuration for the first MBS session. The first DRX cycle configuration includes a first DRX cycle length. In some implementations, the first DRX cycle configuration is a CU-to-DU interface protocol IE. In such cases, the DU configures the DRX cycle length in the DRX cycle start offset configuration as the first DRX cycle length. In cases where the at least one first CU-to-DU message does not include a DRX cycle configuration for the first MBS session, the DU configures the DRX cycle length in the DRX cycle start offset configuration as a preconfigured DRX cycle length.

In other implementations, the DU receives the first DRX configuration from the first RAN node in one of the at least one first CU-to-DU message instead of generating the first DRX configuration autonomously.

Similarly, in response to the at least one second CU-to-DU message, the DU in some implementations can generate the second DRX configuration for a second DRX cycle. In the second DRX cycle configuration, the DU can include at least one second DRX parameter such as a DRX on duration timer value, a DRX inactivity timer value, a DRX slot offset value, a DRX cycle start offset configuration, a DRX retransmission timer value and/or a DRX HARQ round-trip time timer value. The DRX cycle start offset configuration indicates or includes a DRX cycle length and a subframe number where the second DRX cycle starts. In some implementations, the at least one first CU-to-DU message can include a second DRX cycle configuration for the first MBS session. The second DRX cycle configuration includes a second DRX cycle length. In some implementations, the second DRX cycle configuration is a CU-to-DU interface protocol IE). In such cases, the DU configures the DRX cycle length in the DRX cycle start offset configuration as the second DRX cycle length. In cases where the at least one second CU-to-DU message does not include a DRX cycle configuration, the DU configures the DRX cycle length in the DRX cycle start offset configuration as a preconfigured DRX cycle length.

In other implementations, the DU receives the second DRX configuration from the third RAN node in one of the at least one second CU-to-DU message instead of generating the first DRX configuration autonomously.

In some implementations, the first DRX cycle length and the second DRX cycle length can be the same or different. A RAN node (e.g., the first or third RAN node or the DU) can determine a DRX cycle length (e.g., the first or second DRX cycle length) in accordance with one or more QoS configurations required for an MBS session (e.g., the first or second MBS session).

In some implementations, the at least one first DRX parameter and the at least one second DRX parameter includes the same or different parameters. For example, the at least one first DRX parameter and the at least one second DRX parameter includes a first on duration of the first DRX cycle and a second on duration of the second DRX cycle, respectively. The DU transmits the MBS data of the first MBS session and the MBS data of the second MBS session within the first on duration and the second on duration respectively. The DU can configure the first on duration and the second on duration to not overlap in order to provide sufficient radio resources to transmit the MBS data of the first MBS session and the MBS data of the second MBS session. On the other hand, the DU can configure the first on duration and the second on duration to partially or completely overlap in order to simplify the DU implementation and save power for UEs simultaneously receiving the first MBS session and the second MBS session.

Figure 6B:
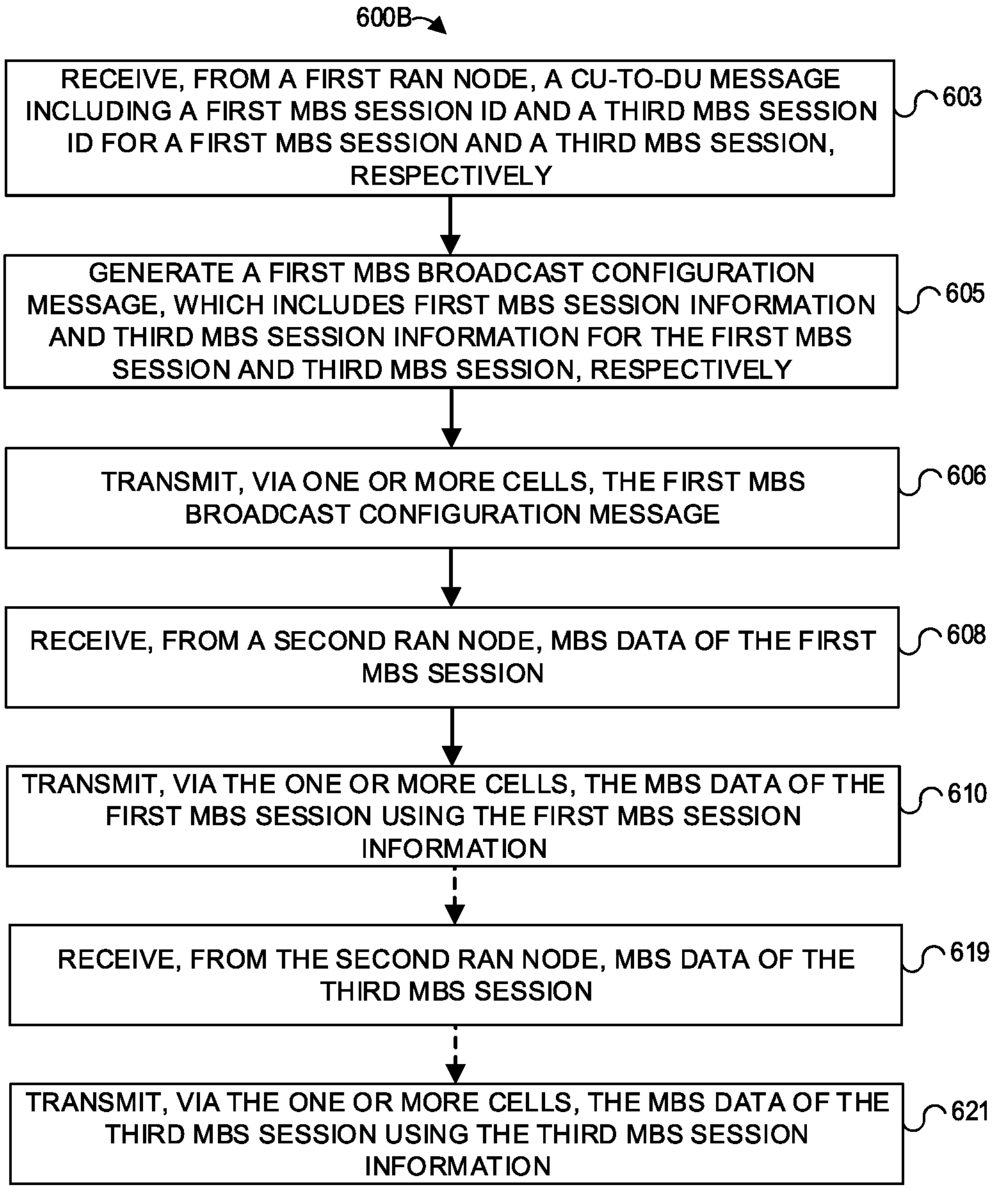
FIG. 6B is a flow diagram of an example method similar to the method of FIG. 6A, but where the DU receives session IDs for the respective one or more MBS sessions in a single CU-to-DU message.

FIG. 6B is a flow diagram of an example method 600B, which is similar to the method 600A except that the DU receives a CU-to-DU message including session IDs for two MBS sessions rather than a single MBS session.

The method 600B begins at block 603, where the DU receives, from a first RAN node, a CU-to-DU message including a first MBS session ID and a third MBS session ID for a first MBS session and a third MBS session respectively (see, e.g., events 503, 504, 510, 513, 537, 586A-E, 591). In some implementations, the CU-to-DU message can be one of the at least one first CU-to-DU message described in FIG. 6A. At block 605, the DU generates a first MBS broadcast configuration message including first MBS session information and third MBS session information for the first MBS session and third MBS session, respectively (see e.g., events 512, 515, 586A-E, 591). Alternatively, the DU receives the first MBS broadcast configuration message in the CU-to-DU message from the first RAN node (see e.g., event 513). After transmitting the first MBS broadcast configuration message, the DU can receive MBS data of the first MBS session and MBS data of the third MBS session at blocks 608 and 619, respectively. At block 610, the DU transmits the MBS data of the first MBS session, via the one or more cells, using the first MBS session information. At block 621, the DU transmits the MBS data of the third MBS session, via the one or more cells, using the third MBS session information.

In some implementations, the third MBS session information includes the third MBS session ID, a third G-RNTI and/or at least one third MRB configuration. Each of the at least one third MRB configuration can include a third PDCP configuration and/or a third RLC configuration. The third MBS session information can additionally include a third DRX configuration. In some implementations, the CU-to-DU message includes the first PDCP configuration(s) and/or the third PDCP configuration(s). In other implementations, the CU-to-DU message does not include the first and/or third PDCP configuration(s). In such cases, the DU can receive the first and/or third PDCP configuration(s) from the first OAM node, in one implementation. In another implementation, the first and/or third PDCP configuration(s) are preconfigured for the first and/or third MBS session IDs, respectively. That is, the DU has stored the first and/or third PDCP configuration(s) before receiving the CU-to-DU message.

In response to the CU-to-DU message, the DU in some implementations can generate the first DRX configuration for the first DRX cycle as described for FIG. 6A. In response to the CU-to-DU message, the DU in some implementations can generate a third DRX configuration for a third DRX cycle. In the third DRX cycle configuration, the DU can include at least one third DRX parameter such as a DRX on duration timer value, a DRX inactivity timer value, a DRX slot offset value, a DRX cycle start offset configuration, a DRX retransmission timer value and/or a DRX HARQ round-trip time timer value. The DRX cycle start offset configuration indicates or includes a DRX cycle length and a subframe number where the third DRX cycle starts. In some implementations, the CU-to-DU message can include the first DRX cycle configuration for the first MBS session, as described for FIG. 6A. The CU-to-DU message can include a third DRX cycle configuration for the third MBS session. The third DRX cycle configuration includes a third DRX cycle length. In some implementations, the third DRX cycle configuration is a CU-to-DU interface protocol IE. In such cases, the DU configures the DRX cycle length in the DRX cycle start offset configuration as the third DRX cycle length. In cases where the CU-to-DU message does not include a DRX cycle configuration for the third MBS session, the DU configures the DRX cycle length in the DRX cycle start offset configuration as a preconfigured DRX cycle length.

In other implementations, the DU receives the third DRX configuration from the first RAN node in one of the at least one first CU-to-DU message instead of generating the third DRX configuration autonomously.

In some implementations, the first DRX cycle length and the third DRX cycle length can be the same or different. A RAN node (e.g., the first RAN node or the DU) can determine a DRX cycle length (e.g., the first or third DRX cycle length) in accordance with one or more QoS configurations required for an MBS session (e.g., the first or third MBS session).

In some implementations, the at least one first DRX parameter and the at least one third DRX parameter includes the same or different parameters. For example, the at least one first DRX parameter and the at least one third DRX parameter includes a first on duration of the first DRX cycle and a third on duration of the third DRX cycle, respectively. The DU transmits the MBS data of the first MBS session and the MBS data of the third MBS session within the first on duration and the third on duration, respectively. The DU can configure the first on duration and the third on duration to not overlap in order to provide sufficient radio resources to transmit the MBS data of the first MBS session and the MBS data of the third MBS session. On the other hand, the DU can configure the first on duration and the third on duration to partially or completely overlap in order to simplify the DU implementation and save power for UEs simultaneously receiving the first MBS session and the third MBS session.

Figure 7A:
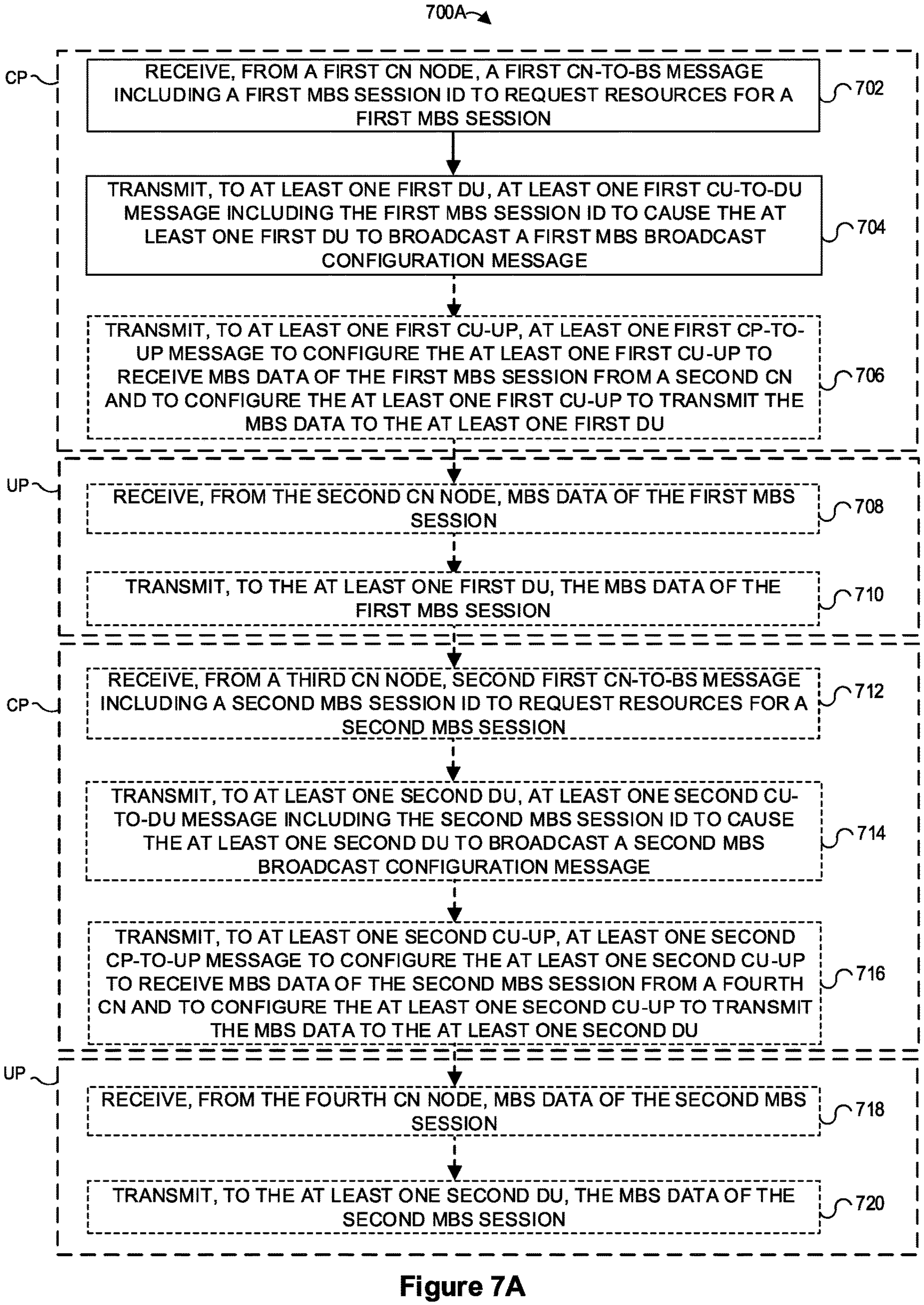
FIG. 7A is a flow diagram of an example method for configuring resources for one or more MBS sessions, which can be implemented in a CU, where the CU transmits session IDs for the respective one or more MBS sessions in respective CU-to-DU messages.

Referring next to FIG. 7A, a CU such as the CU 172 can implement a method 700A to transmit configuration parameters for transmitting MBS data of an MBS session. In some implementations, a CU-CP and a CU-UP of the CU, such as the CU-CP 172A and the CU-UP 172B, respectively, implement the method 700A. Control plane functions that may be performed by the CU-CP are illustrated within a box labeled "CP," and user plane functions that may be performed by the CU-UP are illustrated within a box labeled "UP." These "CP" and "UP" boxes are similarly used in FIGS. 7B and 9A-9B to illustrate control plane and user plane functions that may be performed by the CU-CP and CU-UP, respectively.

The method 700A begins at block 702, where the CU or CU-CP receives, from a first CN node, a first CN-to-BS message including a first MBS session ID to request resources for a first MBS session (see, e.g., events 502, 586A-E). At block 704, the CU or CU-CP transmits, to at least one first DU, at least one first CU-to-DU message including the first MBS session ID to cause the at least one first DU to broadcast a first MBS broadcast configuration message (see, e.g., events 503, 504, 510, 513, 537, 586A-E, 591). At block 706, the CU or CU-CP transmits, to at least one first CU-UP, at least one first CP-to-UP message to configure the at least one first CU-UP to receive MBS data of the first MBS session from a second CN and to configure the at least one first CU-UP to transmit the MBS data to the at least one first DU. At block 708, the CU or CU-UP receives MBS data of the first MBS session from the second CN node (see e.g., events 518, 548). At block 710, the CU or CU-UP transmits the MBS data of the first MBS session to the at least one first DU (see e.g., events 520, 550).

At block 712, the CU or CU-CP receives, from a third CN node, second first CN-to-BS message including a second MBS session ID to request resources for a second MBS session (see e.g., event 587). At block 714, the CU or CU-CP transmits, to at least one second DU, at least one second CU-to-DU message including the second MBS session ID to cause the at least one second DU to broadcast a second MBS broadcast configuration message (see, e.g., event 587), as described for the scenario 500H At block 716, the CU or CU-CP transmits, to at least one second CU-UP, at least one second CP-to-UP message to configure the at least one second CU-UP to receive MBS data of the second MBS session from a fourth CN and to configure the at least one second CU-UP to transmit the MBS data to the at least one second DU. At block 718, the CU or CU-UP receives MBS data of the second MBS session from the fourth CN node (see e.g., event 560). At block 720, the CU or CU-UP transmits the MBS data of the second MBS session to the at least one second DU (see e.g., event 562).

The first MBS session ID and the second MBS session ID identify the first MBS session and the second MBS session, respectively. In some implementations, the first CN node and the third CN node are the same CN node (e.g., AMF). In other implementations, the first CN node and the third CN node are different CN nodes (e.g., AMFs). In some implementations, the second CN node and the fourth CN node are the same CN node (e.g., UPF). In other implementations, the second CN node and the fourth CN node are different CN nodes (e.g., (MB-)UPFs). In some implementations, the at least one first DU and the at least one second DU can include the same DUs and/or different DUs.

In some implementations, the at least one first CU-to-DU message and the at least one second CU-to-DU message are as described for FIG. 6A. In some implementations, the first and second MBS broadcast configuration messages are as described for FIG. 6A. In some implementations, the at least one first CU-to-DU message and the at least one second CU-to-DU message can include the first PDCP configuration(s) and the second PDCP configuration(s), respectively, as described for FIG. 6A. In other implementations, the at least one first CU-to-DU message and the at least one second CU-to-DU message can include the first MRB configuration(s) and the second MRB configuration(s), respectively, as described for FIG. 6A. In yet other implementations, the at least one first CU-to-DU message and the at least one second CU-to-DU message can include the first MBS session information and the second MBS session information, respectively, as described for FIG. 6A.

Figure 7B:
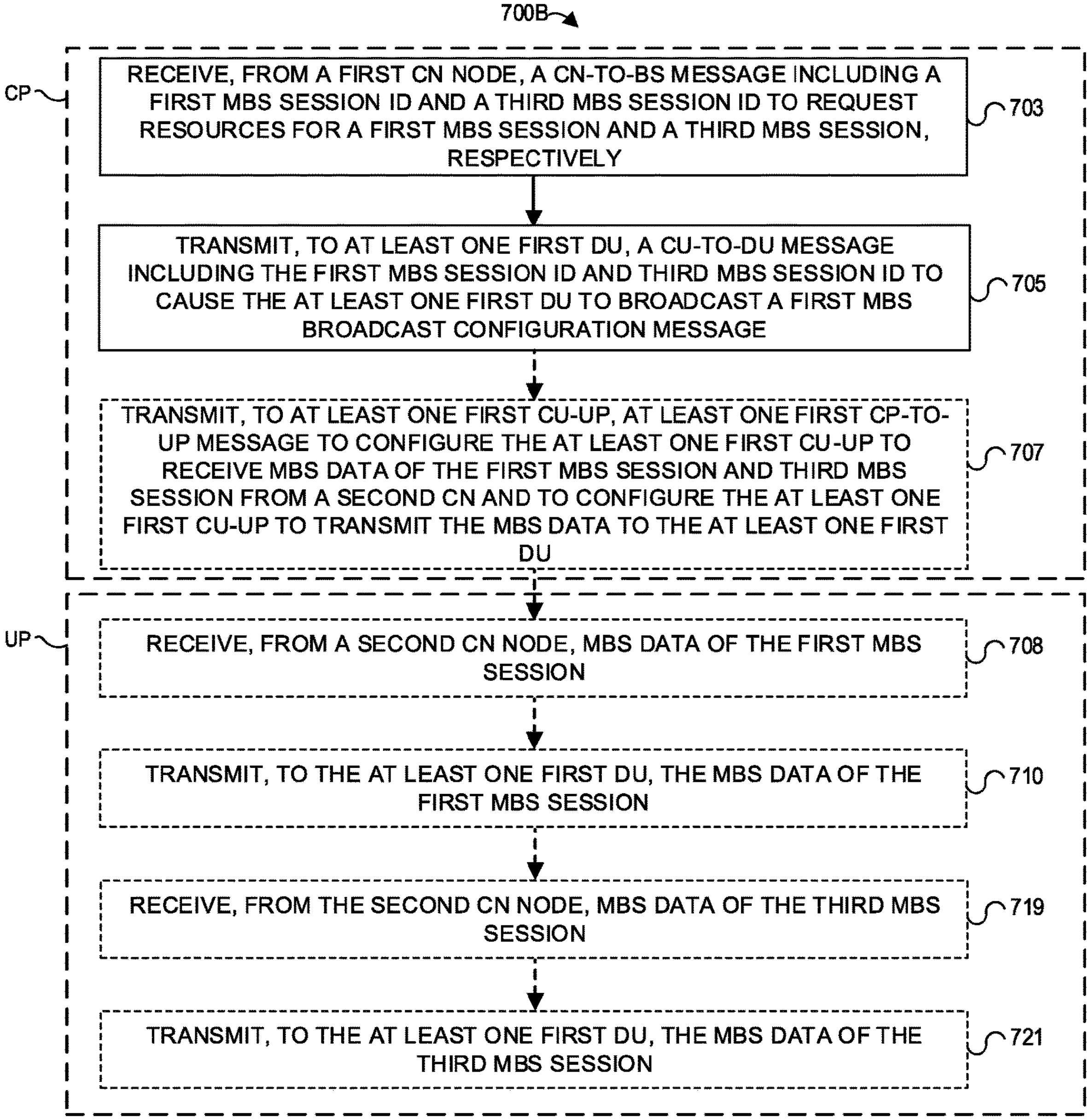
FIG. 7B is a flow diagram of an example method similar to the method of FIG. 7A, but where the CU transmits session IDs for the respective one or more MBS sessions in a single CU-to-DU message.

FIG. 7B is a flow diagram of an example method 700B, similar to the method 700A of FIG. 7A, except for blocks 703, 705, 707, 719 and 721. Similar to the method 700A, in some implementations, a CU-CP and a CU-UP of the CU implement the method 700B, where example respective functions of the CU-CP and the CU-UP are indicated in FIG. 7B by the boxes labeled "CP" and "UP." Further, similar to the method 600B, the CU transmits a CU-to-DU message including session IDs for two MBS sessions.

The method 700B begins at block 703, where the CU or CU-CP receives, from a first CN node, a CN-to-BS message including a first MBS session ID and a third MBS session ID to request resources for a first MBS session and a third MBS session, respectively (see, e.g., events 502, 586A-E, 587). At block 705, the CU or CU-CP transmits, to at least one first DU, a CU-to-DU message including the first MBS session ID and third MBS session ID to cause the at least one first DU to broadcast a first MBS broadcast configuration message (see, e.g., events 503, 504, 510, 513, 537, 586A-E, 587, 591). In some implementations, the CU-to-DU message can be one of the at least one first CU-to-DU message described in FIG. 7A. At block 707, the CU or CU-CP transmits, to at least one first CU-UP, at least one first CP-to-UP message to configure the at least one first CU-UP to receive MBS data of the first MBS session and third MBS session from a second CN and to configure the at least one first CU-UP to transmit the MBS data to the at least one first DU. At block 719, the CU or CU-UP receives MBS data of the third MBS session from the second CN node (see e.g., events 518, 548). At block 721, the CU or CU-UP transmits the MBS data of the third MBS session to the at least one first DU (see e.g., events 520, 550).

The first MBS session ID and the third MBS session ID identify the first MBS session and the third MBS session, respectively. In some implementations, the CU-to-DU message are as described for FIG. 6B. In some implementations, the first MBS broadcast configuration message is as described for FIG. 6B. In some implementations, the CU-to-DU message can include the first PDCP configuration(s) and the third PDCP configuration(s), as described for FIG. 6B. In other implementations, the CU-to-DU message can include the first MRB configuration(s) and the third MRB configuration(s), respectively, as described for FIG. 6B. In yet other implementations, the CU-to-DU message can include the first MBS session information and the third MBS session information, respectively, as described for FIG. 6B.

Figure 8A:
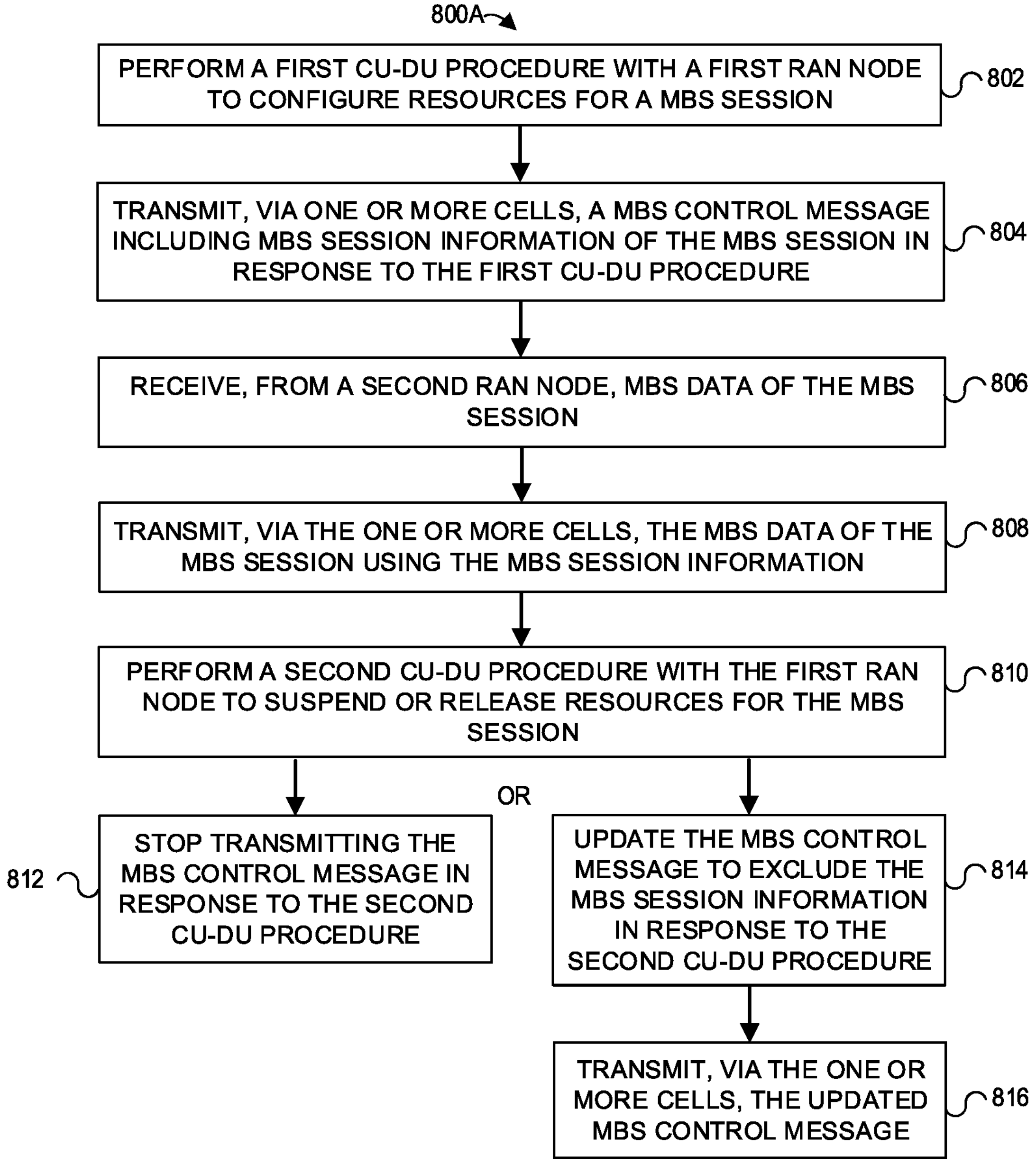
FIG. 8A is a flow diagram of an example method for suspending or releasing resources for an MBS session, which can be implemented in a DU.

Now, referring to FIG. 8A, a DU such as the DU 174 can implement a method 800A to set up and later suspend or release resources for an MBS session. The method 800A begins at block 802, where the DU performs a first CU-DU procedure with a first RAN node to configure resources for an MBS session (see, e.g., events 503, 504, 510, 513, 537, 586A-E, 587, 591). At block 804, the DU transmits an MBS control message including MBS session information of the MBS session via one or more cells in response to the first CU-DU procedure (see e.g., events 516, 517, 546, 556). For example, the MBS control message can be an MBS broadcast configuration message. At block 806, the DU receives MBS data of the MBS session from a second RAN node (see e.g., events 520, 550, 560). At block 808, the DU transmits the MBS data of the MBS session via the one or more cells using the MBS session information (see e.g., events 522, 552, 562). At block 810, the DU performs a second CU-DU procedure with the first RAN node to suspend or release resources for the MBS session (see e.g., events 526, 528, 527, 529, 588, 589). Then, the flow can proceed either block 812 or block 814. At block 812, the DU stops transmitting the MBS control message in response to the second CU-DU procedure (see, e.g., event 532). At block 814, the DU updates the MBS control message to exclude the MBS session information in response to the second CU-DU procedure (see e.g., event 533). At block 816, the DU transmits the updated MBS control message via the one or more cells (see e.g., event 564).

In some implementations, the DU can determine to stop transmitting the MBS control message (i.e., proceed to block 812) or determine to update the MBS control message to exclude the MBS session information (i.e., proceed to block 814), depending on whether the MBS session is the last (i.e., only) MBS session for which the DU configures resources. In cases where the MBS session is the last MBS session, the DU can stop transmitting the MBS control message. In cases where the MBS session is not the last MBS session (i.e., there are other MBS session(s) for which the DU configures resources, the DU can update the MBS control message to exclude the MBS session information of the MBS session, and transmit the updated MBS control message.

In some implementations, the first RAN node and second RAN node can be the same RAN node (e.g., CU). In other implementations, the first RAN node and the second RAN node can be a CU-CP and a CU-UP, respectively.

Figure 8B:
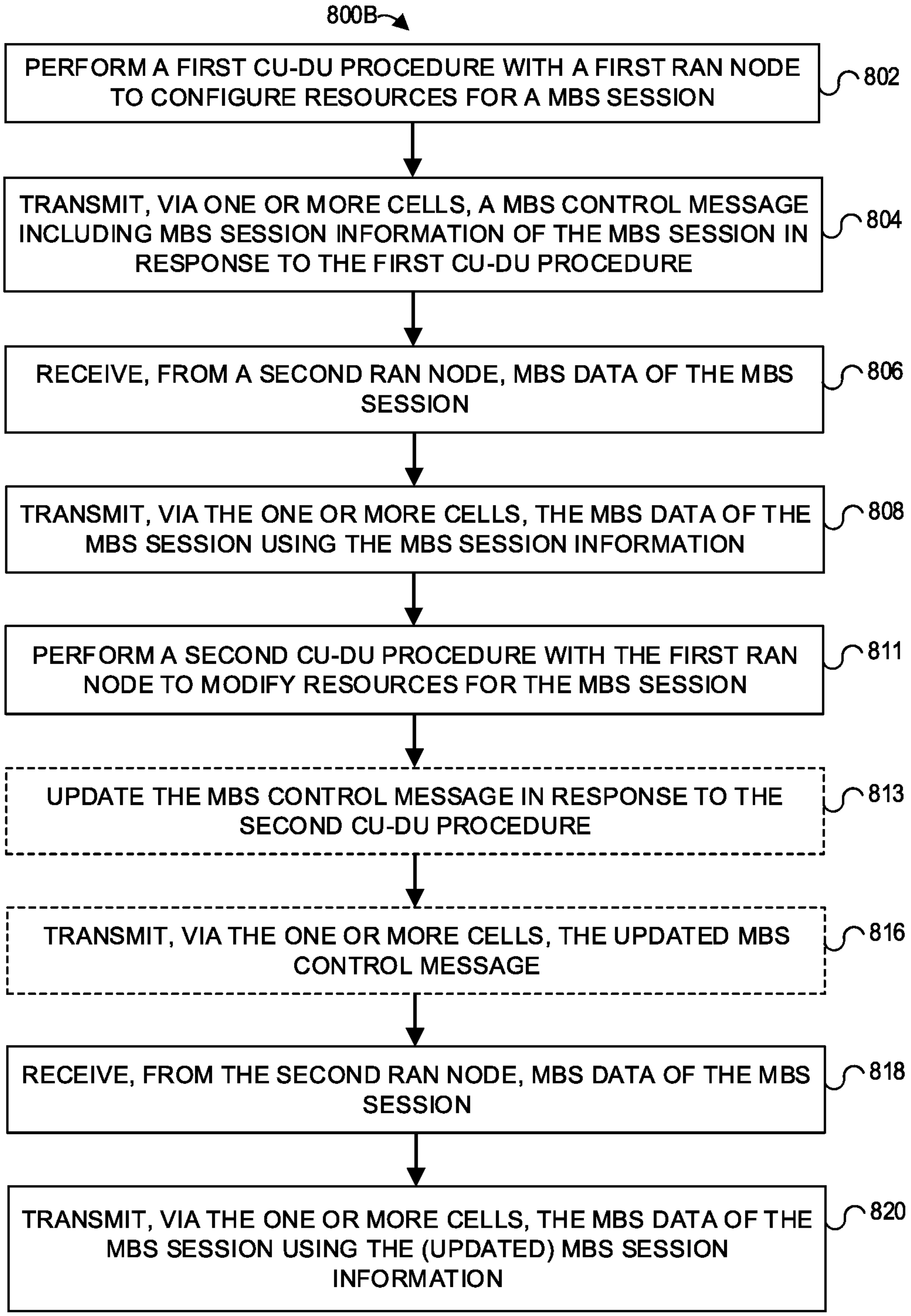
FIG. 8B is a flow diagram of an example method for modifying resources for an MBS session, which can be implemented in a DU.

FIG. 8B is a flow diagram of an example method 800B, similar to the method 800A, except for blocks 811, 813, 818 and 820. In contrast to the method 800B, in method 800A, the DU modifies resources for the MBS session. Specifically, at block 811, the DU performs a second CU-DU procedure with the first RAN node to modify resources for the MBS session. At block 813, the DU updates the MBS control message in response to the second CU-DU procedure. At block 818, the DU receives MBS data of the MBS session from the second RAN node. At block 820, the DU transmits the MBS data of the MBS session via the one or more cells using the (updated) MBS session information.

In some implementations, the DU adds or modifies configuration parameters in the MBS session information as a result of the second CU-DU procedure. Thus, the DU at block 813 updates the MBS control message to include the added or modified configuration parameters. In other implementations, the DU receives new QoS configuration(s) in a CU-to-DU message of the second CU-DU procedure. In such cases, the DU enforces the new QoS configuration(s) to transmit the MBS data of the MBS session using the (updated) MBS session at block 820.

Figure 9A:
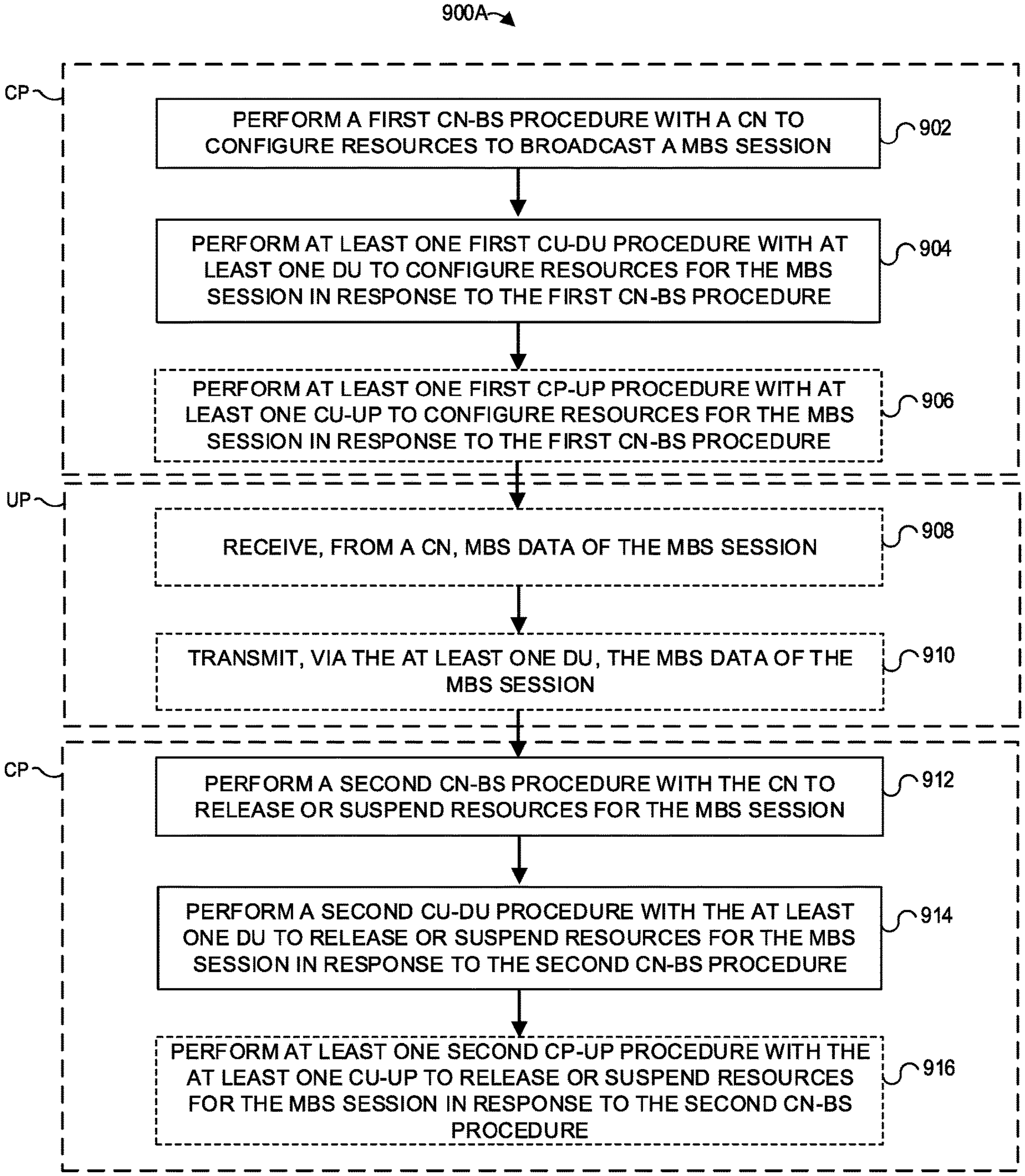
FIG. 9A is a flow diagram of an example method for suspending or releasing resources for an MBS session, which can be implemented in a CU.

Referring next to FIG. 9A, a CU such as the CU 172 can implement a method 900A to set up and later release or suspend resources for an MBS session. As discussed with reference to FIGS. 7A-7B, a CU-CP and a CU-UP of the CU, such as the CU-CP 172A and the CU-UP 172B, respectively, may implement the method 900A, where example respective functions of the CU-CP and the CU-UP are indicated in FIG. 9A by the boxes labeled "CP" and "UP."

The method 900A begins at block 902, where the CU or CU-CP performs a first CN-BS procedure with a CN to configure resources to broadcast an MBS session (see, e.g., events 502, 508, 586A-E). At block 904, the CU or CU-CP performs at least one first CU-DU procedure with at least one DU to configure resources for the MBS session in response to the first CN-BS procedure (see, e.g., events 503, 504, 505, 506, 510, 513, 537, 539, 586A-E, 591). At block 906, the CU or CU-CP performs at least one first CP-UP procedure with at least one CU-UP to configure resources for the MBS session in response to the first CN-BS procedure. At block 908, the CU or CU-UP receives MBS data of the MBS session from a CN (see e.g., events 518, 548). At block 910, the CU or CU-UP transmits the MBS data of the broadcast MBS session via the at least one DU (see e.g., events 520, 550). At block 912, the CU or CU-CP performs a second CN-BS procedure with the CN to release or suspend resources for the MBS session (see e.g., events 524, 530, 525, 531, 588, 589). At block 914, the CU or CU-CP performs a second CU-DU procedure with the at least one DU to release or suspend resources for the MBS session in response to the second CN-BS procedure (see e.g., events 526, 528, 527, 529, 588, 589). At block 916, the CU or CU-CP performs at least one second CP-UP procedure with the at least one CU-UP to release or suspend resources for the broadcast MBS session in response to the second CN-BS procedure.

Figure 9B:
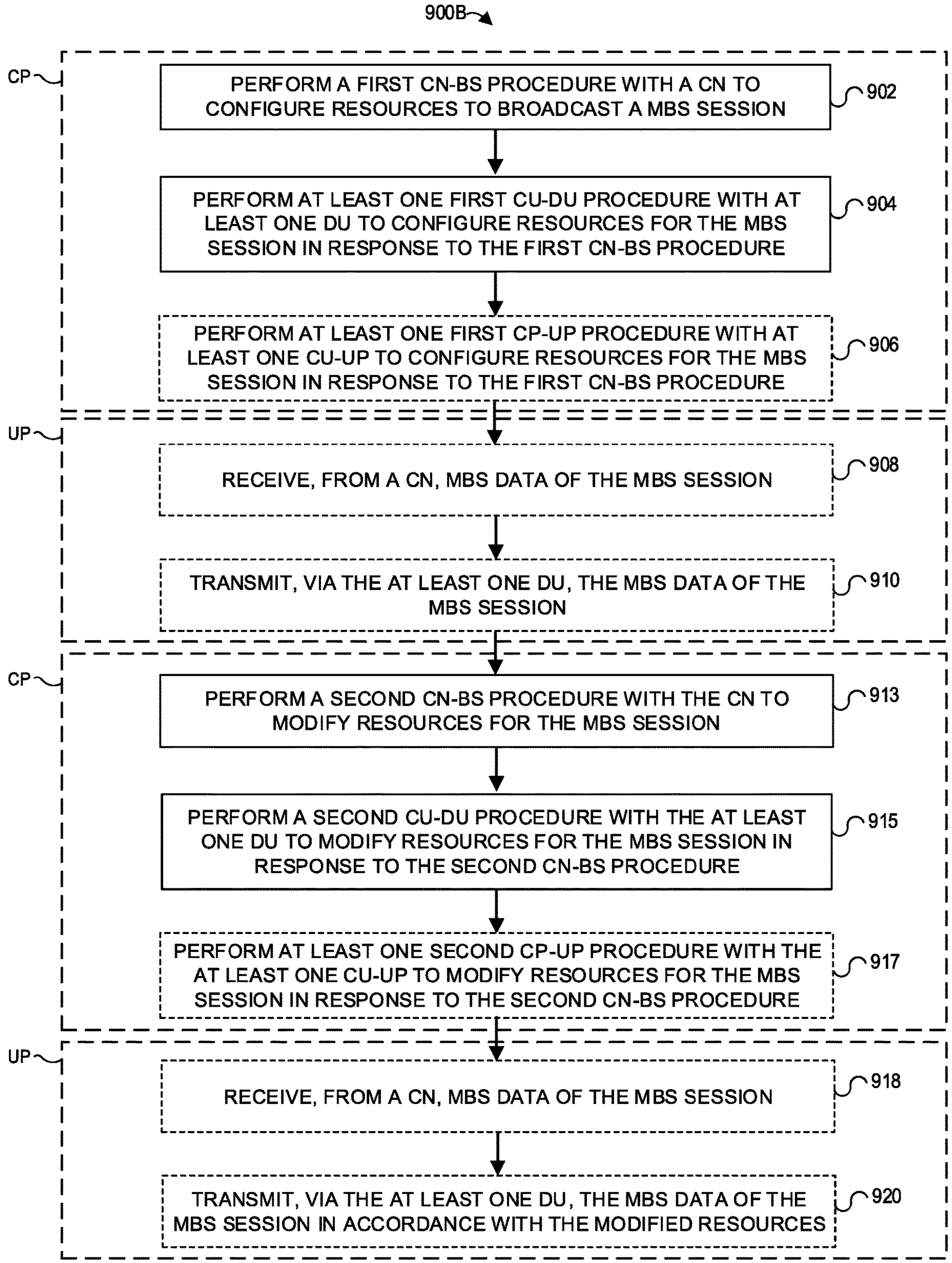
FIG. 9B is a flow diagram of an example method for modifying resources for an MBS session, which can be implemented in a CU.

FIG. 9B is a flow diagram of an example method 900B, similar to the method 900A of FIG. 9A, except for blocks 913, 915, 917, 918 and 920. Further, similar to the method 700A, in some implementations, a CU-CP and a CU-UP of the CU implement the method 900B, where example respective functions of the CU-CP and the CU-UP are indicated in FIG. 9B by the boxes labeled "CP" and "UP." In contrast to the method 900B, in method 900A, the CU modifies resources for the MBS session. At block 913, the CU or CU-CP performs a second CN-BS procedure with the CN to modify resources for the MBS session (see e.g., events 535, 541, 591). At block 915, the CU or CU-CP performs a second CU-DU procedure with the at least one DU to modify resources for the MBS session in response to the second CNBS procedure (see e.g., events 537, 539, 591). At block 917, the CU or CU-CP performs at least one second CP-UP procedure with the at least one CU-UP to modify resources for the MBS session in response to the second CN-BS procedure. At block 918, the CU or CU-UP receives MBS data of the broadcast MBS session from a CN (see e.g., event 548). At block 920, the CU or CU-UP transmits the MBS data of the MBS session via the at least one DU in accordance with the modified resources (see e.g., event 550).

Figure 10:
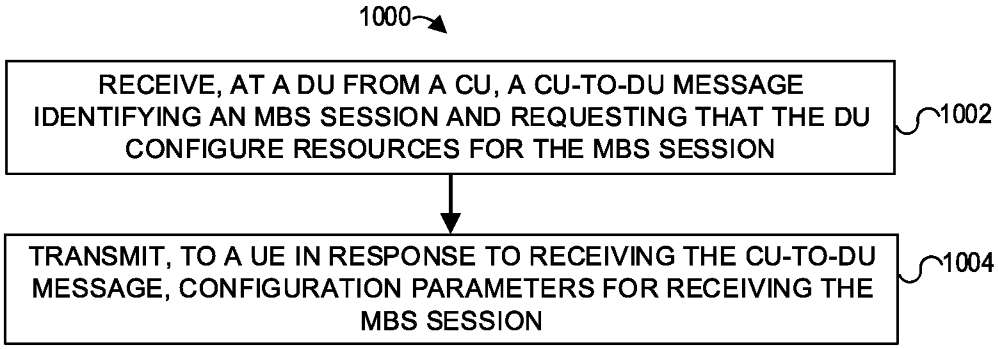
FIG. 10 is a flow diagram of an example method for configuring resources for MBS, which can be implemented in a DU.

Referring to FIG. 10, a DU (e.g., the DU 174) of a distributed base station (e.g., the base station 104 or 106) including a CU (e.g., the CU 172) and the DU can implement a method 1000 for configuring a UE (e.g., the UE 102) to receive MBS. The method may be implemented by processing hardware (e.g., the processing hardware 130 or 140). At block 1002, the DU receives, from the CU, a CU-to-DU message identifying an MBS session and requesting that the DU configure resources for the MBS session (e.g., an MBS Context Setup Request message) (e.g., events 504, 503). At block 1004, the DU transmits (e.g., broadcasts), to the UE in response to receive the CU-to-DU message, configuration parameters for receiving the MBS session (e.g., event 516). At a later time, the DU can receive MBS data for the MBS session from the CU and transmit the MBS data to the UE in accordance with the configuration parameters (e.g., events 520, 522).

In some implementations, the DU generates an MBS session information element (e.g., MBS session information, such as MBS-SessionInfo IE), includes the configuration parameters in the MBS session information element, and transmits the configuration parameters to the UE by transmitting the MBS session information element to the UE (e.g., events 512, 515, event 516 in FIGS. 5A, 5B, and 5E). In such implementations, the DU may receive a PDCP configuration from the CU (e.g., in the CU-to-DU message received at block 1002 (e.g., event 504), or in a second CU-to-DU message after receiving the CU-to-DU message at block 1002 (e.g., event 510)), and include the PDCP configuration in the MBS session information element. Alternatively, the DU may retrieve a PDCP configuration preconfigured at the DU, and include the PDCP configuration in the MBS session information element (e.g., event 515). Further, the DU may receive, from the CU, a DRX configuration and/or a MBS neighbor cell information, and include the DRX configuration and/or MBS neighbor cell information in the MBS session information element. Depending on the implementation, the DU may generate a RLC configuration and/or a group temporary identifier (e.g., a G-RNTI), and include the RLC configuration and/or group temporary identifier in the MBS session information element. The CU-to-DU message may include a session identifier (ID) that identifies the MBS session, and the DU may include the session ID in the MBS session information element.

In other implementations, the DU receives from the CU, prior to transmitting the configuration parameters, an MBS session information element including the configuration parameters, and transmits the configuration parameters to the UE by transmitting the MBS session information element (e.g., event 513, event 516 in FIGS. 5C and 5D). In such implementations, the DU may transmit, to the CU, information for inclusion in the MBS session information element, such as a RLC configuration and/or group temporary identifier associated with the MBS session. The DU may transmit the information in a DU-to-CU message responsive the CU-to-DU message (e.g., event 505), or in a second DU-to-CU message (e.g., event 509). Further, in such implementations, the DU may (i) receive, from the CU, an MBS broadcast configuration message (e.g., an MBS-BroadcastConfiguration message) including the MBS session information element, and transmit the MBS broadcast configuration message to the UE, or (ii) receive the MBS session information element from the CU, generate an MBS configuration broadcast message including the MBS session information element, and transmit the MBS broadcast configuration message to the UE.

Depending on the scenario, the method 1000 may also include configuring resources for multiple MBS sessions. The CU-to-DU message that the DU receives at block 1002 (i.e., a first CU-to-DU message identifying a first MBS session and requesting that the DU configure first resources for the first MBS session) may identify a second MBS session and request that the DU configure second resources for the second MBS session (e.g., by including a first session ID for a first MBS session and a second session ID for a second MBS session), or the DU may receive a second CU-to-DU message after receiving the CU-to-DU message at block 1002, where the second CU-to-DU message identifies the second MBS session and requests that the DU configure second resources for the second MBS session (e.g., by including a second session ID for a second MBS session) (e.g., event 587). To transmit the second configuration parameters, the DU can transmit the first configuration parameters with the second parameters (e.g., by transmitting a first MBS session information element and a second MBS session information element in a MBS broadcast configuration message) (e.g., event 556). If the DU later receives a CU-to-DU message indicating that the DU release or suspend the first resources for the first MBS session, the DU can transmit an MBS broadcast message including the second MBS session information element and excluding the first MBS session information element (e.g., event 564).

The DU may receive notifications from the CU to release, suspend, or modify the resources for the MBS session. For example, the DU may receive, from the CU, a request to release the resources for the MBS session (e.g., event 526). In response, the DU can stop transmitting the configuration parameters (e.g., event 532). As another example, the DU may receive, from the CU, a request to suspend the resources for the MBS session (e.g., event 527), and the DU can stop transmitting the configuration parameters, in response. The DU may retain the configuration parameters, and resume transmitting the configuration parameters in response to receiving, from the CU, a request to resume the resources for the MBS session (e.g., events 536, 542). In yet another example, the DU may receive, from the CU, a request to modify the resources for the MBS session, modify the configuration parameters in accordance with the request, and transmit the modified configuration parameters to the UE (e.g., events 537, 517).

Figure 11:
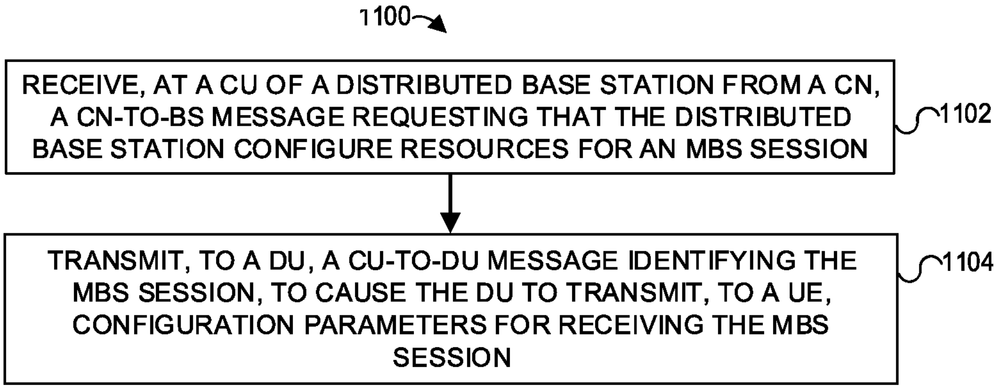
FIG. 11 is a flow diagram of an example method for configuring resources for MBS, which can be implemented in a CU.

Turning to FIG. 11, a CU (e.g., the CU 172) of a distributed base station (e.g., the base station 104 or 106) including a DU (e.g., the DU 174) and the CU can implement a method 1100 for configuring a UE (e.g., the UE 102) to receive MBS. The method may be implemented by processing hardware (e.g., the processing hardware 130 or 140). At block 1102, the CU receives, from a CN, a CN-to-BS message requesting that the distributed base station configure resources for an MBS session (e.g., event 502). At block 1104, the CU transmits, to the DU, a CU-to-DU message identifying the MBS session, to cause the DU to transmit, to the UE, configuration parameters for receiving the MBS session (e.g., events 504, 503, 510, 513).

The following list of examples reflects a variety of the embodiments explicitly contemplated by the present disclosure:

Example 1. A method implemented in a distributed unit (DU) of a distributed base station including a central unit (CU) and the DU, for configuring a user equipment (UE) to receive multicast and/or broadcast services (MBS), the method comprising: receiving, by a processing hardware of the DU from the CU, a CU-to-DU message identifying an MBS session and requesting that the DU configure resources for the MBS session; and transmitting, by the processing hardware to the UE in response to receiving the CU-to-DU message, configuration parameters for receiving the MBS session.

Example 2. The method of example 1, further comprising: generating an MBS session information element; and including the configuration parameters in the MBS session information element, wherein transmitting the configuration parameters includes: transmitting the MBS session information element.

Example 3. The method of example 2, further comprising: receiving, by the processing hardware from the CU, a packet data convergence protocol (PDCP) configuration; wherein generating the MBS session information element includes including the PDCP configuration in the MBS session information element.

Example 4. The method of example 3, wherein receiving the PDCP configuration includes: receiving the PDCP configuration in the CU-to-DU message.

Example 5. The method of example 3, wherein the CU-to-DU message is a first CU-to-DU message, and wherein receiving the PDCP configuration includes: receiving a second CU-to-DU message after receiving the first CU-to-DU message, the second CU-to-DU message including the PDCP configuration.

Example 6. The method of example 2, further comprising: retrieving, by the processing hardware, a packet data convergence protocol (PDCP) configuration preconfigured at the DU; wherein generating the MBS session information element includes including the PDCP configuration in the MBS session information element.

Example 7. The method of any one of examples 2-6, further comprising: receiving, by the processing hardware from the CU, a discontinuous reception (DRX) configuration with the PDCP configuration, wherein generating the MBS session information element includes including the DRX configuration in the MBS session information element.

Example 8. The method of any one of examples 2-7, further comprising: generating a radio link control (RLC) configuration, wherein generating the MBS session information element includes including the RLC configuration in the MBS session information element.

Example 9. The method of any one of examples 2-8, further comprising: generating a group temporary identifier associated with the MBS session, wherein generating the MBS session information element includes including the group temporary identifier in the MBS session information element.

Example 10. The method of any one of examples 2-9, wherein: receiving the CU-to-DU message includes receiving the CU-to-DU message including a session identifier (ID) identifying the MBS session; and generating the MBS session information element includes including the session identifier in the MBS session information element.

Example 11. The method of example 1, further comprising: receiving, by the processing hardware from the CU prior to transmitting the configuration parameters, an MBS session information element including the configuration parameters, wherein transmitting the configuration parameters includes transmitting the MBS session information element.

Example 12. The method of example 11, further comprising: transmitting, by the processing hardware to the CU, information for inclusion in the MBS session information element.

Example 13. The method of example 12, wherein transmitting the information includes: transmitting a radio link control (RLC) configuration.

Example 14. The method of example 12 or 13, wherein transmitting the information includes: transmitting a group temporary identifier associated with the MBS session.

Example 15. The method of any one of examples 12-14, wherein transmitting the information includes: transmitting the information in a DU-to-CU message responsive to the CU-to-DU message.

Example 16. The method of any one of examples 12-14, further comprising: transmitting, by the processing hardware to the CU, a first DU-to-CU message responsive to the CU-to-DU message, wherein transmitting the information includes transmitting the information in a second DU-to-CU message after transmitting the first DU-to-CU message.

Example 17. The method of any one of examples 11-16, wherein: receiving the MBS session information element from the CU includes receiving an MBS broadcast configuration message including the MBS session information element; and transmitting the MBS session information element includes transmitting the MBS broadcast configuration message.

Example 18. The method of any one of examples 2-16, wherein transmitting the MBS session information element includes: generating an MBS broadcast configuration message including the MBS session information element; and transmitting the MBS broadcast configuration message to the UE.

Example 19. The method of example 17 or 18, wherein transmitting the MBS broadcast configuration message includes transmitting an MBSBroadcastConfiguration message.

Example 20. The method of any one of the preceding examples, wherein: the CU-to-DU message is a first CU-to-DU message identifying a first MBS session and requesting that the DU configure first resources for the first MBS session; the configuration parameters are first configuration parameters; and the method further comprises: receiving, by the processing hardware from the CU, a second CU-to-DU message identifying a second MBS session and requesting that the DU configure second resources for the second MBS session; and transmitting, by the processing hardware to the UE responsive to receiving the second CU-to-DU message, second configuration parameters for receiving the second MBS session.

Example 21. The method of example 20, wherein transmitting the second configuration parameters includes: transmitting the first configuration parameters with the second configuration parameters.

Example 22. The method of example 20 or 21, wherein receiving the second CU-to-DU message includes: receiving the second CU-to-DU message including a session identifier (ID) identifying the second MBS session.

Example 23. The method of any one of examples 1-19, wherein: the MBS session is a first MBS session; the resources are first resources; the configuration parameters are first configuration parameters; receiving the CU-to-DU message includes: receiving the CU-to-DU message further identifying a second MBS session and further requesting that the DU configure second resources for the second MBS session; and transmitting the configuration parameters includes: transmitting the first configuration parameters with second configuration parameters for receiving the second MBS session.

Example 24. The method of example 23, wherein receiving the CU-to-DU message includes: receiving the CU-to-DU message including a first session identifier (ID) identifying the first MBS session and a second session ID identifying the second MBS session.

Example 25. The method of any one of examples 21, 23, or 24, wherein transmitting the first configuration parameters with the second configuration parameters includes: transmitting a first MBS session information element including the first configuration parameters with a second MBS session information element including the second configuration parameters.

Example 26. The method of example 25, wherein transmitting the first MBS session information element with the second MBS session information element includes: transmitting an MBS broadcast configuration message including the first MBS session information element and the second MBS session information element.

Example 27. The method of example 26, further comprising: receiving, by the processing hardware from the CU, a third CU-to-DU message requesting that the DU release or suspend the first resources for the first MBS session; and modifying, by the processing hardware, the MBS broadcast configuration message to exclude the first MBS session information element; and transmitting, by the processing hardware to the UE, the MBS broadcast configuration message including the second MBS session information element and excluding the first MBS session information element.

Example 28. The method of any one of examples 1-26, further comprising: receiving, by the processing hardware from the CU, a request to release the resources for the MBS session; and stopping, by the processing hardware, transmitting the configuration parameters.

Example 29. The method of example 28, further comprising: releasing, by the processing hardware, the configuration parameters.

Example 30. The method of any one of examples 1-26, further comprising: receiving, by the processing hardware from the CU, a request to suspend the resources for the MBS session; and stopping, by the processing hardware, transmitting the configuration parameters.

Example 31. The method of example 30, further comprising: retaining, by the processing hardware, the configuration parameters.

Example 32. The method of example 30 or 31, wherein the request is a first request, the method further comprising: receiving, by the processing hardware from the CU, a request to resume the resources for the MBS session; and resume transmitting, by the processing hardware, the configuration parameters.

Example 33. The method of any one of examples 1-26, further comprising: receiving, by the processing hardware, a request to modify the resources for the MBS session; modifying, by the processing hardware, the configuration parameters in accordance with the request; and transmitting, by the processing hardware, the modified configuration parameters.

Example 34. The method of any one of the preceding examples, wherein receiving the CU-to-DU message includes: receiving an MBS Context Setup Request message.

Example 35. The method of any one of the preceding examples, wherein transmitting the configuration parameters includes: broadcasting the configuration parameters to a plurality of UEs, the plurality of UEs including the UE.

Example 36. The method of any one of the preceding examples, further comprising: receiving, by the processing hardware from the CU, MBS data for the MBS session; and transmitting, by the processing hardware to the UE, the MBS data in accordance with the configuration parameters.

Example 37. A method implemented in a central unit (CU) of a distributed base station including a distributed unit (DU) and the CU, for configuring a user equipment (UE) to receive multicast and/or broadcast services (MBS), the method comprising: receiving, by processing hardware of the CU from a core network (CN), a CN-to-BS message requesting that the distributed base station configure resources for an MBS session; and transmitting, by the processing hardware to the DU, a CU-to-DU message identifying the MBS session, to cause the DU to transmit, to the UE, configuration parameters for receiving the MBS session.

Example 38. The method of example 37, further comprising: transmitting, by the processing hardware to the DU, a packet data convergence protocol (PDCP) configuration, to cause the DU to include the PDCP configuration in the configuration parameters.

Example 39. The method of example 38, wherein transmitting the PDCP configuration includes: transmitting the PDCP configuration in the CU-to-DU message.

Example 40. The method of example 38, wherein: the CU-to-DU message is a first CU-to-DU message; transmitting the PDCP configuration includes: transmitting, to the DU after transmitting the first CU-to-DU message, a second CU-to-DU message including the PDCP configuration.

Example 41. The method of any one of examples 38-40, wherein transmitting the PDCP configuration includes: transmitting a discontinuous reception (DRX) configuration with the PDCP configuration, to cause the DU to include the DRX configuration in the configuration parameters.

Example 42. The method of example 37, further comprising: generating, by the processing hardware, an MBS session information element; including, by the processing hardware, the configuration parameters in the MBS session information element; and transmitting, by the processing hardware, the MBS session information element to the DU.

Example 43. The method of example 42, further comprising: generating, by the processing hardware, a packet data convergence protocol (PDCP) configuration; and including, by the processing hardware, the PDCP configuration in the configuration parameters.

Example 44. The method of example 42 or 43, further comprising: generating, by the processing hardware, a discontinuous reception (DRX) configuration; and including, by the processing hardware, the DRX configuration in the configuration parameters.

Example 45. The method of any one of examples 42-44, further comprising: generating, by the processing hardware, an MBS broadcast configuration message including the MBS session information element; and transmitting, by the processing hardware to the DU, the MBS broadcast configuration message.

Example 46. The method of any one of examples 42-45, further comprising: receiving, by the processing hardware from the DU, information for inclusion in the MBS session information element, wherein generating the MBS session information element includes including the information in the MBS session information element.

Example 47. The method of example 46, wherein receiving the information includes: receiving a radio link control (RLC) configuration.

Example 48. The method of example 46 or 47, wherein receiving the information includes: receiving a group temporary identifier associated with the MBS session.

Example 49. The method of any one of examples 46-48, wherein receiving the information includes: receiving the information in a DU-to-CU message responsive to the CU-to-DU message.

Example 50. The method of any one of examples 46-48, further comprising: receiving, by the processing hardware, a first DU-to-CU message responsive to the CU-to-DU message; and receiving, by the processing hardware after receiving the first DU-to-CU message, a second DU-to-CU message including the information.

Example 51. The method of any one of examples 37-50, wherein: the CN-to-BS message is a first CN-to-BS message requesting that the distributed base station configure first resources for a first MBS session; the CU-to-DU message is a first CU-to-DU message; the configuration parameters are first configuration parameters; and the method further comprises: receiving, by the processing hardware, a second CN-to-BS message requesting that the distributed base station configure second resources for a second MBS session; and transmitting, by the processing hardware to the UE, a second CU-to-DU message to cause the DU to transmit second configuration parameters for receiving the second MBS session.

Example 52. The method of example 51, wherein: receiving the second CN-to-BS message includes: receiving the second CN-to-BS message including a session identifier (ID) identifying the second MBS session; and transmitting the second CU-to-DU message includes: transmitting the second CU-to-DU message including the session ID identifying the second MBS session.

Example 53. The method of any one of examples 37-50, wherein: the MBS session is a first MBS session; the CN-to-BS message is a first CN-to-BS message; the resources are first resources; the configuration parameters are first configuration parameters; receiving the CN-to-BS message includes: receiving the CN-to-BS message further requesting that the distributed base station configure second resources for a second MBS session; and transmitting the CU-to-DU message includes: transmitting the CU-to-DU message further identifying the second MBS session to cause the DU to transmit the first configuration parameters with second configuration parameters for receiving the second MBS session.

Example 54. The method of example 53, wherein: receiving the CN-to-BS message includes: receiving the CN-to-BS message including a first session identifier (ID) identifying the first MBS session and a second session ID identifying the second MBS session; and transmitting the CU-to-DU message includes: transmitting the CU-to-DU message including the first session ID and the second session ID.

Example 55. The method of any one of examples 37-54, further comprising: transmitting, by the processing hardware to the DU, a request to release or suspend the resources for the MBS session.

Example 56. The method of any one of examples 37-54, further comprising: transmitting, by the processing hardware to the DU, a request to modify the resources for the MBS session.

Example 57. The method of examples 55 or 56, wherein transmitting the request includes: transmitting the request in response to receiving a message from the CN.

Example 58. The method of any one of examples 37-57, further comprising: receiving, by the processing hardware from the CN, MBS data for the MBS session; and transmitting, by the processing hardware to the DU, the MBS data.

Example 59. The method of example 58, further comprising: transmitting, by a control plane (CP) logical node of the central unit to a user plane (UP) logical node of the central unit, a CP-to-UP message to configure the UP logical node to receive the MBS data from the CN and to transmit the MBS data to the DU.

Example 60. The method of any one of examples 37-59, wherein transmitting the CU-to-DU message includes: transmitting an MBS Context Setup Request message.

Example 61. The method of any one of examples 37-60, wherein transmitting the CU-to-DU message includes: transmitting the CU-to-DU message including a session identifier (ID) identifying the MBS session.

Example 62. A network node comprising processing hardware and configured to implement a method according to any one of the preceding examples.

The following additional considerations apply to the foregoing discussion.

In some implementations, "message" is used and can be replaced by "information element (IE)" or vice versa. In some implementations, "IE" is used and can be replaced by "field" or vice versa. In some implementations, "configuration" can be replaced by "configurations" or the configuration parameters. In some implementations, "MBS" can be replaced by "multicast" or "broadcast". The messages described in the events above are examples and should not restrict applicability of the invention. In some implementations, the messages sent from the CU to DU can be generalized as CU-to-DU messages, and the messages sent from the DU-to-CU can be generalized as DU-to-CU messages. In some implementations, the CU-to-DU messages and DU-to-CU messages can be F1AP messages. In some implementations, the messages sent from the CU-CP to CU-UP can be generalized as CP-to-UP messages, and the messages sent from the CU-UP to the CU-CP can be generalized as UP-to-CP messages. In some implementations, the CP-to-UP messages and UP-to-CP messages can be E1 application protocol (E1AP) messages.

A user device in which the techniques of this disclosure can be implemented (e.g., the UE 102 or 103) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for communicating MBS information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method implemented in a distributed unit (DU) of a distributed base station including a central unit (CU) and the DU, for configuring a user equipment (UE) to receive multicast and/or broadcast services (MBS), the method comprising:

receiving, by a processing hardware of the DU from the CU, an MBS context setup request for an MBS session, to request that the DU configure resources for the MBS session, the MBS context setup request including a packet data convergence protocol (PDCP) configuration;

in response to receiving the MBS context setup request, transmitting, by the processing hardware to the UE, configuration parameters for receiving the MBS session including at least the PDCP configuration.

2. The method of claim 1, further comprising:

generating an MBS session information element; and including the configuration parameters in the MBS session information element, wherein transmitting the configuration parameters includes:

transmitting the MBS session information element.

3. The method of claim 2, wherein:

receiving the MBS context setup request includes receiving the MBS context setup request including a session identifier (ID) identifying the MBS session; and generating the MBS session information element includes including the session identifier in the MBS session information element.

4. The method of claim 1, further comprising:

receiving, by the processing hardware from the CU prior to transmitting the configuration parameters, an MBS session information element including at least some of the configuration parameters, wherein transmitting the configuration parameters includes transmitting the MBS session information element.

5. The method of claim 4, further comprising:

transmitting, by the processing hardware to the CU, information for inclusion in the MBS session information element.

6. The method of claim 1, further comprising:

receiving, by the processing hardware from the CU, a request to release the resources for the MBS session; and stopping, by the processing hardware, transmitting the configuration parameters.

7. The method of claim 6, further comprising:

releasing, by the processing hardware, the configuration parameters.

8. The method of claim 1, further comprising:

receiving, by the processing hardware, a request to modify the resources for the MBS session;

modifying, by the processing hardware, the configuration parameters in accordance with the request; and transmitting, by the processing hardware, the modified configuration parameters.

9. A method implemented in a central unit (CU) of a distributed base station including a distributed unit (DU) and the CU, for configuring a user equipment (UE) to receive multicast and/or broadcast services (MBS), the method comprising:

receiving, by processing hardware of the CU from a core network (CN), a CN-to-BS message requesting that the distributed base station configure resources for an MBS session; and transmitting, by the processing hardware to the DU, an MBS context setup request identifying the MBS session and including a packet data convergence protocol (PDCP) configuration to cause the DU to transmit, to the UE, configuration parameters for receiving the MBS session including the PDCP configuration.

10. The method of claim 9, further comprising:

generating, by the processing hardware, an MBS session information element;

including, by the processing hardware, at least some of the configuration parameters in the MBS session information element; and transmitting, by the processing hardware, the MBS session information element to the DU.

11. The method of claim 10, further comprising:

generating, by the processing hardware, an MBS broadcast configuration message including the MBS session information element; and transmitting, by the processing hardware to the DU, the MBS broadcast configuration message.

12. The method of claim 10, further comprising:

receiving, by the processing hardware from the DU, information for inclusion in the MBS session information element, wherein generating the MBS session information element includes including the information in the MBS session information element.

13. The method of claim 12, wherein receiving the information includes:

receiving the information in a DU-to-CU message after receiving the MBS context setup request.

14. The method of claim 9, further comprising:

transmitting, by the processing hardware to the DU, a request to release, modify, or suspend the resources for the MBS session.

15. The method of claim 9, further comprising:

transmitting, by a control plane (CP) logical node of the central unit to a user plane (UP) logical node of the central unit, a CP-to-UP message to configure the UP logical node to receive MBS data from the CN and to transmit the MBS data to the DU.

16. A network node, configured to configure a user equipment (UE) to receive multicast and/or broadcast services (MBS), the network node operating as a distributed unit (DU) of a distributed base station including a central unit (CU) and the DU, and the network node comprising:

a transceiver; and processing hardware, configured to:

receive, from the CU, an MBS context setup request for an MBS session, to request that the DU configure resources for the MBS session, the MBS context setup request including a packet data convergence protocol (PDCP) configuration;

in response to receiving the MBS context setup request, transmit, to the UE, configuration parameters for receiving the MBS session including at least the PDCP configuration.

17. The network node of claim 16, wherein the processing hardware is further configured to:

generate an MBS session information element; and include the configuration parameters in the MBS session information element;

wherein transmitting the configuration parameters includes:

transmitting the MBS session information element.

18. The network node of claim 17, wherein:

receiving the MBS context setup request includes receiving the MBS context setup request including a session identifier (ID) identifying the MBS session; and generating the MBS session information element includes including the session identifier in the MBS session information element.

19. The network node of claim 16, wherein the processing hardware is further configured to:

receive, from the CU prior to transmitting the configuration parameters, an MBS session information element including at least some of the configuration parameters;

wherein transmitting the configuration parameters includes transmitting the MBS session information element.

20. The network node of claim 19, wherein the processing hardware is further configured to:

transmit, to the CU, information for inclusion in the MBS session information element.

* * * * *